(12) United States Patent
Takatori et al.

(10) Patent No.: US 7,612,848 B2
(45) Date of Patent: *Nov. 3, 2009

(54) LIQUID CRYSTAL DISPLAY AND METHOD OF MANUFACTURING THE SAME AND METHOD OF DRIVING THE SAME

(75) Inventors: Ken-ichi Takatori, Tokyo (JP); Masayoshi Suzuki, Tokyo (JP); Toshiya Ishii, Tokyo (JP); Teruaki Suzuki, Tokyo (JP); Hiroshi Kanoh, Tokyo (JP); Ken Sumiyoshi, Tokyo (JP); Michiaki Sakamoto, Tokyo (JP); Mamoru Okamoto, Tokyo (JP); Yuji Yamamoto, Tokyo (JP); Hiroaki Matsuyama, Tokyo (JP); Kiyomi Kawada, Tokyo (JP); Seiji Suzuki, Tokyo (JP); Yoshihiko Hirai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/692,761

(22) Filed: Mar. 28, 2007

(65) Prior Publication Data

US 2007/0165172 A1 Jul. 19, 2007

Related U.S. Application Data

(60) Continuation of application No. 10/948,614, filed on Sep. 23, 2004, now Pat. No. 7,212,270, which is a division of application No. 10/252,982, filed on Sep. 23, 2002, now Pat. No. 6,812,986, which is a division of application No. 09/593,119, filed on Jun. 13, 2000, now Pat. No. 6,504,592.

(30) Foreign Application Priority Data

| Jun. 16, 1999 | (JP) | 1999-169753 |
| Jun. 18, 1999 | (JP) | 1999-173004 |
| Jan. 12, 2000 | (JP) | 2000-003435 |

(51) Int. Cl.
*G02F 1/1335* (2006.01)
*G02F 1/1337* (2006.01)

(52) U.S. Cl. .................................. 349/113; 349/129
(58) Field of Classification Search ................. 349/113, 349/114, 129, 130, 144
See application file for complete search history.

(56) References Cited

U.S. PATENT DOCUMENTS 4,669,828 A    6/1987    Parker (Continued)

FOREIGN PATENT DOCUMENTS

JP    59-211019    11/1984

(Continued)

OTHER PUBLICATIONS

Fukada, A., "Pretransitional Effect in AF-F Switching: To Suppress it or to Enhance it, that is my Question about AFLCDs" *Asia Display '95*, pp. 61-64 (1995).

(Continued)

*Primary Examiner*—James A Dudek
(74) *Attorney, Agent, or Firm*—Michael Best & Friedrich LLP

(57) ABSTRACT

A liquid crystal display having a wide viewing angle and easily manufactured. The liquid crystal display comprises an upper substrate and a lower substrate, and a liquid crystal material disposed between the upper substrate and the lower substrate. The liquid crystal display has a conductive protrusion disposed on the surface of the upper substrate opposing to the lower substrate. The conductive protrusion is disposed over a scanning electrode line or a signal electrode line and has the same potential as that of the upper electrode. As another structure, each of pixel electrodes on the lower substrate has a smaller area than that of a common electrode on the upper substrate and is covered by the common electrode, and each of the pixel electrodes comprises an electrode portion having approximately symmetrical shape.

28 Claims, 27 Drawing Sheets

U.S. PATENT DOCUMENTS

| | | | |
|---|---|---|---|
| 5,126,865 | A | 6/1992 | Sarma |
| 5,835,171 | A | 11/1998 | Hanazawa et al. |
| 6,407,794 | B2 | 6/2002 | Koma |
| 6,433,764 | B1 | 8/2002 | Hebiguchi et al. |
| 6,812,986 | B2 * | 11/2004 | Takatori et al. ............ 349/141 |
| 6,819,379 | B2 * | 11/2004 | Kubo et al. ................ 349/114 |
| 2002/0067330 | A1 | 6/2002 | Okuzono |
| 2002/0175889 | A1 | 11/2002 | Tokonami et al. |
| 2003/0193493 | A1 | 10/2003 | Ozawa |
| 2005/0052371 | A1 | 3/2005 | Ozawa |
| 2006/0125764 | A1 | 6/2006 | Furuhashi et al. |

FOREIGN PATENT DOCUMENTS

| | | |
|---|---|---|
| JP | 61-002130 | 1/1986 |
| JP | 64-025133 | 1/1989 |
| JP | 04-093924 | 3/1992 |
| JP | 04-261522 | 9/1992 |
| JP | 05-158067 | 6/1993 |
| JP | 05-188385 | 7/1993 |
| JP | 05-505247 | 8/1993 |
| JP | 58-043723 | 9/1993 |
| JP | 06-059245 | 3/1994 |
| JP | 07-020481 | 1/1995 |
| JP | 07-104282 | 4/1995 |
| JP | 07-181493 | 7/1995 |
| JP | 07-036044 | 8/1995 |
| JP | 07-199190 | 8/1995 |
| JP | 07-33612 | 12/1995 |
| JP | 08-015678 | 1/1996 |
| JP | 2502802 | 3/1996 |
| JP | 08-211392 | 8/1996 |
| JP | 08-262484 | 10/1996 |
| JP | 2565639 | 10/1996 |
| JP | 09-120072 | 5/1997 |
| JP | 09-120074 | 5/1997 |
| JP | 09-146098 | 6/1997 |
| JP | 09-146103 | 6/1997 |
| JP | 09-211476 | 8/1997 |
| JP | 09-236821 | 9/1997 |
| JP | 2692693 | 9/1997 |
| JP | 09-325342 | 12/1997 |
| JP | 10-020323 | 1/1998 |
| JP | 10-068955 | 3/1998 |
| JP | 10-153797 | 6/1998 |
| JP | 10-186330 | 7/1998 |
| JP | 10-186351 | 7/1998 |
| JP | 10-228022 | 8/1998 |
| JP | 10-239513 | 9/1998 |
| JP | 2836594 | 10/1998 |
| JP | 10-333180 | 12/1998 |
| JP | 11-024082 | 1/1999 |
| JP | 11-084394 | 3/1999 |
| JP | 11-109366 | 4/1999 |
| JP | 11-109367 | 4/1999 |

OTHER PUBLICATIONS

Koike, Y. et al., "Late-News Paper: A Full-Color TFT-LCD with a Domain-Divided Twisted-Nematic Structure" *SID 92 Digest*, pp. 798-801 (1992).

Kuo, C-L. et al., "Improvement of Gray-Scale Performance of Optically Compensated Birefringence (OCB) Display Mode for AMLCDs" *SID 94 Digest*, pp. 927-930 (1994).

Lien, A. et al., "Two-Domain TN-LCDs Fabricated by Parallel Fringe Field Method" *SID 93 Digest*, pp. 269-272 (1993).

Nishiki, A. et al., "A 1148×3×800 Dot 14-In. TFT Color LCD with Improved Lateral Field Effect" *Conference Record of the 1991 International Display Research Conference*, pp. 239-242 (1991).

Schadt, M. et al., "Optically Structured Multidomain LCDs with Broad Field of View and Gap Ferroelectric LCDs with Large Cell" *AM-LCD '96 / IDW '96*, pp. 337-340 (1996).

Soref, R.A., "Field Effects in Nematic Liquid Crystals Obtained with Interdigital Electrodes" *Journal of Applied Physics*, vol. 45, No. 12, pp. 5466-5468 (Dec. 1974).

Takatori, K. et al., "A Complementary TN LCD with Wide-Viewing-Angle Grayscale" *Japan Display '92*, pp. 591-594 (1992).

* cited by examiner

PRIOR ART

PRIOR ART

PRIOR ART

PRIOR ART

PRIOR ART

PRIOR ART

PRIOR ART

PRIOR ART

LIQUID CRYSTAL DISPLAY AND METHOD OF MANUFACTURING THE SAME AND METHOD OF DRIVING THE SAME

This application is a continuation of U.S. patent application Ser. No. 10/948,614, filed Sep. 23, 2004, which is a division of U.S. patent application Ser. No. 10/252,982, filed Sep. 23, 2002, now U.S. Pat. No. 6,812,986, which is a division of U.S. patent application Ser. No. 09/593,119, filed Jun. 13, 2000, now U.S. Pat. No. 6,504,592, which claims the benefit of priority from Japanese Patent Application No. 16-9753/1999, filed Jun. 16, 1999, Japanese Patent Application No. 17-3004/1999, filed Jun. 18, 1999, and Japanese Patent Application No. 00-3435/2000 filed Jan. 12, 2000.

FIELD OF THE INVENTION

The present invention relates generally to a liquid crystal display, a method of manufacturing the liquid crystal display and a method of driving the liquid crystal display. More particularly, the present invention relates to a liquid crystal display which has a wide viewing angle, in which disturbance of alignment of liquid crystal molecules can be reduced and which is easily manufactured.

BACKGROUND OF THE INVENTION

Liquid crystal displays have been increasingly becoming popular as displays for information, image and the like. The liquid crystal displays have advantages of providing thin profile, small placing area and the like when compared with CRT (Cathode Ray Tube) displays.

Liquid crystal displays according to the present invention can be used in, for example, a display or monitor for a personal computer, a monitor for factory automation (FA), a home television set, a terminal monitor in a hospital, a library, a museum and the like, a monitor for an air traffic control tower and the like, a monitor used for reference of newspapers, documents in public offices and the like, a personal monitor in a school and a supplementary private school, a personal monitor for utilizing various media, a monitor in amusement facilities such as pachinko facilities, and the like. The liquid crystal displays according to the present invention can also be used as a light valve for projector type liquid crystal displays.

A recent liquid crystal display has image quality substantially equal to that of a CRT display. However, a viewing angle of the liquid crystal display is much narrower than that of the CRT display. Therefore, enlarging a viewing angle is one of the most important concerns in a liquid crystal display.

As a technology for enlarging a viewing angle of a liquid crystal display, there is considered using a liquid crystal display element which has a plurality of domains having different alignment directions in each pixel to obtain a wide viewing angle. Such prior art is disclosed in, for example, Japanese examined patent publication No. 58-43723, "Liquid Crystal Display Element", Japanese patent laid-open publication No. 59-211019, "Liquid Crystal Display Device", and Japanese patent laid-open publication No. 63-106624 (Japanese patent publication No. 2692693), "Liquid Crystal Display Panel".

Referring to a "Liquid Crystal Display Panel" disclosed in Japanese patent laid-open publication No. 63-106624 as a prior art example, among the Japanese publications mentioned above, an explanation will be made on a prior art technology.

FIG. 28 is a plan view showing a conventional liquid crystal display according to this prior art example. FIG. 28 corresponds to FIG. 1 described in the Japanese patent laid-open publication. No. 63-106624. FIG. 29 corresponds to FIG. 2 described in the Japanese patent laid-open publication No. 63-106624. FIG. 30 corresponds to FIG. 3 described in the Japanese patent laid-open publication No. 63-106624. FIG. 30 is a cross sectional view taken on line a-a' of FIG. 28, and shows a cross section of one pixel of the conventional liquid crystal display device, that is, a liquid crystal display element.

With reference to FIGS. 28 through 30, a structure of the conventional liquid crystal display device will be described.

On a lower glass substrate 122, there are formed a transparent lower display electrode 120 which is provided corresponding to each pixel, and a lower alignment film or layer 110 formed on the transparent lower display electrode 120.

On the lower glass substrate 122, there is also formed a thin film transistor (TFT) 113 for driving the transparent lower display electrode 120.

On an upper glass substrate 121, there are formed a transparent upper display electrode 111 and a upper alignment film or layer 109. The alignment films 109 and 110 are both made of polyimide.

A pixel B formed between the opposing transparent electrodes 111 and 120 has, for example, a square shape of 200 μm (micrometers) square, and a plurality of such pixels B are disposed in a matrix. At the center portion of the transparent display electrode, there is disposed a band shaped spacer 123 made of polyimide. As a result thereof, each pixel B is divided into a region X131 and a region Y132 by the band shaped spacer 123. These divided regions X131 and Y132 are formed as shown schematically in FIG. 16 which corresponds to FIG. 2 of Japanese patent laid-open publication No. 63-106624. That is, the upper glass substrate 121 and the opposing lower glass substrate 122 are respectively rubbed in directions shown by arrows.

In order to show an effect of improvement in viewing angle dependence of viewing quality realized by this prior art liquid crystal display, FIG. 31 shows a plan perspective view which illustrates rubbing directions and direction of twist of liquid crystal alignment between the upper and lower substrates when a direction of observation is changed by 45 degrees in bearing angle. In FIG. 31, there are shown divided regions X131, divided regions Y132, rubbing directions 1311 and 1312 in a first substrate, rubbing directions 1312 and 1322, and a twist angle 127 of liquid crystal alignment between the upper and lower substrates.

FIG. 32 is a cross sectional view taken on line b-b' of FIG. 31 and showing a rising direction of aligning force at the surface of a substrate and a rising direction of liquid crystal alignment by an electric field between the upper and lower substrates. In FIG. 32, a twist of liquid crystal molecules is not illustrated. In FIG. 32, there are shown liquid crystal material 105, a direction of rising 106 of liquid crystal alignment caused by an electric field, the upper glass substrate 121, a lower glass substrate 122, a region X131, and a region Y132.

In this prior art liquid crystal display, as shown in FIG. 31, with respect to liquid crystal alignment in each of the divided regions or domains, a direction of spiral twist is the same, but as shown in FIG. 32, directions of angles from the substrate surface, i.e., pretilt angles, differ from each other. Because of the difference of the angles from the substrate surface, when a voltage is applied between the upper and lower electrodes, direction 106 of rising up of liquid crystal molecules, which is also called direction of tilt, differ from each other as shown in FIG. 31. Therefore, when light is irradiated from a direction which is inclined from the direction perpendicular to the substrate, optical characteristics of respective domains compensate with each other. As a result thereof, when the voltage is applied, viewing angle dependence is compensated with each other between domains having mutually different alignments in each pixel between the upper and lower substrates, and optical characteristics having small viewing angle dependency can be realized. Especially, when an image having gray shades is displayed, a phenomenon of gray shade inversion is not observed.

Other liquid crystal display panels are also known which function based on the same principle as that of the above-mentioned liquid crystal display panel and which can be fabricated by smaller number of steps than that of the above-mentioned liquid crystal display panel. Such liquid crystal display panels are described in "SID '92 Digest of U.S.A., p. 798", "Japan Display '92 Digest, p. 591", "SID '93 Digest of U.S.A., p. 269", and the like.

In these examples, as in the first example, with respect to alignment of molecules of the liquid crystal material in each of the divided domains, direction of twist of a spiral is the same, but an angle to the substrate surface differs from each other. However, these liquid crystal display panels differ from the first example in a direction of aligning force applied to molecules of the liquid crystal material at the surface of the substrate and magnitude of angle of the aligning force.

In order to clarify the difference between these examples and the first example, perspective plan views and cross sectional views for each of these examples. The perspective plan views show directions of rubbing and directions of twist of alignment of liquid crystal molecules between upper and lower substrates. The cross sectional views show directions of rising up of the alignment force at the surface of the substrate and directions of rising up of alignment of liquid crystal between the upper and lower substrates caused by an electric field.

FIG. 33 is a plan perspective view showing directions of rubbing and directions of twist of alignment of liquid crystal molecules between upper and lower substrates, in the prior art example shown in "SID '92 Digest of U.S.A., p. 798". FIG. 34 is a cross sectional view taken on line c-c' of FIG. 33, and shows directions of rise of the aligning force at the surface of the substrate and directions of rise of alignment of liquid crystal molecules between the upper and lower substrates caused by an electric field.

An explanation will be made on the liquid crystal display element shown in FIG. 33 and FIG. 34. In the plan perspective view of FIG. 33, there are shown a divided domain X131, a divided domain Y132, a rubbing direction 1311 in the domain X on an upper glass substrate, a rubbing direction 1312 in the domain X on a lower glass substrate, a rubbing direction 1321 in the domain Y on the upper glass substrate, a rubbing direction 1322 in the domain Y on the lower glass substrate, and twist angle 127 of the liquid crystal alignment. Also, in the cross sectional view of FIG. 34, there are shown the upper glass substrate 121, the lower glass substrate 122, the divided domain X131, the divided domain Y132, liquid crystal material 105, direction 106a of rise of alignment of liquid crystal molecules caused by an electric field in the domain X, and direction 106b of rise of alignment of liquid crystal molecules caused by an electric field in the domain Y.

In this example, rubbing direction of the upper substrate is one direction, i.e., the same direction, in both of the divided domains, and rubbing direction of the lower substrate is one direction, i.e., the same direction, in both of the divided domains. However, materials of the upper and lower substrates are changed between the domain X and the domain Y. Therefore, as shown in FIG. 34, in the domain X131, the angle of liquid crystal molecules from the surface of the lower substrate 122 is higher (larger) than the angle of liquid crystal molecules from the surface of the upper substrate 121. In the domain Y132, the angle of liquid crystal molecules from the surface of the lower substrate 122 is lower (smaller) than the angle of liquid crystal molecules from the surface of the upper substrate 121. Therefore, in the domain X131, the direction 106a of rise of liquid crystal alignment caused by an electric field becomes a direction of aligning force at the lower glass substrate 122, when a voltage is applied to this liquid crystal display element. In this case, in the domain Y132, the direction 106b of rise of liquid crystal alignment caused by an electric field becomes a direction of aligning force at the upper glass substrate 121.

FIG. 35 is a plan perspective view showing directions of rubbing and directions of twist of alignment of liquid crystal molecules between upper and lower substrates, in the prior art example shown in "Japan Display '92 Digest, p. 591". FIG. 36 is a cross sectional view taken on line d-d' of FIG. 35, and shows directions of rise of the aligning force at the surface of the substrate and directions of rise of alignment of liquid crystal molecules between the upper and lower substrates caused by an electric field.

An explanation will be made on the liquid crystal display element shown in FIG. 35 and FIG. 36. In the plan perspective view of FIG. 35, there are shown a divided domain X131, a divided domain Y132, a rubbing direction 1311 in the domain X on an upper glass substrate, a rubbing direction 1312 in the domain X on a lower glass substrate, a rubbing direction 1321 in the domain Y on the upper glass substrate, a rubbing direction 1322 in the domain Y on the lower glass substrate, and twist angle 127 of the liquid crystal alignment. Also, in the cross sectional view of FIG. 36, there are shown the upper glass substrate 121, the lower glass substrate 122, the divided domain X131, the divided domain Y132, liquid crystal material 105, direction 106 of rise of alignment of liquid crystal molecules caused by an electric field.

In this example, rubbing direction of the upper substrate is one direction, i.e., the same direction, in both of the divided domains, and rubbing directions of the lower substrate have two different directions. Also, as shown in FIG. 36, in both the domain X131 and the domain Y132, the angle of liquid crystal molecules from the surface of the lower substrate 122 is higher (larger) than the angle of liquid crystal molecules from the surface of the upper substrate 121. However, in the lower glass substrate 122, directions of aligning force differ between the domain X131 and the domain Y132. Therefore, in both the domain X131 and the domain Y132, the direction 106 of rise of alignment of liquid crystal molecules caused by an electric field becomes a direction of aligning force at the lower glass substrate 122, when a voltage is applied to this liquid crystal display element.

FIG. 37 is a plan perspective view showing directions of rubbing and directions of twist of alignment of liquid crystal molecules between upper and lower substrates, in the prior art example shown in "SID '93 Digest of U.S.A., p. 269". FIG. 38 is a cross sectional view taken on line e-e' of FIG. 37, and shows directions of rise of the aligning force at the surface of the substrate and directions of rise of alignment of liquid crystal molecules between the upper and lower substrates caused by an electric field.

An explanation will be made on the liquid crystal display element shown in FIG. 37 and FIG. 38. In the plan perspective view of FIG. 37, there are shown a divided domain X131, a divided domain Y132, a rubbing direction 1311 in the domain X on an upper glass substrate, a rubbing direction 1312 in the domain X on a lower glass substrate, a rubbing direction 1321 in the domain Y on the upper glass substrate, a rubbing direction 1322 in the domain Y on the lower glass substrate, and twist angle 127 of the liquid crystal alignment. Also, in the cross sectional view of FIG. 38, there are shown the upper glass substrate 121, the lower glass substrate 122, the divided domain X131, the divided domain Y132, liquid crystal material 105, direction 106 of rise of alignment of liquid crystal molecules caused by an electric field.

In this example, rubbing direction of the upper substrate is one direction, i.e., the same direction, in both of the divided domains, and rubbing direction of the lower substrate is also one direction, i.e., the same direction, in both of the divided domains. Also, in both the domain X131 and the domain Y132, the angle of liquid crystal molecules from the surface of the lower substrate 122 is the same as the angle of liquid crystal molecules from the surface of the upper substrate 121. However, in each of the domain X131 and the domain Y132, directions of aligning force differ between the upper substrate 121 and the lower substrate 122. When no voltage is applied to this liquid crystal display element, alignment of liquid crystal molecules at the central portion is held horizontal. When a voltage is applied to this liquid crystal display element, the direction 106 of rise of alignment of liquid crystal molecules is determined by electric field having slant directions as shown in FIG. 38.

In these three prior art examples, by adopting structural improvement as shown in FIG. 33 through FIG. 38, the number of process steps is decreased from that of the above-mentioned prior art. In any of these methods, as shown in FIG. 34, FIG. 36 and FIG. 38, when a voltage is applied, directions of rise of liquid crystal molecules differ from each other in respective domains. Therefore, when light is irradiated from a direction slanted from the normal of the substrate, optical characteristics of both regions are mutually compensated. As a result thereof, viewing angle dependency in the condition a voltage is applied is mutually compensated between regions having different alignments in each pixel between the upper and lower substrates, so that optical characteristics having reduced viewing angle dependency.

On the other hand, there is a commonly known thin film transistor (TFT) type liquid crystal display which uses usual twisted nematic (TN) type liquid crystal display mode. Also, among such commonly known liquid crystal display, there is a liquid crystal display in which liquid crystal alignment is controlled by forming a slit or slits in a pixel electrode of an opposing substrate. Such liquid crystal display is disclosed in Conference Record of the 1991 International Display Research Conference, p. 239 and an explanation will be made on such liquid crystal display.

FIG. 39, which corresponds to FIG. 1(b) of the above-mentioned document, shows a cross sectional view of a part, i.e., one pixel, of the liquid crystal display disclosed in the above-mentioned document. FIG. 40, which corresponds to FIG. 7(a) of the above-mentioned document, illustrates electric field in lateral direction in such liquid crystal display. Also, FIG. 41, which corresponds to FIG. 1(a) of the above-mentioned document, shows a cross sectional view of a part, i.e., one pixel, of the commonly known liquid crystal display which uses usual TN type liquid crystal display mode. FIG. 29, which corresponds to FIG. 7(b) of the above-mentioned document, illustrates electric field in such liquid crystal display.

First, an explanation will be made on the liquid crystal display shown in FIG. 39 and FIG. 40. In the cross sectional view of FIG. 39, there are shown an upper glass substrate 221, a lower glass substrate 222, a signal electrode line 215, a lower transparent electrode, that is, a pixel electrode, 220, an upper transparent electrode, that is, an opposing electrode 219, a black mask 231, a color layer 232, an overcoat 233, a lower silicon nitride film 204, and an upper silicon nitride film 241.

On the upper glass substrate 221, there are disposed, on the side facing toward the lower glass substrate 222, the black mask 231 for shutting out the light, the color layer 232 for passing the light of predetermined color, the overcoat 233 for protecting the black mask 231 and the color layer 232, and the opposing electrode 219.

On the lower glass substrate 222, there are disposed, on the side facing toward the upper glass substrate 221, the signal electrode line 215, the lower silicon nitride film 204 for covering the lower glass substrate 222 and the signal electrode line 215, the pixel electrode 220 formed on the lower silicon nitride film 204, and the upper silicon nitride film 241 covering whole portion on the lower glass substrate 222.

In FIG. 40, electric field 202 is shown by arrows which is produced when a voltage is applied to the liquid crystal display element having the structure shown in FIG. 39.

Next, an explanation will be made on the commonly known TN type liquid crystal display element shown in FIG. 41 and FIG. 42. In the cross sectional view of FIG. 41, there are shown an upper glass substrate 221, a lower glass substrate 222, a signal electrode line 215, a lower transparent electrode, that is, a pixel electrode, 220, an upper transparent electrode, that is, an opposing electrode 229, a black mask 231, a color layer 232, an overcoat 233, a lower silicon nitride film 204, and an upper silicon nitride film 241.

On the upper glass substrate 221, there are disposed, on the side facing toward the lower glass substrate 222, the black mask 231 for shutting out the light, the color layer 232 for passing the light of predetermined color, the overcoat 233 for protecting the black mask 231 and the color layer 232, and the opposing electrode 229.

On the lower glass substrate 222, there are disposed, on the side facing toward the upper glass substrate 221, the signal electrode line 215, the lower silicon nitride film 204 for covering the lower glass substrate 222 and the signal electrode line 215, the pixel electrode 220 formed on the lower silicon nitride film 204, and the upper silicon nitride film 241 covering whole portion on the lower glass substrate 222.

In FIG. 42, electric field 202 is shown by arrows which is produced when a voltage is applied to the liquid crystal display element having the structure shown in FIG. 41.

In the prior art liquid crystal display element shown in FIG. 39 and FIG. 40, disturbance of liquid crystal alignment, which is called disclination and which is caused by lateral electric field produced between a pixel electrode and a wiring electrode such as a scanning electrode line, a signal electrode line and the like, can be reduced.

Here, the first problem in the above-mentioned prior art liquid crystal display element is that disturbance of alignment which is called disclination and which is caused by lateral electric field between the wiring electrode and the pixel electrode. This is because, potential of the wiring electrode such as the scanning electrode line, the signal electrode line and the like gives large influence on the electric field. Thereby, relatively large lateral electric field is produced and liquid crystal alignment is changed by such lateral electric field. In order to reduce the disclination, it was necessary to provide a slit in the opposing electrode by patterning it.

The second problem in the above-mentioned prior art liquid crystal display element is that, when pressure is applied from the outside to the liquid crystal display panel having such liquid crystal display element by pressing the panel by a finger or by a pen point, alignment of liquid crystal molecules is easily disturbed, or alignment division collapses or becomes defective.

This is because, the prior art liquid crystal display panel does not have sufficient mechanical strength and cell gap of the liquid crystal display panel changes easily by the pressure applied thereto, so that alignment of the liquid crystal molecules is changed.

Also, it is impossible to easily and simply realize division of a pixel region into a plurality of domains having different alignment to obtain a wide viewing angle.

There are other Japanese patent applications each relating to realizing a wide viewing angle in a liquid crystal display.

One of such applications is Japanese patent laid-open publication No. 7-104282 and entitled "Liquid Crystal Display and Method of Manufacturing the Same". This application provides a liquid crystal display and a method of manufacturing the same in which a liquid crystal portion is divided or partitioned by high polymer material into a plurality of liquid crystal regions, and in which liquid crystal molecules or high polymer material in the liquid crystal regions are driven to various modes depending on the alignment condition, or to a mode in which the liquid crystal region is aligned into symmetry with respect to an axis.

This liquid crystal display comprises a plurality of liquid crystal regions each of which has an electrode, is disposed between a pair of substrates, at least one of the substrates being transparent, and is surrounded by the high polymer material. This liquid crystal display also comprises a light control layer which is disposed between the surface of at least one substrate and an electrode formed on the substrate, which controls an intensity of incident light by changing transmittance and which has locally different film thickness. Also, the space between the electrodes on respective surfaces of the pair of substrates varies corresponding to the change of the film thickness of the light control layer. By such structure, mechanical strength is improved, and also viewing characteristic, contrast and color reproductivity are improved.

Another one of such applications is Japanese patent laid-open publication No. 7-333612 and entitled "Liquid Crystal Display Device". This application provides a liquid crystal display device having a wide viewing angle by averaging angle dependency of optical transmittance. The liquid crystal display device disclosed in this application has a pair of opposing substrates each of which comprises a transparent electrode formed on the surface thereof and an alignment film formed on the transparent electrode, and a liquid crystal layer of liquid crystal molecules filling the space between the substrates. When a voltage is not applied to the transparent electrodes, in a plane perpendicular to the direction of the thickness of the liquid crystal layer, there are a first liquid crystal domain in which direction of alignment of liquid crystal molecules is approximately constant and a second liquid crystal domain in which direction of alignment of liquid crystal molecules differs from that of the first liquid crystal domain. These two liquid crystal domains are realized by providing uneven portions at alignment layer formed on at least one of the substrate.

In a conventional liquid crystal display of a twisted nematic (hereafter referred to as "TN") type which is widely used, when an electric field is not applied to liquid crystal molecules, a direction of an alignment vector of the liquid crystal molecules is parallel to a surface of a substrate and this condition corresponds to the condition in which "white" is displayed. When a voltage is applied to the liquid crystal display, the direction of the alignment vector varies toward a direction of an electric field according to a voltage applied. Thereby, the condition in which "white" is displayed is gradually changed to the condition in which "black" is displayed.

However, because of behavior peculiar to liquid crystal molecules in a condition a voltage is applied, there occurs a problem that the TN type liquid crystal display has a narrow viewing angle. This problem of narrow viewing angle is prominent in a direction toward which liquid crystal molecules rise when medium gray is displayed.

As a method of improving viewing angle characteristics, there are proposed some liquid crystal displays disclosed in Japanese patent laid-open publication No. 4-261522, Japanese patent laid-open publication No. 6-43461 and Japanese patent laid-open publication No. 10-333180.

In these liquid crystal displays, viewing angle characteristics are improved by using a structure shown in FIG. 44A, FIG. 44B and FIG. 44C. A liquid crystal display panel of the structure shown in these drawings comprises an upper substrate having a color filter substrate 501 and having a common electrode 502 and an alignment layer 503 which are formed on the color filter substrate and which have a slit 517 formed in the common electrode 502 and the alignment layer 503. Also, there is provided a lower substrate having a substrate 507, a pixel electrode 504 formed on the substrate 507 and an alignment layer 503 formed on the pixel electrode 504. A space between the upper substrate and the lower substrate is filled with liquid crystal molecules 508 which are homeotropic aligned and which form a liquid crystal layer. The liquid crystal display panel shown in FIG. 44A, FIG. 44B and FIG. 44C is put between a pair of polarizers disposed such that polarizing axes or transmission axes of these polarizers have right angles with each other. When a voltage is applied between the common electrode 502 and the pixel electrode 504, an electric field having slant components is produced. Therefore, more than one liquid crystal domains having different alignment directions are produced in each pixel, and thereby viewing angle characteristics are improved. The shape of the slit can be, for example, a rectangle as shown in FIG. 44B, or can be x-shape as shown in FIG. 44C.

In the liquid crystal display disclosed in Japanese patent laid-open publication No. 4-261522, directions of inclination of liquid crystal molecules when an electric field is applied thereto are controlled to obtain a high contrast ratio. Also, as disclosed in Japanese patent laid-open publication No. 6-43461, it is possible to use an optical compensation film to improve viewing angle characteristics of black area.

Further, in Japanese patent laid-open publication No. 6-43461, not only in a liquid crystal display panel having homeotropic alignment, but also in a liquid crystal display panel having TN alignment, each pixel is divided into more than one domains by using an electric field having slant and different components to improve viewing angle characteristics.

In Japanese patent laid-open publication No. 10-333180, a technology is disclosed in which thin film transistors, gate lines and drain lines are disposed under display electrodes, in order to prevent an electric field from the thin film transistors, the gate lines and the drain lines from affecting slant electric field components produced by using a common electrode having opening portions.

In Japanese patent laid-open publication No. 10-20323, there is disclosed a liquid crystal display in which more than one kind of minute domains coexist in a liquid crystal layer. One of substrates of liquid crystal display panel of this liquid crystal display has opening portions, and there is provided a second electrode in each of the opening portions. A voltage is applied to the second electrode to produce an electric field having slant components. Thereby, domains having different alignment directions are produced in each pixel and wide viewing angle characteristics are obtained. This publication mainly concerns a liquid crystal display having TN type cell.

Japanese PCT patent laid-open publication No. 5-505247 discloses a liquid crystal display of In-Plain-Switching (IPS) system or mode in which, in order to rotate liquid crystal molecules while keeping the liquid crystal molecules in a direction parallel to substrates of liquid crystal display panel, two electrodes are disposed on one of the substrates. A voltage is applied to between the two electrodes and, thereby, an electric field parallel to the substrates is produced. In such IPS system, a long axis of each of liquid crystal molecules does not rise from the substrate when the voltage is applied. Therefore, when a viewing angle is changed, variation of birefringence or double refraction of liquid crystal is relatively small and, therefore, wide viewing angle characteristics are obtained.

Also, in each of "Journal of Applied Physics", Vol. 45, No. 12 (1974) 5466 and Japanese patent laid-open publication No. 10-186351, there is disclosed a liquid crystal display which has the above-mentioned IPS mode and in which liquid crystal molecules having a positive anisotropy of permittivity are aligned as homeotropic alignment. The liquid crystal molecules are rotated toward a direction parallel to the substrate by using an electric field parallel to the substrate. In this case, because of directions of the electric field, the liquid crystal molecules which are homeotropic aligned are grouped into two domains. The two domains have different alignment directions of liquid crystal molecules and, therefore, it is possible to obtain a liquid crystal display having wide viewing angle characteristics.

Japanese patent laid-open publication No. 10-186330 proposes a liquid crystal display in which square wall structures are produced by using a photosensitive material, and a pixel is formed by using each of such structures as a basic unit. When a voltage is applied to produce an electric field, liquid crystal molecules having a negative anisotropy of permittivity are rotated toward different directions in a pixel.

However, in the above-mentioned technology in which slits are provided in the common electrode, it is necessary to perform a microfabrication process, such as photolithography and the like, of the common electrode 502 which is not required in the fabrication process of the usual TN type liquid crystal display. In addition to this, there is a problem that a very precise assemble technology is required for precisely combine the upper substrate 501 and the lower substrate 507. This problem is especially important in an active matrix type liquid crystal display which uses switching elements such as TFT's and the like.

That is, in a usual active matrix type liquid crystal display, active elements such as thin film diodes and the like are formed on one of transparent substrates. Therefore, it is only necessary to perform a microfabrication process, such as photolithography and the like, on one of the substrate on which active elements are formed. It is not necessary to perform such microfabrication process on the other substrate which is usually called a "common electrode", but it is only necessary to form an electrode on whole area of the other substrate.

However, in the above-mentioned prior art technologies, it is also necessary to perform a microfabrication process, such as photolithography and the like, on the "common electrode" on which, usually, it is not necessary to perform such microfabrication process. Therefore, fabrication process becomes complicated, and a high precision alignment and assemble technology is required for the upper substrate 501 and the lower substrate 507.

When the thin film transistors, the gate lines and the drain lines are disposed under the display electrodes, as described in Japanese patent laid-open publication No. 10-333180, an aperture ratio becomes deteriorated.

Also, in the liquid crystal display described in Japanese patent laid-open publication No. 10-20323, it is necessary to apply a voltage to each of second electrodes when driving the liquid crystal display and, therefore, a special drive technology is required. Further, an additional process is required in which a voltage is applied to the second electrodes in order to obtain divided alignment directions.

In the IPS type liquid crystal display and in the liquid crystal display in which vertically aligned liquid crystal molecules are rotated down by using the lateral electric field, there is a problem that an aperture ratio is deteriorated. Also, in these liquid crystal displays, when a cell gap of each pixel is narrowed to obtain high operating speed, a high drive voltage is required.

In the IPS type liquid crystal display and in the liquid crystal display in which vertically aligned liquid crystal molecules are rotated down by using the lateral electric field, there is still another problem as follows. That is, in such prior art liquid crystal displays, since a color filter layer is disposed between a layer in which liquid crystal molecules are disposed and an opposing substrate, especially when switching elements are formed by using a TFT structure, an electric field produced by applying a voltage between the source electrode and the common electrode affects the color filter layer, and deteriorates display characteristics.

That is, in coloring matter constituting the color filter layer, sodium ions are included as impurities. Therefore, when an electric field is applied to the color filter, electric charges are stored in the color filter layer and the color filter layer is charged up. If the color filter layer is charged up, an unnecessary electric field is always applied to the liquid crystal molecules under the charged up portion of the color filter layer. Therefore, such electric field affects display characteristics, especially color irregularity.

In the liquid crystal display which has square walls disclosed in Japanese patent laid-open publication No. 10-186330, it is necessary to fabricate the walls by using photolithography, in order to realize divided alignment directions. Therefore, a manufacturing process becomes complicated.

SUMMARY OF THE INVENTION

Therefore, it is an object of the present invention to provide a liquid crystal display having superior viewing angle characteristics.

It is another object of the present invention to provide a liquid crystal display in which disturbance of alignment of liquid crystal molecules such as disclination and the like caused by a lateral electric field does not occur.

It is still another object of the present invention to provide a liquid crystal display in which disturbance of divided alignment directions is not caused by external force applied to the liquid crystal panel of the liquid crystal display.

It is still another object of the present invention to provide a domain divided liquid crystal display which has domains of different alignment directions in each pixel and which has wide viewing angle characteristics.

It is still another object of the present invention to provide a liquid crystal display which has a high contrast ratio and superior viewing angle characteristics and which can be easily fabricated by using a simple manufacturing process.

It is still another object of the present invention to provide a liquid crystal display which has a high contrast ratio and superior viewing angle characteristics and which can be easily fabricated without using additional complicated process such as photolithography and the like and without requiring high precision assembling technology.

It is still another object of the present invention to provide a liquid crystal display which has a high contrast ratio and superior viewing angle characteristics and in which color irregularity can be effectively suppressed.

It is still another object of the present invention to provide a method of manufacturing a liquid crystal display which has various characteristic features mentioned above, such as superior viewing angle characteristics and the like.

It is still another object of the present invention to provide a method of driving a liquid crystal display which can effectively realize superior viewing angle characteristics and the like of the present invention.

It is still another object of the present invention to obviate the disadvantages of the conventional liquid crystal display.

According to an aspect of the present invention, there is provided a liquid crystal display comprising: an upper substrate and a lower substrate, wherein at least one of the upper substrate and lower substrate is a transparent substrate; an upper electrode disposed on the surface of the upper substrate which surface of the upper substrate opposes to the lower substrate, and a lower electrode disposed on the surface of the lower substrate which surface of the lower substrate opposes to the upper substrate, wherein at least one of the upper electrode and lower electrode disposed on the transparent substrate is transparent; a liquid crystal material disposed between the upper electrode and the lower electrode; a scanning electrode line and a signal electrode line disposed on the surface of the lower substrate which surface of the lower substrate opposes to the upper substrate; a switching element for controlling application of a voltages to the lower electrode, wherein the application of a voltage to the lower electrode by the switching element is controlled by application of voltages to the scanning electrode line and the signal electrode line; and a conductive protrusion disposed on the surface of the upper substrate which surface of the upper substrate opposes to the lower substrate, wherein the conductive protrusion is disposed over the scanning electrode line or the signal electrode line and has the same potential as that of the upper electrode.

In this case, it is preferable that the conductive protrusion comprises: a protruded portion disposed on the surface of the upper substrate which surface of the upper substrate opposes to the lower substrate, the protruded portion being disposed over the scanning electrode line or the signal electrode line; and a part of the upper electrode covering the protruded portion.

It is also preferable that the upper substrate is an upper transparent substrate and the conductive protrusion comprises: a protruded portion disposed on the surface of the upper transparent substrate which surface of the upper substrate opposes to the lower substrate, the protruded portion being disposed over the scanning electrode line or the signal electrode line; and a part of the upper transparent electrode covering a side surface of the protruded portion.

It is further preferable that the protruded portion comprises color filter layers or transparent resin layers which are piled on the surface, of the upper transparent substrate opposing to the lower substrate.

It is advantageous that the width of the conductive protrusion is substantially equal to or larger than the width of the scanning electrode line or the signal electrode line.

It is also advantageous that the liquid crystal display further comprises a lower insulating film which covers the scanning electrode line and the signal electrode line and which contacts with the conductive protrusion.

It is further advantageous that at least one of the upper electrode and the lower electrode further comprises a projection which is different from the conductive protrusion and which is used for dividing alignment of the liquid crystal material.

It is preferable that at least one of the upper electrode and the lower electrode further comprises a nonconductive opening portion which is used for dividing alignment of the liquid crystal material.

It is also preferable that the conductive protrusion is electrically coupled with the scanning electrode line or the signal electrode line.

It is further preferable that the liquid crystal display further comprises a conductive contact portion disposed on the scanning electrode line or the signal electrode line, wherein the conductive protrusion and the conductive contact portion contact with each other.

It is advantageous that the liquid crystal display further comprises spacers dispersed in a space between the upper substrate and the lower substrate.

It is also advantageous that: the liquid crystal display has a plurality of pixel areas surrounded by the scanning electrode lines and signal electrode lines; the lower electrode comprises a plurality of pixel electrodes each corresponding to the pixel area; each of the pixel area has a predetermined symmetry center point; and the conductive protrusions are disposed centrosymmetrically with respect to the symmetry center point.

It is further advantageous that the symmetry center point is substantially in the center of a corresponding pixel area.

It is preferable that, in each of the pixel area, at least one of the upper electrode and the pixel electrode further comprises a projection which is different from the conductive protrusion and which is used for dividing alignment of the liquid crystal material, and wherein the projection is disposed on a predetermined line which substantially passes the symmetry center point.

It is also preferable that at least one of the upper electrode and the lower electrode further comprises a nonconductive opening portion which is used for dividing alignment of the liquid crystal material, and wherein the nonconductive opening portion is disposed on a predetermined line which substantially passes the symmetry center point.

It is further preferable that: the liquid crystal display has a plurality of pixel areas surrounded by the scanning electrode lines and signal electrode lines; the lower electrode comprises a plurality of pixel electrodes each corresponding to the pixel area; each of the pixel area has a predetermined symmetry center line; and the conductive protrusions are disposed symmetrically with respect to the symmetry center line.

It is advantageous that the symmetry center line is substantially passes the center of a corresponding pixel area.

It is also advantageous that, in each of the pixel area, at least one of the upper electrode and the pixel electrode further comprises a projection which is different from the conductive protrusion and which is used for dividing alignment of the liquid crystal material, and wherein the projection is disposed substantially on the symmetry center line.

It is further advantageous that at least one of the upper electrode and the lower electrode further comprises a nonconductive opening portion which is used for dividing alignment of the liquid crystal material, and wherein the nonconductive opening portion is disposed substantially on the symmetry center line.

It is preferable that the liquid crystal material is a nematic liquid crystal material, a cholesteric liquid crystal material, or a discotic liquid crystal material.

It is also preferable that an operation mode of the liquid crystal material is twisted nematic, STN super twisted nematic, homogeneous, homeotropic, in-plain switching, π-cell, cholesteric phase transition, polymer dispersion, or polymer network.

According to another aspect of the present invention, there is provided a method of manufacturing a liquid crystal display comprising: (a) forming a wiring electrode line on the surface of a lower substrate which surface of the lower substrate opposes to an upper substrate, forming an insulating film covering the wiring electrode line, forming a lower electrode on the insulating film, and forming a switching element for applying a voltage to the lower electrode; (b) forming a protruded portion on the surface of the upper substrate which surface of the upper substrate opposes to the lower substrate, wherein the protruded portion is located substantially just above the wiring electrode line when the lower substrate and the upper substrate are opposed to each other; (c) forming an upper electrode covering whole portion of the protruded portion and the surface of the upper substrate which surface of the upper substrate opposes to the lower substrate, wherein at least one of the upper substrate and the lower substrate is a transparent substrate, and at least one of the upper electrode and lower electrode disposed on the transparent substrate is transparent; (d) opposing the lower substrate and the upper substrate such that the protruded portion is located substantially just above the wiring electrode line; and (e) injecting a liquid crystal material between the lower substrate and upper substrate.

In this case, it is preferable that the step (b) comprises forming the protruded portion by piling a plurality of color filters on the surface of the upper substrate which surface of the upper substrate opposes to the lower substrate.

It is also preferable that the step (b) comprises piling a plurality of transparent resin layers on the surface of the upper substrate which surface of the upper substrate opposes to the lower substrate and removing piled transparent resin layers except portions corresponding to the protruded portions.

It is further preferable that the width of the protruded portion is substantially equal to or larger than the width of the wiring electrode line.

It is advantageous that the method further comprises: (f) forming a projection which is different from the protruded portion on at least one of the upper electrode and the lower electrode.

It is also advantageous that the method further comprises: (g) removing a portion of at least one of the upper electrode and the lower electrode.

It is further advantageous that the method further comprises: (h) forming a conductive contact portion on the wiring electrode line, the conductive contact portion being electrically coupled with the wiring electrode line; wherein the step (d) further comprises disposing the conductive contact portion and the upper electrode covering the protruded portion such that the conductive contact portion and the upper electrode covering the protruded portion contact with each other.

According to still another aspect of the present invention, there is provided a method of manufacturing a liquid crystal display having a plurality of pixel areas, the method comprising: (a) forming wiring electrode lines on the surface of a lower substrate which surface of the lower substrate opposes to an upper substrate such that the wiring electrode lines surround respective pixel areas, forming an insulating film covering the wiring electrode lines, forming, for each pixel area, a pixel electrode which does not coupled with the wiring electrode line, and forming a switching element for controlling an application of a voltage to the pixel electrode; (b) forming protruded portions on the surface of the upper substrate which surface of the upper substrate opposes to the lower substrate, wherein the protruded portions are located at portions centrosymmetrical with respect to a predetermined symmetry center point in each pixel area, and are located substantially just above the wiring electrode lines when the lower substrate and the upper substrate are opposed to each other; (c) forming an upper electrode covering whole portion of the protruded portions and the surface of the upper substrate which surface of the upper substrate opposes to the lower substrate; (d) opposing the lower substrate and the upper substrate such that the protruded portions are located substantially just above the wiring electrode lines and such that each of the pixel areas is formed; and (e) injecting a liquid crystal material between the lower substrate and upper substrate.

In this case, it is preferable that the symmetry center point is substantially in the center of a corresponding pixel area.

It is also preferable that the method further comprises: (f) forming a projection which is different from the protruded portion on the surface of the upper substrate which surface of the upper substrate opposes to the lower substrate; wherein the step (c) comprises forming an upper transparent electrode covering the surface of the upper substrate which surface of the upper substrate opposes to the lower substrate, the protruded portion and the projection.

It is further preferable that the step (f) comprises forming a projection which is different from the protruded portion on the surface of the upper substrate which surface of the upper substrate opposes to the lower substrate such that the projection is located on a predetermined line substantially passing through the symmetry center point.

It is advantageous that the method further comprises: (g) removing a portion of the upper electrode except the protruded portion.

It is also advantageous that the step (g) comprises removing the upper electrode existing on a predetermined line substantially passing through the symmetry center point.

It is further advantageous that the method further comprises: (h) removing a portion of the lower electrode.

It is preferable that the step (h) comprises removing the lower electrode existing on a predetermined line substantially passing through the symmetry center point.

According still another aspect of the present invention, there is provided a method of manufacturing a liquid crystal display having a plurality of pixel areas, the method comprising: (a) forming wiring electrode lines on the surface of a lower substrate which surface of the lower substrate opposes to an upper substrate such that the wiring electrode lines surround respective pixel areas, forming an insulating film covering the wiring electrode lines, forming, for each pixel area, a pixel electrode which does not coupled with the wiring electrode line, and forming a switching element for controlling an application of a voltage to the pixel electrode; (b) forming protruded portions on the surface of the upper substrate which surface of the upper substrate opposes to the lower substrate, wherein the protruded portions are located at portions symmetrical with respect to a predetermined symmetry center line in each pixel area and are located substantially just above the wiring electrode lines when the lower substrate and the upper substrate are opposed to each other;

(c) forming an upper electrode covering whole portion of the protruded portions and the surface of the upper substrate which surface of the upper substrate opposes to the lower substrate; (d) opposing the lower substrate and the upper substrate such that the protruded portions are located substantially just above the wiring electrode lines and such that each of the pixel areas is formed; and (e) injecting a liquid crystal material between the lower substrate and upper substrate.

In this case, it is preferable that the symmetry center line is substantially in the center of a corresponding pixel area.

It is also preferable that the method further comprises: (f) forming a projection which is different from the protruded portion on the surface of the upper substrate which surface of the upper substrate opposes to the lower substrate; wherein the step (c) comprises forming an upper transparent electrode covering the surface of the upper substrate which surface of the upper substrate opposes to the lower substrate, the protruded portion and the projection.

It is further preferable that the step (f) comprises forming a projection which is different from the protruded portion on the surface of the upper substrate which surface of the upper substrate opposes to the lower substrate such that the projection is substantially located on the symmetry center line.

It is advantageous that the method further comprises: (g) removing a portion of the upper electrode except the protruded portion.

It is also advantageous that the step (g) comprises removing the upper electrode substantially existing on the symmetry center line.

It is further advantageous that the method further comprises: (h) removing a portion of the lower electrode.

It is preferable that the step (h) comprises removing the lower electrode substantially existing on the symmetry center line.

It is also preferable that the method further comprises forming spacers dispersed in a space between the upper substrate and the lower substrate.

It is further preferable that the liquid crystal material is a nematic liquid crystal material, a cholesteric liquid crystal material, or a discotic liquid crystal material.

It is advantageous that an operation mode of the liquid crystal material is twisted nematic, STN super twisted nematic, homogeneous, homeotropic, in-plain switching, π-cell, cholesteric phase transition, polymer dispersion, or polymer network.

According to still another aspect of the present invention, there is provided a liquid crystal display comprising: a first substrate having a common electrode formed thereon; a second substrate opposed to the first substrate and having a plurality of pixel electrodes formed thereon; and a liquid crystal layer disposed between the first and second substrates; wherein each of the pixel electrodes has a smaller area than that of the common electrode and is covered by the common electrode, and each of the pixel electrode comprises an electrode portion having approximately symmetrical shape.

In this case, it is preferable that the shape of the electrode portion of the pixel electrode is a circle, an ellipse or a polygon.

It is also preferable that each of the pixel electrode is formed as a link of a plurality of electrode areas each having approximately symmetrical shape, and each of the pixel electrodes has a smaller area than that of the common electrode and is covered by the common electrode.

It is further preferable that the common electrode is formed on approximately whole area of the first substrate.

It is advantageous that the liquid crystal display further comprises a shield electrode formed around the pixel electrode.

It is also advantageous that, on the first substrate, there is formed a common electrode for applying a reference potential over a plurality of pixels, and, on the second substrate, there are formed a plurality of scanning signal electrodes, a plurality of image signal electrodes which cross the scanning signal electrodes to form a matrix, and a plurality of thin film transistors each formed corresponding an intersection of the scanning signal electrode and the image signal electrode; wherein at least one pixel is formed in each of areas surrounded by the a plurality of scanning signal electrodes and the a plurality of image signal electrode, and each pixel comprises a pixel electrode coupled with the thin film transistor corresponding to the pixel; and wherein the pixel electrode is isolated via an interlayer insulating film from the scanning signal electrode, the image signal electrode and the thin film transistor.

It is further advantageous that, on the first substrate, there is formed a common electrode for applying a reference potential over a plurality of pixels, and, on the second substrate, there are formed a plurality of scanning signal electrodes, a plurality of image signal electrodes which cross the scanning signal electrodes to form a matrix, and a plurality of thin film transistors each formed corresponding to an intersection of the scanning signal electrode and the image signal electrode; wherein at least one pixel is formed in each of areas surrounded by the plurality of scanning signal electrodes and the plurality of image signal electrode, and each pixel comprises a pixel electrode coupled with the thin film transistor corresponding to the pixel; wherein the pixel electrode is isolated via an interlayer insulating film from the scanning signal electrode, the image signal electrode and the thin film transistor; and wherein, on at least one of the scanning signal electrode and the image signal electrode, there is disposed a portion of the pixel electrode or a shielding electrode.

It is preferable that the liquid crystal display further comprises a color filter layer disposed on the second substrate, wherein the liquid crystal layer being disposed between the color filter layer and the first substrate; wherein, on the second substrate, there are formed a plurality of scanning signal electrodes, a plurality of image signal electrodes which cross the scanning signal electrodes to form a matrix, and a plurality of thin film transistors each formed corresponding to an intersection of the scanning signal electrode and the image signal electrode; wherein at least one pixel is formed in each of areas surrounded by the plurality of scanning signal electrodes and the plurality of image signal electrodes, and each pixel comprises a pixel electrode coupled with the thin film transistor corresponding to the pixel; wherein the common electrode on the first substrate provides a reference potential for a plurality of pixels; and wherein the pixel electrode is disposed between the color filter layer and the liquid crystal layer.

It is also preferable that the liquid crystal display further comprises a color filter layer disposed on the second substrate, wherein the liquid crystal layer being disposed between the color filter layer and the first substrate; wherein, on the second substrate, there are formed a plurality of scanning signal electrodes, a plurality of image signal electrodes which cross the scanning signal electrodes to form a matrix, and a plurality of thin film transistors each formed corresponding to an intersection of the scanning signal electrode and the image signal electrode; wherein at least one pixel is formed in each of areas surrounded by the plurality of scanning signal electrodes and the plurality of image signal electrodes, and each pixel comprises a pixel electrode coupled with the thin film transistor corresponding to the pixel; wherein the common electrode on the first substrate provides a reference potential for a plurality of pixels; wherein the pixel electrode is disposed between the color filter layer and the liquid crystal layer; and wherein, on at least one of the scanning signal electrode and the image signal electrode, there is disposed a portion of the pixel electrode or a shielding electrode.

It is further preferable that the electrode portion of the pixel electrode has an approximately symmetrical shape with notches or protrusions extending radially from the center of the approximately symmetrical shape.

It is advantageous that the electrode portion of the pixel electrode has an approximately symmetrical shape with voids in which no electrode material exists and which extend radially from the center of the approximately symmetrical shape.

It is also advantageous that the electrode portion of the pixel electrode has an approximately symmetrical shape with concave portions which extend radially from the center of the approximately symmetrical shape.

It is further advantageous that the concave portions are formed in an interlayer insulating layer or in an overcoating layer.

It is preferable that at least one of an optically negative compensation film and an optically positive compensation film between the first or second substrate and a polarizer, thereby making anisotropy of refractive index of the liquid crystal layer and the compensation film isotropic.

It is also preferable that the liquid crystal layer includes organic polymer compound.

It is further preferable that the liquid crystal layer comprises a liquid crystal material having a negative anisotropy of permittivity, and liquid crystal molecules of the liquid crystal material align approximately perpendicular to the first and second substrates when no voltage is applied thereto.

It is advantageous that a pretilt angle of liquid crystal molecules in the liquid crystal layer is previously provided along a direction toward which the liquid crystal molecules rotate when a voltage is applied thereto.

It is also advantageous that the liquid crystal display further comprises quarter-wave plates on both sides of the liquid crystal layer, and optical axes of the quarter-wave plates are perpendicular to each other.

It is further advantageous that the liquid crystal display further comprises quarter-wave plates on both sides of the liquid crystal layer, and optical axes of the quarter-wave plates are perpendicular to each other.

It is preferable that the liquid crystal layer comprises a liquid crystal material having a positive anisotropy of permittivity, and liquid crystal molecules of the liquid crystal material have a twisted nematic structure when no voltage is applied thereto.

It is also preferable that, in the liquid crystal layer of each pixel, there coexist a plurality of minute domains having different directions of twist of liquid crystal molecules and different directions of rising up of liquid crystal molecules.

It is further preferable that the liquid crystal layer comprises a liquid crystal material having a positive anisotropy of permittivity, and liquid crystal molecules of the liquid crystal material have a homogeneous structure when no voltage is applied thereto.

It is advantageous that, in the liquid crystal layer of each pixel, there coexist a two kinds of minute domains having different directions of rising up of liquid crystal molecules.

It is also advantageous that a pretilt angle of the liquid crystal layer with respect to the first and second substrates is equal to or smaller that 1 (one) degree.

According to still another aspect of the present invention, there is provided a method of manufacturing a liquid crystal display comprising: preparing a first substrate having a common electrode formed thereon and a second substrate opposed to the first substrate and having a plurality of pixel electrodes formed thereon, wherein each of the pixel electrodes has a smaller area than that of the common electrode and is covered by the common electrode, and each of the pixel electrode comprises an electrode portion having approximately symmetrical shape; injecting a liquid crystal material containing liquid crystal molecules and monomer and/or oligomer into a space between the first and second substrates; and polymerizing the monomer and/or oligomer.

In this case, it is preferable that the monomer and/or oligomer is polymerized while irradiating light thereon, thereby a pretilt angle is formed in the liquid crystal molecules.

It is also preferable that the light is irradiated at a slant angle with respect to the substrate.

It is further preferable that the light is polarized light.

It is advantageous that the polarized light is irradiated from a direction approximately perpendicular to the substrate, thereby making a pretilt angle of liquid crystal molecules equal to or smaller than 1 degree.

According to still another aspect of the present invention, there is provided a method of driving the above-mentioned liquid crystal display in which drive voltages having opposite polarity are applied to adjacent pixels.

According to still another aspect of the present invention, there is provided a method of driving the above-mentioned liquid crystal display in which display condition is returned to black display condition before the end of a frame.

According to still another aspect of the present invention, there is provided a method of driving the above-mentioned liquid crystal display in which a voltage near the threshold voltage of liquid crystal molecules is applied before starting a frame.

According to still another aspect of the present invention, there is provided a method of driving the above-mentioned liquid crystal display in which a light shield layer is provided at a portion of each pixel in which leakage of light occurs when a voltage near the threshold voltage of liquid crystal molecules is applied.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which.

DESCRIPTION OF A PREFERRED EMBODIMENT

With reference to the drawings, embodiments of the present invention will now be described.

Embodiment 1

Figure 1:
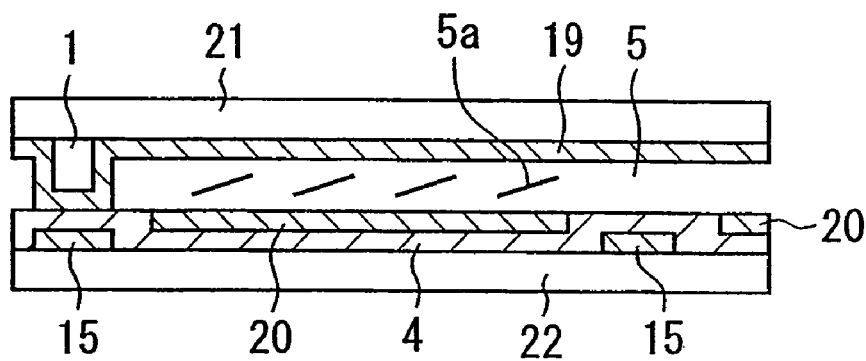
FIG. 1 is a schematic cross sectional view showing a portion including approximately one pixel of a liquid crystal display according to the first embodiment of the present invention.

FIG. 1 illustrates a schematic cross section of a portion including approximately one pixel of a liquid crystal display element according to the first embodiment.

Referring to FIG. 1, an explanation will be made on a structure of the liquid crystal display element according to the first embodiment.

The liquid crystal display element according to the first embodiment comprises a pair of opposing transparent substrates 21 and 22, and liquid crystal material 5 filling the space between the pair of transparent substrates 21 and 22. Here, the pair of opposing transparent substrates 21 and 22 constitute an upper substrate 21 and a lower substrate 22.

The liquid crystal material 5 can be any of nematic liquid crystal material, cholesteric or chiralsmectic liquid crystal material, discotic liquid crystal material.

Operation mode of the liquid crystal material 5 may be any of TN (Twisted Nematic), STN (Super Twisted Nematic), homogeneous, homeotropic, IPS (In-Plain Switching), π-cell or OCB (Optically Compensated Bend), cholesteric phase transition, PDLC (polymer dispersed liquid crystal), polymer network, and the like.

Also, a pretilt angle 51 of the liquid crystal material 5, that is, an angle between liquid crystal molecules and the substrate surface, may be any value.

On a surface of the lower substrate 22 which faces toward the upper substrate 21, there are formed wiring electrodes 15 and an insulating layer 4 and pixel electrodes 20. The wiring electrodes 15 are scanning electrode lines or signal electrode lines. The pixel electrodes 20 are composed of transparent material. The wiring electrodes 15 and the pixel electrodes 20 are mutually insulated or isolated by the insulating layer 4. Also, each pixel includes a switching element not shown in the drawing, and application of a signal voltage to each pixel electrode 20 is performed via the switching element and is controlled by the switching element. As an example of such switching element, there is a TFT (Thin Film Transistor) whose gate electrode is constituted of the scanning electrode line, whose source electrode is coupled with the signal line, and whose drain electrode is coupled with the pixel electrode 20.

On a surface of the upper substrate 21 which faces toward the lower substrate 22, there are formed an opposing electrode 19 and uneven structures 1 such as protrusions or bumps (only one of such uneven structures is shown in FIG. 1). The uneven structure 1 is disposed over the wiring electrode 15. The opposing electrode 19 is made of transparent material. Also, the opposing electrode 19 is formed such that the opposing electrode 19 wholly covers the upper substrate 21 and the uneven structure 1.

Here, it is also possible to dispose the uneven structure 1 on every wiring electrode 15. Also, the uneven structure 1 can be disposed on each one of some wiring electrodes 15. For example, in a liquid crystal display element having three wiring electrodes corresponding to three pixels of red, blue and green, it is possible to dispose one uneven structure 1 on any one of the three wiring electrodes.

In the liquid crystal display element according to this embodiment shown in FIG. 1, a portion of the transparent electrode 19 located under the uneven structure 1 contacts the lower substrate 22. The width of the portion where the transparent electrode 19 and the lower substrate 22 contact each other is wider than the width of the wiring electrode 15. It is also possible for the width of the portion where the transparent electrode 19 and the lower substrate 22 contact each other to be substantially equal to the width of the wiring electrode 15. However, lateral electric field produced in the liquid crystal display device can be more effectively controlled in the structure in which the width of the portion where the transparent electrode 19 and the lower substrate 22 contact each other is wider than the width of the wiring electrode 15 than in the structure in which the width of the portion where the transparent electrode 19 and the lower substrate 22 contact each other is substantially equal to the width of the wiring electrode 15.

Next, an explanation will be made on a method of manufacturing the liquid crystal display element according to the first embodiment.

The wiring electrodes 15 are formed on the lower transparent substrate 22 by using a known method. For example, a chromium (Cr) layer is formed on the lower transparent substrate 22, and the chromium layer thus formed is patterned to form the wiring electrodes 15.

The insulating layer 4 is then formed such that the insulating layer 4 wholly covers the lower transparent substrate 22 including the wiring electrodes 15 formed on the lower substrate 22.

Then, on the insulating film 4 and in each of pixel regions, the pixel electrode, that is, the lower transparent electrode 20 is formed by using a well known method. Also, when the lower transparent electrode is formed, the switching element such as the TFT and the like for applying a signal voltage from the wiring electrode 15 to the lower transparent electrode 20 is formed by using a well known method.

If necessary, it is possible to perform rubbing process on the lower transparent substrate 22 by using a well known method.

The uneven structure, that is, a protrusion, 1 is formed on the upper transparent substrate 21. For example, such protrusion 1 can be formed by using any of methods described below. That is, when a color filter not shown in the drawing is formed on the upper transparent substrate, such color filter is repeatedly formed and stacked in the region where the protrusion 1 is to be formed, thereby the protrusion 1 having a predetermined height is formed. It is also possible to stack transparent resin material in the region where the protrusion 1 is to be formed to obtain the protrusion 1 having a predetermined height. Further, it is possible to form a transparent resin layer having a predetermined thickness on the upper transparent substrate and to pattern the transparent resin layer to leave the protrusion 1 only in the region where the protrusion 1 is to be formed.

The upper transparent electrode 19 is formed which wholly covers the upper transparent substrate 21 and the protrusion 1, by using a well known method.

If necessary, it is possible to perform rubbing process on the upper transparent substrate 21 by using a well known method.

The lower transparent substrate 22 and the upper transparent substrate 21 are disposed such that the lower transparent electrode 20 and the upper transparent electrode 19 are opposed to each other, and both substrates 22 and 21 are coupled and sealed at the peripheral portion thereof.

Lastly, liquid crystal material 5 is injected between the lower transparent substrate 22 and the upper transparent substrate 21 by using a vacuum injection method.

By these process steps mentioned above, the liquid crystal display element according to the first embodiment of the present invention is fabricated.

Now, an operation of the liquid crystal display element according to the first embodiment of the present invention is described.

Figure 2:
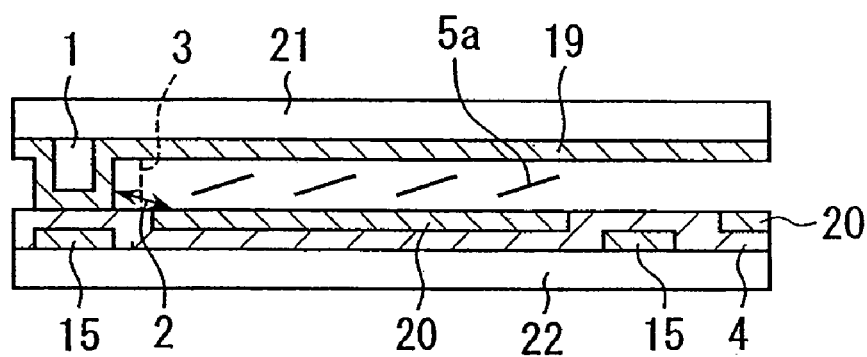
FIG. 2 is a schematic cross sectional view illustrating an operation of the liquid crystal display according to the first embodiment.

FIG. 2 is a cross sectional view used for illustrating an operation of the liquid crystal display element according to the first embodiment. In FIG. 2, an illustration of lateral electric field designated by an arrow 2 and an illustration of a disclination line designated by a dotted line 3 are added to the cross sectional view of FIG. 1. Here, the disclination line 3 is a kind of defect of crystal alignment arising at a boundary between or among a plurality of adjacent domains having different alignment of liquid crystal molecules. As can be seen from FIG. 2, in the liquid crystal display element according to this embodiment, the disclination line 3 does not exist on the pixel electrode 20.

Figure 43:
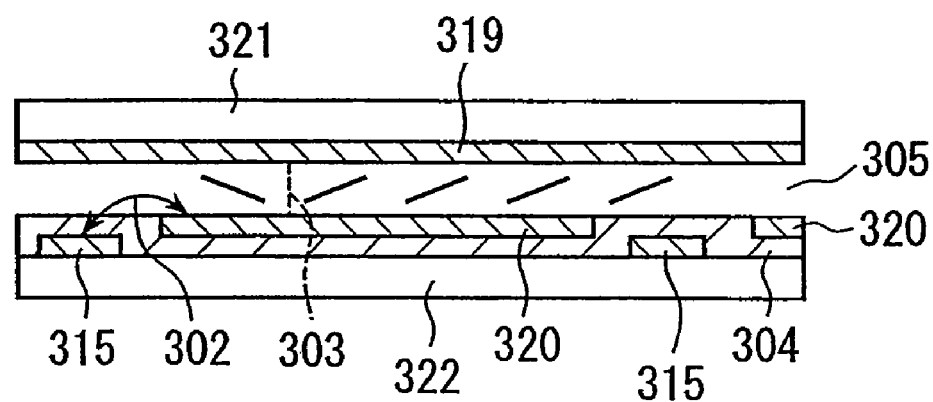
FIG. 43 is a schematic cross sectional view illustrating an operation of a conventional liquid crystal display.
Figure 44A:
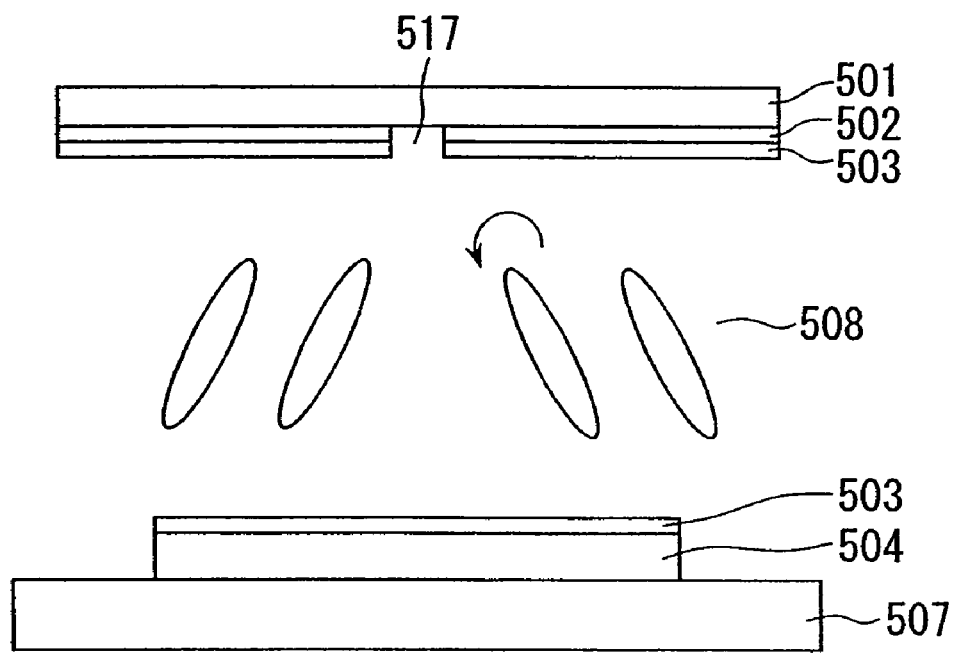
FIG. 44A is a schematic cross sectional view showing a portion including approximately one pixel of a conventional liquid crystal display.
Figure 44B:
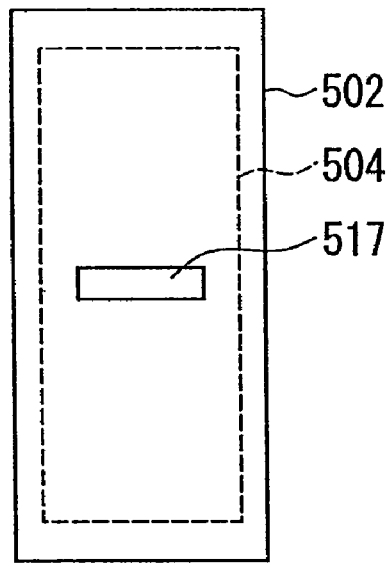
FIG. 44B is a schematic plan view showing an example of a pixel area in the conventional liquid crystal display FIG. 44A.
Figure 44C:
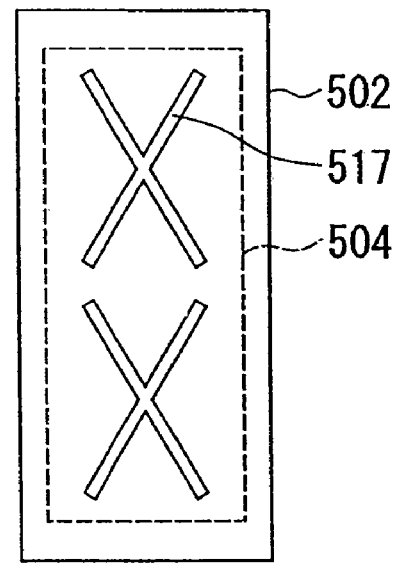
FIG. 44C is a schematic plan view showing another example of a pixel area in the conventional liquid crystal display FIG. 44A.

For reference, FIG. 43 shows a schematic cross sectional structure of a conventional liquid crystal display element.

The conventional liquid crystal display element shown in FIG. 43 comprises a pair of opposing transparent substrates 321 and 322, and liquid crystal material 305 filling the space between the pair of transparent substrates 321 and 322. Here, the pair of opposing transparent substrates 321 and 322 constitute an upper substrate 321 and a lower substrate 322.

On a surface of the lower substrate 322 which faces toward the upper substrate 321, there are formed wiring electrodes 315 and an insulating layer 304 and pixel electrodes 320. The wiring electrodes 315 are scanning electrode lines or signal electrode lines. The pixel electrodes 320 are composed of transparent material. The wiring electrodes 315 and the pixel electrodes 320 are mutually insulated or isolated by the insulating layer 304.

On a surface of the upper substrate 321 which faces toward the lower substrate 322, there is formed an opposing electrode 319. The opposing electrode 319 is made of transparent material. Also, the opposing electrode 319 is formed such that the opposing electrode 319 wholly covers the upper substrate 321.

In FIG. 43, there are also shown lateral electric field 302 and a disclination line 303 during operation of the liquid crystal display element. From FIG. 43, it can be seen that the disclination line 303 exists on the pixel electrode 320 in the conventional liquid crystal display element.

The liquid crystal display element according to the first embodiment of the present invention comprises, as mentioned above, the uneven structure 1 in addition to the structure of the conventional liquid crystal display element shown in FIG. 43.

Since the uneven structure 1 is provided, the intensity of the lateral electric field 2 arising in the liquid crystal display element according to this embodiment of the present invention is very weak when compared with the lateral electric field 302 arising in the conventional liquid crystal display element shown in FIG. 43. That is, the potential difference between the pixel electrode 20 and the wiring electrode 15 is usually much larger than the potential difference between the pixel electrode 20 and the opposing electrode 19. The uneven structure 1 is covered by the opposing electrode 19 and is disposed on the wiring electrode 15 and, therefore, the lateral electric field 2 in the liquid crystal display element according to this embodiment is mainly caused by the potential difference between the pixel electrode 20 and the opposing electrode 19. Therefore, in the liquid crystal display element according to this embodiment, the disclination line 3 does not exist on the pixel electrode 20 as mentioned above.

Embodiment 2

Figure 3:
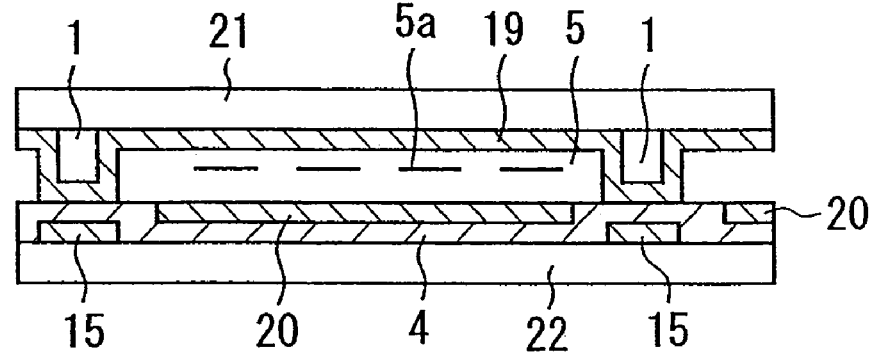
FIG. 3 is a schematic cross sectional view showing a portion including approximately one pixel of a liquid crystal display according to the second embodiment of the present invention.

FIG. 3 illustrates a schematic cross section of a portion including approximately one pixel of a liquid crystal display element according to the second embodiment.

Referring to FIG. 3, an explanation will be made on a structure of the liquid crystal display element according to the second embodiment.

The liquid crystal display element according to the second embodiment comprises a pair of opposing transparent substrates 21 and 22, and liquid crystal material 5 filling the space between the pair of transparent substrates 21 and 22. Here, the pair of opposing transparent substrates 21 and 22 constitute an upper substrate 21 and a lower substrate 22.

The liquid crystal material 5 can be any of liquid crystal materials mentioned above with reference to the first embodiment. Also, operation mode of the liquid crystal material 5 may be any of the operation modes mentioned above with reference to the first embodiment. Further, this embodiment can also be applied to an alignment divided system in which domains having different alignment directions are included in each pixel, in order to improve viewing angle dependence and to decrease defects of pixels.

Also, a pretilt angle 5a of the liquid crystal material 5, that is, an angle between liquid crystal molecules and the substrate surface, may be approximately zero.

On a surface of the lower substrate 22 which faces toward the upper substrate 21, there are formed wiring electrodes 15 and an insulating layer 4 and pixel electrodes 20. The wiring electrodes 15 are scanning electrode lines or signal electrode lines. The pixel electrodes 20 are composed of transparent material. The wiring electrodes 15 and the pixel electrodes 20 are mutually insulated or isolated by the insulating layer 4. Also, the pixel electrode 20 and the wiring electrode 15 are disposed approximately symmetrically with respect to the center of the pixel.

On a surface of the upper substrate 21 which faces toward the lower substrate 22, there are formed an opposing electrode 19 and uneven structures 1 such as protrusions or bumps. The uneven structures 1 are disposed over the wiring electrodes 15. The opposing electrode 19 is made of transparent material. Also, the opposing electrode 19 is formed such that the opposing electrode 19 wholly covers the upper substrate 21 and the uneven structures 1.

Here, the uneven structure 1 is disposed on each of all the wiring electrode 15. Also, as shown in FIG. 3, a portion of the transparent electrode 19 located under the uneven structure 1 contacts the lower substrate 22. The width of the portion where the transparent electrode 19 formed on the uneven structure 1 and the lower substrate 22 contact each other can be any width. By using lateral electric fields caused by the application of a voltage between the wiring electrodes 15 and the opposing electrode 19, the region filled with the liquid crystal material 5 is divided into a plurality of domains having different alignment angles.

Next, an explanation will be made on a method of manufacturing the liquid crystal display element according to the second embodiment. The method of manufacturing the liquid crystal display element according to the second embodiment is approximately the same as that of the liquid crystal display element according to the first embodiment, except that the portions where the uneven structures 1 are formed may differ from those of the first embodiment.

An operation of the liquid crystal display element according to the second embodiment of the present invention is now described.

Figure 4:
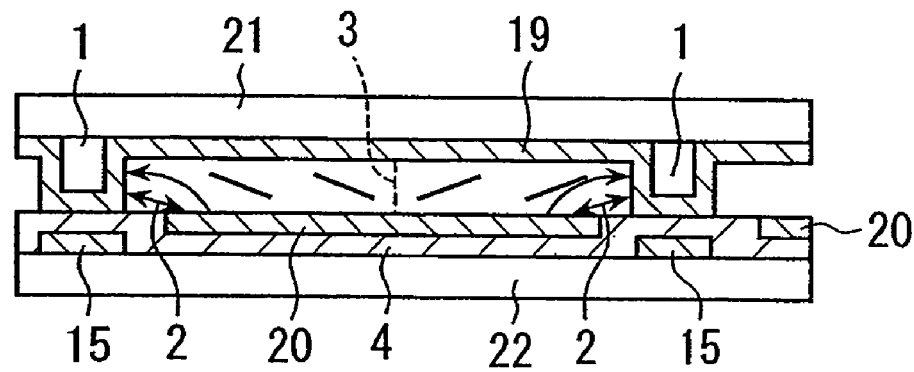
FIG. 4 is a schematic cross sectional view illustrating an operation of the liquid crystal display according to the second embodiment.

FIG. 4 is a cross sectional view used for illustrating an operation of the liquid crystal display element according to the second embodiment. In FIG. 4, an illustration of lateral electric field designated by an arrow 2 and an illustration of a disclination line designated by a dotted line 3 are added to the cross sectional view of FIG. 3.

As mentioned above, the pixel electrode 15 and the opposing electrode 19 are disposed approximately symmetrically with respect to the center of each pixel. Therefore, the lateral electric fields at both sides of the pixel electrode 20 caused by the application of a voltage between the wiring electrode 15 and the opposing electrode 19 and between the pixel electrode 20 and the opposing electrode 19 are approximately equal to each other in intensity and are approximately symmetrical with respect to the center of the pixel electrode 20.

Also, since the pretilt angle 5a of the liquid crystal molecules 5 is approximately zero degree, two domains having different crystal alignments whose boundary is the central portion of the pixel arise autonomously by such lateral electric fields. The boundary which divides the pixel area into two domains is the disclination line 3, and, in the liquid crystal display element according to this embodiment, the disclination line 3 exists approximately at the center of the pixel electrode 20.

Embodiment 3

An explanation will be made on a liquid crystal display element according to the third embodiment.

The liquid crystal display element according to the third embodiment has substantially the same structure as that of the liquid crystal display element according to the second embodiment, except for the following.

That is, in the liquid crystal display element according to the third embodiment, an optical treatment such as UV treatment and the like is performed on at least one of the upper substrate 21 and the lower substrate 22. By such optical treatment, it is possible to produce aligning force to obtain domains having different alignments of liquid crystal molecules 5 at the interface between the liquid crystal material and the substrate or substrates on which the optical treatment is performed. Also, the pretilt angle of the liquid crystal molecules 5 can be any value. Further, similarly to the second embodiment, the width of the portion where the transparent electrode 19 formed on the uneven structure 1 and the lower substrate 22 contact each other can be any width. By using lateral electric fields caused by the application of a voltage between the wiring electrodes 15 and the opposing electrode 19, the region filled with the liquid crystal material 5 is divided into a plurality of domains having different alignment angles.

An explanation will be made on a method of manufacturing the liquid crystal display element according to the third embodiment. The method of manufacturing the liquid crystal display element according to the third embodiment is approximately the same as that of the liquid crystal display element according to the first embodiment, except that the optical treatment is performed on at least one of the upper substrate 21 and the lower substrate 22.

An operation of the liquid crystal display element according to the third embodiment of the present invention is now described.

When the pretilt angle 5a is approximately zero, the liquid crystal display element according to the third embodiment operates similarly to that of the liquid crystal display element according to the second embodiment. Also, when the aligning force is produced by the optical treatment at the interface between the liquid crystal material and the substrate which is optically treated, the alignment direction of the liquid crystal molecules is determined by the aligning force. By this aligning force and the lateral electric field 2, the domain having the same alignment direction of liquid crystal molecules is determined.

Embodiment 4

Figure 5:
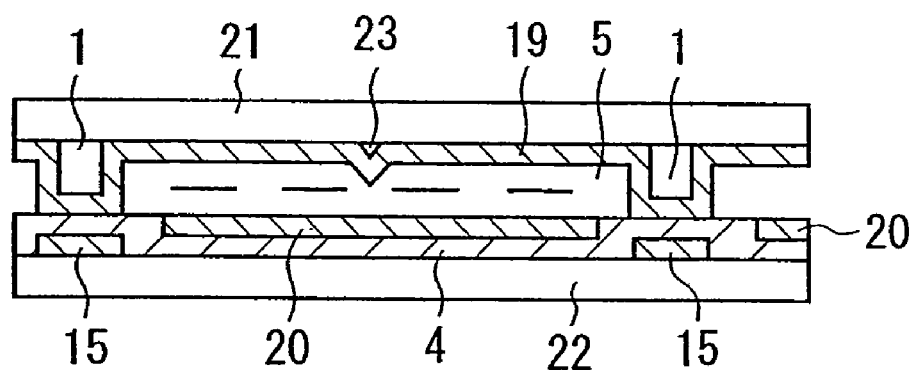
FIG. 5 is a schematic cross sectional view showing a portion including approximately one pixel of a liquid crystal display according to the fourth embodiment of the present invention.

FIG. 5 illustrates a schematic cross section of a portion including approximately one pixel of a liquid crystal display element according to the fourth embodiment.

Referring to FIG. 5, an explanation will be made on a structure of the liquid crystal display element according to the fourth embodiment.

The liquid crystal display element according to the fourth embodiment comprises a pair of opposing transparent substrates 21 and 22, and liquid crystal material 5 filling the space between the pair of transparent substrates 21 and 22. Here, the pair of opposing transparent substrates 21 and 22 constitute an upper substrate 21 and a lower substrate 22.

The liquid crystal material 5 can be any of liquid crystal materials mentioned above with reference to the first embodiment. Also, operation mode of the liquid crystal material 5 may be any of the operation modes mentioned above with reference to the first embodiment. Further, this embodiment can also be applied to an alignment divided system in which domains having different alignment directions are included in each pixel, in order to improve viewing angle dependence and to decrease defects of pixels.

Also, a pretilt angle 5a of the liquid crystal material 5, that is, an angle between liquid crystal molecules and the substrate surface, may be any angle.

On a surface of the lower substrate 22 which faces toward the upper substrate 21, there are formed wiring electrodes 15 and an insulating layer 4 and pixel electrodes 20. The wiring electrodes 15 are scanning electrode lines or signal electrode lines. The pixel electrodes 20 are composed of transparent material. The wiring electrodes 15 and the pixel electrodes 20 are mutually insulated or isolated by the insulating layer 4. Also, the pixel electrode 20 and the wiring electrode 15 are disposed approximately symmetrically with respect to the center of the pixel.

On a surface of the upper substrate 21 which faces toward the lower substrate 22, there are formed an opposing electrode 19, uneven structures 1 such as protrusions or bumps, and a protruded structure 23. The uneven structures 1 are disposed over the wiring electrodes 15. The protruded structure 23 is disposed, for example, over the central portion of the pixel electrode 20. The uneven structure 1 and the protruded structure 23 may be mutually different. The opposing electrode 19 is made of transparent material. Also, the opposing electrode 19 is formed such that the opposing electrode 19 wholly covers the upper substrate 21, the uneven structures 1 and the protruded structure 23.

Here, the uneven structure 1 is disposed on each of all the wiring electrodes 15. Also, as shown in FIG. 5, a portion of the transparent electrode 19 located under the uneven structure 1 contacts the lower substrate 22. The width of the portion where the transparent electrode 19 formed on the uneven structure 1 and the lower substrate 22 contact each other can be any width. By using lateral electric fields caused by the application of a voltage between the wiring electrodes 15 and the opposing electrode 19, the region filled with the liquid crystal material 5 is divided into a plurality of domains having different alignment angles.

The protruded structure 23 assists forming the domains having different alignment angles of liquid crystal molecules included in each pixel.

In this embodiment, it is also possible to form the protruded structure 23 not on the upper substrate 21 but on the lower substrate 22. Further, it is possible to provide a plurality of protruded structures.

Next, an explanation will be made on a method of manufacturing the liquid crystal display element according to the fourth embodiment. The method of manufacturing the liquid crystal display element according to the fourth embodiment is approximately the same as that of the liquid crystal display element according to the first embodiment, except that, in the method of manufacturing the liquid crystal display element according to the fourth embodiment, the protruded structure 23 is formed. The protruded structure 23 can be fabricated by approximately the same method as that of the uneven structure 1. However, the height of the protruded structure 23 is lower than that of the uneven structure 1.

An operation of the liquid crystal display element according to the fourth embodiment of the present invention is now described.

Figure 6:
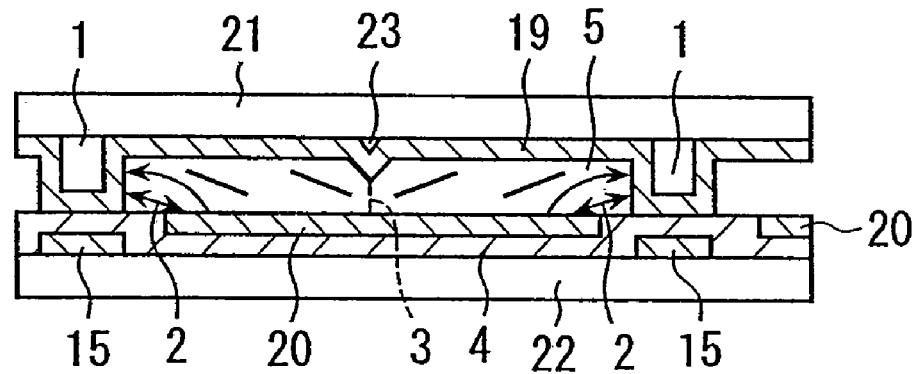
FIG. 6 is a schematic cross sectional view illustrating an operation of the liquid crystal display according to the fourth embodiment.

FIG. 6 is a cross sectional view used for illustrating an operation of the liquid crystal display element according to the fourth embodiment. In FIG. 6, an illustration of lateral electric field which arises in an operating condition of the liquid crystal display element and which is designated by an arrow 2 and an illustration of a disclination line designated by a dotted line 3 are added to the cross sectional view of FIG. 5.

As mentioned above, the pixel electrode 15 and the opposing electrode 19 are disposed approximately symmetrically with respect to the center of each pixel. Therefore, the lateral electric fields at both sides of the pixel electrode 20 caused by the application of a voltage between the wiring electrode 15 and the opposing electrode 19 and between the pixel electrode 20 and the opposing electrode 19 are approximately equal to each other in intensity and are approximately symmetrical with respect to the center of the pixel electrode 20.

Also, in the liquid crystal display element according to this embodiment, the disclination line 3 is formed at a portion which is substantially the same as the portion where the protruded structure 23 is disposed. The protruded structure 23 assists division of each pixel area into the domains having different alignment angles of liquid crystal molecules. Therefore, variation of location of the disclination line 3 becomes small and superior alignment division characteristic is obtained.

Embodiment 5

An explanation will be made on a liquid crystal display element according to the fifth embodiment.

The liquid crystal display element according to the fifth embodiment has substantially the same cross sectional structure as that of the liquid crystal display element according to the second embodiment shown in FIG. 3, except that each of uneven structures 1 is partially formed as described below.

Figure 7:
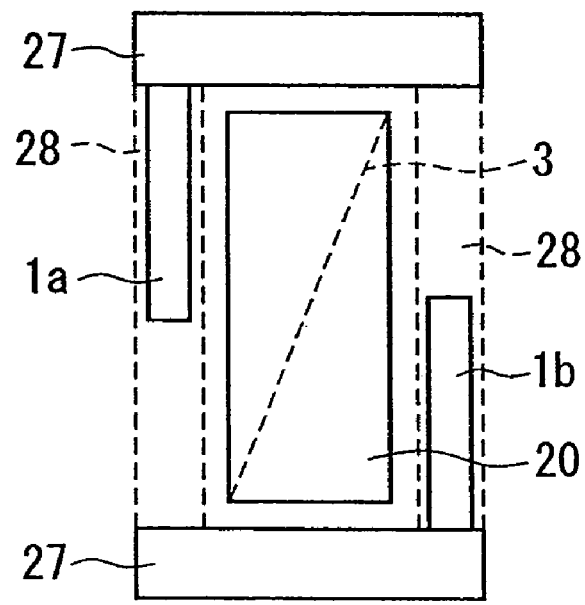
FIG. 7 is a top perspective plan view showing a portion including approximately one pixel of a liquid crystal display according to the fifth embodiment of the present invention.

FIG. 7 is a perspective plan view of the liquid crystal display element according to the fifth embodiment, showing a view looked from the direction of the top surface thereof.

With reference to FIG. 7, an explanation will be made on a structure of the liquid crystal display element according to the fifth embodiment of the present invention.

That is, on a lower substrate not shown in the drawing, there are provided a pixel electrode 20, a pair of scanning electrode lines 27, and a pair of signal electrode lines 28 which cross the pair of scanning electrode lines 27 at right angles. A pair of uneven structures 1a and 1b are formed on an upper substrate not shown in the drawing and located over the signal electrode lines 28. Each of the pair of the uneven structures 1a and 1b extends partially over the signal electrode line 28. The pair of uneven structures 1a and 1b are disposed in centrosymmetry with each other around a symmetry center point which is approximately the center of the pixel or the pixel electrode 20. It should be noted that the symmetry center point is not limited to the center of the pixel, but can be any point according to the design of each pixel, such as a structure, a shape and the like thereof.

An explanation will be made on a method of manufacturing the liquid crystal display element according to the fifth embodiment. The method of manufacturing the liquid crystal display element according to the fifth embodiment is approximately the same as that of the liquid crystal display element according to the first embodiment, except that locations and shape of the uneven structures differ from those of the uneven structure 1.

An operation of the liquid crystal display element according to the fifth embodiment of the present invention is now described.

In FIG. 7, a disclination line 3 which arises when the liquid crystal display element is in operation is shown by a dotted line. When a pretilt angle of the liquid crystal molecules is zero, the disclination line 3 approximately coincides with the line passing through the above-mentioned symmetry center, in this case, a diagonal line of the pixel electrode 20, as shown in FIG. 7. When the liquid crystal display element according to this embodiment is in operation, an electric field arises which is symmetrical with respect to the disclination line 3 shown in FIG. 7. By such electric field, it is possible to obtain a plurality of domains having different alignment directions of liquid crystal molecules. It should be noted that the location of the disclination line 3 can be changed to any desired location by changing the pretilt angle of the liquid crystal molecules.

Embodiment 6

An explanation will be made on a liquid crystal display element according to the sixth embodiment.

The liquid crystal display element according to the sixth embodiment has substantially the same cross sectional structure as that of the liquid crystal display element according to the second embodiment shown in FIG. 3, except that each of uneven structures 1 is partially formed as described below.

Figure 8:
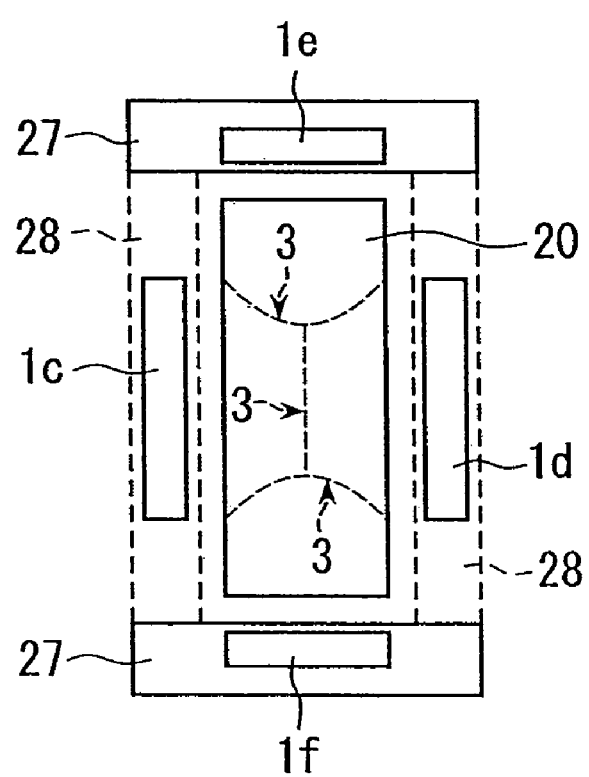
FIG. 8 is a top perspective plan view showing a portion including approximately one pixel of a liquid crystal display according to the sixth embodiment of the present invention.

FIG. 8 is a perspective plan view of the liquid crystal display element according to the sixth embodiment, showing a view looked from the direction of the top surface thereof.

With reference to FIG. 8, an explanation will be made on a structure of the liquid crystal display element according to the sixth embodiment of the present invention.

That is, on a lower substrate not shown in the drawing, there are formed a pixel electrode 20, a pair of scanning electrode lines 27, and a pair of signal electrode lines 28 which cross the pair of scanning electrode lines 27 at right angles. A pair of uneven structures 1c and 1d are formed on an upper substrate not shown in the drawing and located over the signal electrode lines 28. A pair of uneven structures 1e and 1f are formed on an upper substrate not shown in the drawing and located over the scanning electrode lines 27. Each of the pair of the uneven structures 1c and 1d extends partially over the signal electrode line 28. Each of the pair of the uneven structures 1e and 1f extends partially over the scanning electrode line 27.

The pair of uneven structures 1c and 1d are disposed in symmetry with each other between a symmetry center line which is a first center line approximately parallel to the signal electrode line 28 and passing through the center of the pixel or the pixel electrode 20. Also, the pair of uneven structures 1e and if are disposed in symmetry with each other between a symmetry center line which is a second center line approximately parallel to the scanning electrode line 27 and passing through the center of the pixel or the pixel electrode 20. The uneven structures 1c and 1d are disposed in centrosymmetry with each other around a symmetry center point which is the intersection of the first center line and the second center line and which is approximately the center of the pixel or the pixel electrode 20. It should be noted that the symmetry center point is not limited to the center of the pixel, but can be any point according to the design of each pixel, such as a structure, a shape and the like thereof An explanation will be made on a method of manufacturing the liquid crystal display element according to the sixth embodiment. The method of manufacturing the liquid crystal display element according to the sixth embodiment is approximately the same as that of the liquid crystal display element according to the first embodiment, except that locations, number and shape of the uneven structures differ from those of the uneven structure 1.

An operation of the liquid crystal display element according to the sixth embodiment of the present invention is now described.

In FIG. 8, disclination lines 3 which arise when the liquid crystal display element is in operation are shown by dotted lines. When a pretilt angle of the liquid crystal molecules is assumed to be zero and when a voltage is applied to the liquid crystal display element according to this embodiment, an electric field is produced by the pair of uneven structures 1c and 1d which is approximately symmetrical with respect to the first center line as the symmetry center line. Similarly, an electric field is produced by the pair of uneven structures 1e and 1f which is approximately symmetrical with respect to the second center line as the symmetry center line. The disclination lines 3 produced by such electric fields are shown in FIG. 8 by dotted lines. By such electric field, it is possible to obtain four domains which are divided by these disclination lines 3 and which have different alignment directions of liquid crystal molecules. Therefore, in this embodiment, it is possible to realize a predetermined divided alignment distribution. It should be noted that the locations of the disclination lines 3 can be changed to any desired locations by changing the pretilt angle of the liquid crystal molecules. Also, by combining the structure of the liquid crystal display element according to the sixth embodiment with the structure of each of the liquid crystal display elements according to the second through fifth embodiments, it is possible to obtain synergistic effect from the effect obtained by the sixth embodiment and the effect obtained by the second through fifth embodiments.

An explanation will be made on a liquid crystal display element as a variation of the sixth embodiment. This variation is obtained by applying the above-mentioned structure of the sixth embodiment to a liquid crystal display element which have pixels each having a hexagonal shape when viewed from the top side thereof.

Figure 9:
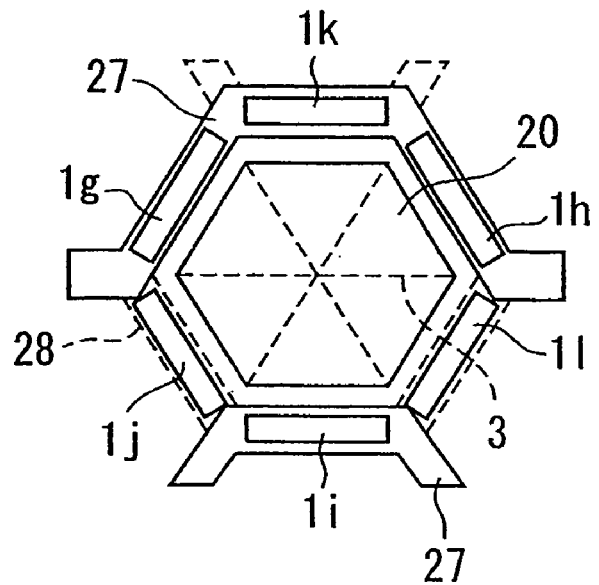
FIG. 9 is a top perspective plan view showing a portion including approximately one pixel of a liquid crystal display according to a variation of the sixth embodiment of the present invention.

FIG. 9 is a perspective plan view of the liquid crystal display element according to the variation of the sixth embodiment, showing a view looked from the top side thereof In the liquid crystal display element shown in FIG. 9, on a lower substrate not shown in the drawing, there are formed a pixel electrode 20, a pair of scanning electrode lines 27, and a pair of signal electrode lines 28. A plurality of uneven structures 1g, 1h, 1i, 1j, 1k and 1l are formed on an upper substrate not shown in the drawing and located over the scanning electrode lines 27 or the signal electrode lines 28. These plurality of uneven structures 1g, 1h, 1i, 1j, 1k and 1l are located at respective sides of the pixel having a hexagonal shape and formed over the scanning electrode lines 27 or the signal electrode lines 28 which run on the periphery of the hexagonal pixel electrode 20.

The pair of uneven structures 1g and 1l are disposed in centrosymmetry with each other around a symmetry center point which is approximately the center of the pixel or the pixel electrode 20. Also, the pair of uneven structures 1h and 1j are disposed in centrosymmetry with each other around a symmetry center point which is approximately the center of the pixel or the pixel electrode 20, and the pair of uneven structures 1*i* and 1*k* are disposed in centrosymmetry with each other around a symmetry center point which is approximately the center of the pixel or the pixel electrode 20. It should be noted that the symmetry center point is not limited to the center of the pixel, but can be any point according to the design of each pixel, such as a structure, a shape and the like thereof.

An operation of the liquid crystal display element according to the variation of the sixth embodiment of the present invention is now described.

In FIG. 9, disclination lines 3 which arise when the liquid crystal display element is in operation are shown by dotted lines. When a pretilt angle of the liquid crystal molecules is assumed to be zero and when a voltage is applied to the liquid crystal display element according to this embodiment, an electric field is produced by the pair of uneven structures 1*g* and 1*l*, which electric field is approximately symmetrical with respect to a symmetry center line, i.e., the first center line passing through the symmetry center point and parallel to the sides where the uneven structures 1*g* and 1*l* are disposed. Similarly, an electric field is produced by the pair of uneven structures 1*h* and 1*j*, which electric field is approximately symmetrical with respect to a symmetry center line, i.e., the second center line passing through the symmetry center point and parallel to the sides where the uneven structures 1*h* and 1*j* are disposed. Further, an electric field is produced by the pair of uneven structures 1*k* and 1*i*, which electric field is approximately symmetrical with respect to a symmetry center line, i.e., the third center line passing through the symmetry center point and parallel to the sides where the uneven structures 1*k* and 1*i* are disposed. The disclination lines 3 produced by such electric fields are shown in FIG. 9 by dotted lines. By such electric field, it is possible to obtain six domains which are divided by these disclination lines 3 and which have different alignment directions of liquid crystal molecules. Therefore, in this embodiment, it is possible to realize a predetermined divided alignment distribution. It should be noted that the locations of the disclination lines 3 can be changed to any desired locations by changing the pretilt angle of the liquid crystal molecules. Also, by combining the structure of the liquid crystal display element according to the variation of the sixth embodiment with the structure of each of the liquid crystal display elements according to the second through fifth embodiments, it is possible to obtain synergistic effect from the effect obtained by the variation of the sixth embodiment and the effect obtained by the second through fifth embodiments.

Further, as still another variation, it is possible to dispose a plurality of uneven structures which are symmetrical with respect to a symmetry center point disposed within the pixel electrode. In such case, since the disposition of the electrodes including the uneven structures is symmetrical, an electric field arises in the periphery of the pixel electrode, which electric field is centrosymmetrical around the symmetry center point. By this electric field, it is possible to divide each pixel into many domains having different alignment of liquid crystal molecules.

Embodiment 7

Figure 10:
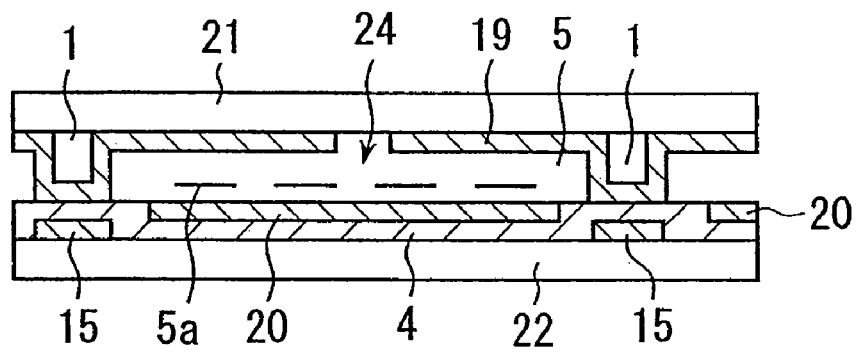
FIG. 10 is a schematic cross sectional view showing a portion including approximately one pixel of a liquid crystal display according to the seventh embodiment of the present invention.

FIG. 10 illustrates a schematic cross section of a portion including approximately one pixel of a liquid crystal display element according to the seventh embodiment.

Referring to FIG. 10, an explanation will be made on a structure of the liquid crystal display element according to the seventh embodiment.

The liquid crystal display element according to the seventh embodiment comprises a pair of opposing transparent substrates 21 and 22, and liquid crystal material 5 filling the space between the pair of transparent substrates 21 and 22. Here, the pair of opposing transparent substrates 21 and 22 constitute an upper substrate 21 and a lower substrate 22.

The liquid crystal material 5 can be any of liquid crystal materials mentioned above with reference to the first embodiment. Also, operation mode of the liquid crystal material 5 may be any of the operation modes mentioned above with reference to the first embodiment. Further, this embodiment can also be applied to an alignment divided system in which domains having different alignment directions are included in each pixel, in order to improve viewing angle dependence and to decrease defects of pixels.

Also, a pretilt angle 5*a* of the liquid crystal material 5, that is, an angle between liquid crystal molecules and the substrate surface, may be any value. It may be approximately zero or any other angle.

On the surface of the lower substrate 22 which faces toward the upper substrate 21, there are formed wiring electrodes 15 and an insulating layer 4 and pixel electrodes 20. The wiring electrodes 15 are scanning electrode lines or signal electrode lines. The pixel electrodes 20 are composed of transparent material. The wiring electrodes 15 and the pixel electrodes 20 are mutually insulated or isolated by the insulating layer 4. Also, the pixel electrode 20 and the wiring electrode 15 are disposed approximately symmetrically with respect to the center of the pixel.

On the surface of the upper substrate 21 which faces toward the lower substrate 22, there are formed an opposing electrode 19 and uneven structures 1 such as protrusions or bumps. The uneven structures 1 are disposed over the wiring electrodes 15. The opposing electrode 19 is made of transparent material. The opposing electrode 19 is formed such that the opposing electrode 19 wholly covers the upper substrate 21 and the uneven structures 1. Also, a slit like hole 24 is formed in a part of the opposing electrode 19.

Here, the uneven structure 1 is disposed on each of all the wiring electrode 15. Also, as shown in FIG. 10, a portion of the transparent electrode 19 located under the uneven structure 1 contacts the lower substrate 22. The width of the portion where the transparent electrode 19 formed on the uneven structure 1 and the lower substrate 22 contact each other can be any width. By using lateral electric fields caused by the application of a voltage between the wiring electrodes 15 and the opposing electrode 19, the region filled with the liquid crystal material 5 is divided into a plurality of domains having different alignment angles.

In the structure of the liquid crystal display element according to the seventh embodiment, there is provided a slit like hole 40 at a portion of the opposing electrode 19, in addition to the structure of the liquid crystal display element according to the second embodiment.

Next, an explanation will be made on a method of manufacturing the liquid crystal display element according to the seventh embodiment. The method of manufacturing the liquid crystal display element according to the seventh embodiment includes a process of forming the slit like hole 24 at a portion of the opposing electrode 19, in addition to the above-mentioned method of manufacturing the liquid crystal display element according to the first embodiment. The slit like hole 40 can be formed, for example, by selectively removing a slit like portion of the transparent electrode material from the opposing electrode 19 by using a known method, such as photolithography and etching and the like.

An operation of the liquid crystal display element according to the seventh embodiment of the present invention will now be described.

Figure 11:
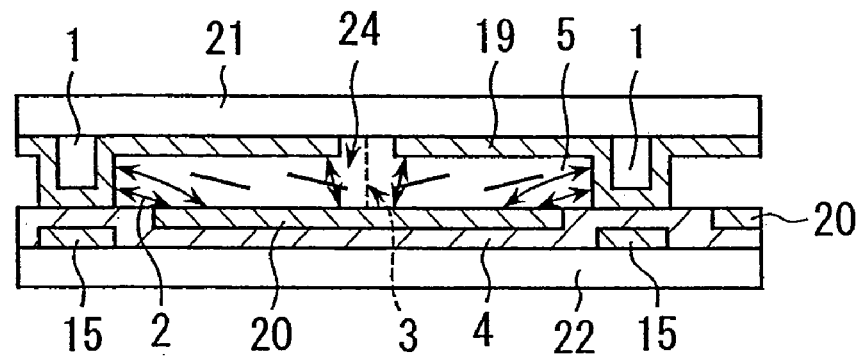
FIG. 11 is a schematic cross sectional view illustrating an operation of the liquid crystal display according to the seventh embodiment.

FIG. 11 is a cross sectional view used for illustrating an operation of the liquid crystal display element according to the seventh embodiment. In FIG. 11, an illustration of lateral electric field designated by an arrow 2 and an illustration of a disclination line designated by a dotted line 3 are added to the cross sectional view of FIG. 10.

As mentioned above, the pixel electrode 15 and the opposing electrode 19 are disposed approximately symmetrically with respect to the center of each pixel. Therefore, the lateral electric fields at both sides of the pixel electrode 20 caused by the application of a voltage between the wiring electrode 15 and the opposing electrode 19 and between the pixel electrode 20 and the opposing electrode 19 are approximately equal to each other in intensity, and are approximately symmetrical with respect to the center of the pixel electrode 20.

Also, since the slit like hole 24 is disposed at a portion of the opposing electrode 19 and at approximately the center of the pixel, two domains having different crystal alignments whose boundary is the central portion of the pixel arise autonomously by the electric fields produced when the liquid crystal display element according to this embodiment is in operation. The boundary which divides the pixel area into two domains is the disclination line 3, and, in the liquid crystal display element according to this embodiment, the disclination line 3 exists approximately at the center of the pixel electrode 20.

Also, by combining the structure of the liquid crystal display element according to the seventh embodiment with the structure of each of the liquid crystal display elements according to the second through sixth embodiments, it is possible to obtain synergistic effect from the effect obtained by the seventh embodiment and the effect obtained by the second through sixth embodiments.

Embodiment 8

Figure 12:
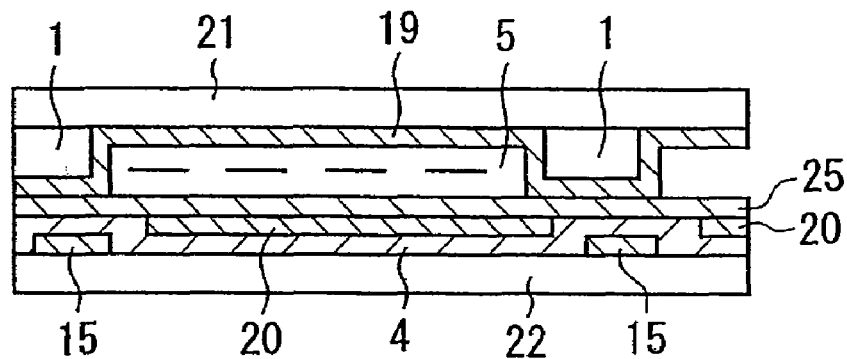
FIG. 12 is a schematic cross sectional view showing a portion including approximately one pixel of a liquid crystal display according to the eighth embodiment of the present invention.

FIG. 12 illustrates a schematic cross section of a portion including approximately one pixel of a liquid crystal display element according to the eighth embodiment of the present invention.

Referring to FIG. 12, an explanation will be made on a structure of the liquid crystal display element according to the eighth embodiment.

The liquid crystal display element according to the eighth embodiment comprises a pair of opposing transparent substrates 21 and 22, and liquid crystal material 5 filling the space between the pair of transparent substrates 21 and 22. Here, the pair of opposing transparent substrates 21 and 22 constitute an upper substrate 21 and a lower substrate 22.

The liquid crystal material 5 can be any of liquid crystal materials mentioned above with reference to the first embodiment. Also, operation mode of the liquid crystal material 5 may be any of the operation modes mentioned above with reference to the first embodiment. Further, this embodiment can also be applied to an alignment divided system in which domains having different alignment directions are included in each pixel, in order to improve viewing angle dependence and to decrease defects of pixels.

Also, a pretilt angle 5a of the liquid crystal material 5, that is, an angle between liquid crystal molecules and the substrate surface, may be any value. It may be approximately zero or any other angle.

On the surface of the lower substrate 22 which faces toward the upper substrate 21, there are formed wiring electrodes 15, an insulating layer 4, pixel electrodes 20 and a cover insulating layer 25. The wiring electrodes 15 are scanning electrode lines or signal electrode lines. The pixel electrodes 20 are composed of transparent material. The wiring electrodes 15 and the pixel electrodes 20 are mutually insulated or isolated by the insulating layer 4. Also, the cover insulating layer 25 covers the whole area on the lower substrate 22.

On the surface of the upper substrate 21 which faces toward the lower substrate 22, there are formed an opposing electrode 19 and uneven structures 1 such as protrusions or bumps. The uneven structures 1 are disposed over the wiring electrodes 15. The opposing electrode 19 is made of transparent material. The opposing electrode 19 is formed such that the opposing electrode 19 wholly covers the upper substrate 21 and the uneven structures 1. Also, portions of the opposing electrode 19 under the uneven structures 1 contact the cover insulating layer 25 on the lower substrate 22, when the upper substrate 21 and the lower substrate 22 are opposed.

Here, the uneven structure 1 may be disposed on each of all the wiring electrode 15. Also, the uneven structure 1 can be disposed on each one of some wiring electrodes 15. For example, in a liquid crystal display element having three wiring electrodes corresponding to three pixels of red, blue and green, it is possible to dispose one uneven structure 1 on any one of the three wiring electrodes.

In the structure of the liquid crystal display element according to the eighth embodiment, there is provided the cover insulating layer 25 which covers the lower substrate 22, in addition to the structure of the liquid crystal display element according to the first embodiment.

Next, an explanation will be made on a method of manufacturing the liquid crystal display element according to the eighth embodiment. The method of manufacturing the liquid crystal display element according to the eighth embodiment includes a process of forming the cover insulating layer 25 such that the cover insulating layer 25 wholly covers the lower transparent electrode 20, the insulating film or layer 4 and the wiring electrode 15 formed on the lower transparent substrate 22, in addition to the above-mentioned method of manufacturing the liquid crystal display element according to the first embodiment. The cover insulating layer 25 can be formed, for example, by a well known method, such as sputtering and the like.

An operation of the liquid crystal display element according to the eighth embodiment of the present invention will now be described.

Since the upper substrate 19 is disposed closely to the wiring electrode 15 and/or to the pixel electrode 20 via the cover insulating layer 25, storage capacitance is provided between the upper substrate 19 and the wiring electrode 15 and/or between the upper substrate 19 and the pixel electrode 20. In this structure, the storage capacitance can be sufficiently large without increasing the width of the wiring electrode 15 which is made of opaque material such as chromium (Cr). Therefore, it is possible to obtain large storage capacitance without deteriorating the aperture ratio of each pixel, or it is possible to obtain large aperture ratio of each pixel without decreasing the storage capacitance.

Also, by combining the structure of the liquid crystal display element according to the eighth embodiment with the structure of each of the liquid crystal display elements according to the second through seventh embodiments, it is possible to obtain synergistic effect from the effect obtained by the eighth embodiment and the effect obtained by the second through seventh embodiments.

Embodiment 9

Figure 13:
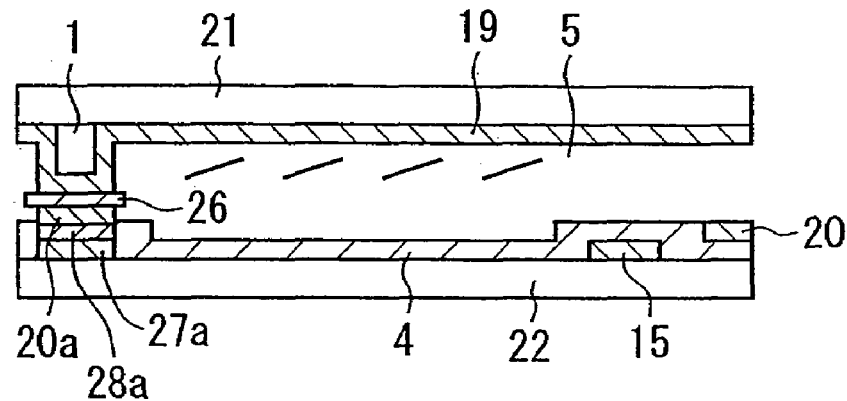
FIG. 13 is a schematic cross sectional view showing a portion including approximately one pixel of a liquid crystal display according to the ninth embodiment of the present invention.

FIG. 13 illustrates a schematic cross section of a liquid crystal display element according to the ninth embodiment. The liquid crystal display element according to the ninth embodiment comprises a contact portion for supplying a potential voltage to the opposing electrode 19 from the lower substrate 22, which contact portion is usable in the liquid crystal display elements according to the first through eighth embodiments of the present invention.

Referring to FIG. 13, an explanation will be made on a structure of the liquid crystal display element according to the ninth embodiment.

The liquid crystal display element according to the ninth embodiment comprises a pair of opposing transparent substrates 21 and 22, and liquid crystal material 5 filling the space between the pair of transparent substrates 21 and 22. Here, the pair of opposing transparent substrates 21 and 22 constitute an upper substrate 21 and a lower substrate 22.

The liquid crystal material 5 can be any of liquid crystal materials mentioned above with reference to the first embodiment. Also, operation mode of the liquid crystal material 5 may be any of the operation modes mentioned above with reference to the first embodiment. Further, this embodiment can also be applied to an alignment divided system in which domains having different alignment directions are included in each pixel, in order to improve viewing angle dependence and to decrease defects of pixels.

Also, a pretilt angle 51 of the liquid crystal material 5, that is, an angle between liquid crystal molecules and the substrate surface, may be any value. It may be approximately zero, or may be any other angle.

On a surface of the upper substrate 21 which faces toward the lower substrate 22, there are formed an opposing electrode 19 and uneven structures 1 such as protrusions or bumps (only one of such uneven structures is shown in the drawing). Each of the uneven structures 1 is disposed over the wiring electrode 15. The opposing electrode 19 is made of transparent material. Also, the opposing electrode 19 is formed such that the opposing electrode 19 wholly covers the upper substrate 21 and the uneven structures 1. Also, each of predetermined uneven structures 1 is disposed over a predetermined scanning electrode line or a signal electrode line. In this embodiment, each portion of the opposing electrode 19 formed on the predetermined uneven structures 1 is electrically coupled with a predetermined scanning electrode line contact portion 27a.

On a surface of the lower substrate 22 which faces toward the upper substrate 21, there are formed wiring electrodes 15 and an insulating layer 4 and pixel electrodes 20. The wiring electrodes 15 are scanning electrode lines or signal electrode lines. The pixel electrodes 20 are composed of transparent material. The wiring electrodes 15 and the pixel electrodes 20 are mutually insulated or isolated by the insulating layer 4. Also, on the lower substrate 22 and on a portion which contacts the opposing electrode 19 under the uneven structure 1, there is provided a signal electrode line contact portion 28a which is formed on the scanning electrode line 27a, i.e., the wiring electrode 15, and which is coupled with the scanning electrode line contact portion 27a. Further, on the signal electrode line contact portion 28a, there is formed a pixel electrode contact portion 20a coupled with the signal electrode line contact portion 28a. Also, on the pixel electrode contact portion 20a, there is provided a conductive adhesive layer 26 coupled with the pixel electrode contact portion 20a. The conductive adhesive layer 26 couples with the portion of the opposing electrode 19 under the uneven structure 1.

In this embodiment, the scanning electrode layer is a voltage supplying layer and scanning electrode line contact portion 27a is a wiring electrode 15. It is possible to use a structure in which the signal electrode layer is a voltage supplying layer and signal electrode line contact portion 28a is a wiring electrode 15. In such case, it is preferable that the scanning electrode line contact portion 27a is not provided.

In the liquid crystal display element according to the ninth embodiment, thickness or height of the conductive adhesive layer 26 in the contact portion can be smaller than that of the conventional liquid crystal display element which does not have the above-mentioned uneven structures. Therefore, it is possible to realize a reliable contact having low electric resistance.

Next, an explanation will be made on an example of a method of manufacturing the liquid crystal display element according to the ninth embodiment.

The scanning electrode layer 27a is formed on the lower transparent substrate 22 by using a known method. For example, a chromium (Cr) layer is formed on the lower transparent substrate 22 by a sputtering method, and the chromium layer thus formed is patterned to form the scanning electrode layer 27a.

The insulating layer 4 is then formed such that the insulating layer 4 wholly covers the lower transparent substrate 22 including the scanning electrode layer 27a formed on the lower substrate 22.

Then, a portion of the insulating layer 4 on the scanning electrode layer 27a is removed, and the signal electrode layer 28a is formed on the scanning electrode layer 27a.

Then, on the insulating film 4 and in each of a plurality of pixel regions having predetermined patterns, the pixel electrodes, that is, the lower transparent electrodes 20 are formed by using a well known method. In this case, a part of the lower transparent electrode 20a coupled with the signal electrode layer 28a is formed also on the signal electrode layer 28a.

If necessary, it is possible to perform rubbing process on the lower transparent substrate 22 by using a well known method.

The uneven structure, that is, a protrusion, 1 is formed on the upper transparent substrate 21. For example, such protrusion 1 can be formed by using any of methods described below. That is, when a color filter not shown in the drawing is formed on the upper transparent substrate 21, such color filter is repeatedly formed and stacked in the region where the protrusion 1 is to be formed, thereby the protrusion 1 having a predetermined height is formed. It is also possible to stack transparent resin material in the region where the protrusion 1 is to be formed to obtain the protrusion 1 having a predetermined height. Further, it is possible to form a transparent resin layer having a predetermined thickness on the upper transparent substrate and to pattern the transparent resin layer to leave the protrusion 1 only in the region where the protrusion 1 is to be formed.

The upper transparent electrode 19 is formed which wholly covers the upper transparent substrate 21 and the protrusion 1, by using a well known method.

On the protrusion 1, the conductive adhesive layer 26 is formed. An example of a material of the conductive adhesive layer 26 is conductive resin.

If necessary, it is possible to perform rubbing process on the upper transparent substrate 21 by using a well known method.

The lower transparent substrate 22 and the upper transparent substrate 21 are disposed such that the lower transparent electrode 20 and the upper transparent electrode 19 are opposed to each other. In this case, the conductive adhesive layer 26 and the lower transparent electrode 22 are coupled with each other. Both substrates 22 and 21 are coupled and sealed at the peripheral portion thereof.

Lastly, liquid crystal material 5 is injected between the lower transparent substrate 22 and the upper transparent electrode 19 by using a vacuum injection method.

By these process steps mentioned above, the liquid crystal display element according to the ninth embodiment of the present invention is fabricated.

With respect to forming the conductive adhesive layer 26, it is also possible to form the conductive adhesive layer 26 on the lower transparent electrode 22 on the scanning electrode layer 27a which is on the lower transparent electrode 22. In this case, when the lower transparent substrate 20 and the upper transparent substrate 19 are disposed such that the lower transparent electrode 22 and the upper transparent electrode 21 oppose with each other, the conductive adhesive layer 26 is coupled with the portion of the upper transparent electrode 21 formed on the uneven structure 1.

Embodiment 10

An explanation will be made on the tenth embodiment of the present invention. The tenth embodiment concerns a method of fabricating the uneven structures 1 and the opposing electrode 19 in the liquid crystal display elements according to the first through ninth embodiments of the present invention.

In this method, first, the uneven structures 1 are formed on the upper substrate 21. Then, the opposing electrode 19 is formed on whole area of the upper substrate 21 to a film thickness in which disconnection or break of the opposing electrode 19 does not occur. By this process, it is possible to form an electrode on also the side surface of the uneven structure 1 to supply a potential voltage to the opposing electrode 19 from the side of the lower substrate 22. Also, it is possible to pattern the opposing electrode 19, if necessary.

Embodiment 11

An explanation will be made on the eleventh embodiment of the present invention.

A liquid crystal display element according to the eleventh embodiment is obtained by replacing the liquid crystal material 5 used in the liquid crystal display elements according to the first through tenth embodiment with a liquid crystal material having smectic phase, such as ferroelectric liquid crystal, antiferroelectric liquid crystal, electroclinic liquid crystal and the like.

By using the smectic phase, it is possible to reduce defects such as disclination which is different from the nematic phase. Also, by using this embodiment, mechanical strength which is conventionally not sufficient in the smectic phase can be increased. Further, by combining this embodiment with the liquid crystal display element according to the seventh through ninth embodiments, it is possible to realize a layer divided structure.

Here, some practical examples concerning the above-mentioned first through eleventh embodiments will be described.

Example 1

In the first example of the liquid crystal display element, the present invention is applied to a domain divided liquid crystal display which uses homeotropic aligned nematic liquid crystal and which is called a multi-domain vertical aligned nematic (MVA) liquid crystal display.

In such liquid crystal display, 480 gate bus lines, i.e., scanning electrode lines, and 640 drain bus lines, i.e., signal electrode lines, were formed perpendicularly to each other from chromium (Cr) by sputtering. The width of each of the gate bus lines and the drain bus lines was 10 micrometers (μm). A gate insulating film was made of silicon nitride (SiNx). The size of one pixel was 330 μm in vertical direction and 110 μm in horizontal direction. Amorphous silicon was used to form a thin film transistor (TFT). Pixel electrodes were made of indium tin oxide (ITO) and were formed by sputtering. These TFT's were formed in an array on a glass substrate, thereby the first substrate was fabricated.

On a second substrate which opposes the first substrate, a light shield layer made of chromium is formed and then color filter layers were formed in a matrix by using a dyeing method. When the color filter layers are formed, thickness of each color filter layer was 1.5 μm, and, by stacking three color filter layers, an uneven structure having a thickness of 4.5 μm was obtained. The uneven structure was and formed such that, when the uneven structure was opposed to the TFT substrate, the structure shown in FIG. 3 was obtained, and formed in each area other than the opening portions of pixels. The transparent electrode, that is, common electrode was formed on whole area of the second substrate by using ITO.

Thereafter, soluble polyimide was printed on both the first substrate and the second substrate by using a printing method, and baked at 180 degrees Celsius to remove solvent. The thickness of the alignment layer measured by a contact step meter was approximately 500 angstroms. The pretilt angle measured by the crystal rotation method was 90 degrees.

On one of the glass substrates, a thermocurable sealing material was applied in which cylindrical rod spacers of glass each having a diameter of 4.7 μm were dispersed. These substrates were opposed, and the sealing material was cured by heat treatment. Thereby, a liquid crystal panel having a gap of 4.5 μm was assembled. Into this panel, nematic liquid crystal material having a negative anisotropy of permittivity was injected under vacuum condition. Driver IC's and the like Were attached to the liquid crystal panel fabricated in this way, and a liquid crystal display was completed.

In the liquid crystal display according to the Example 1, superior alignment division having two domains was attained, and a wide viewing angle was realized.

Example 2

A liquid crystal display according to the Example 2 was fabricated similarly to that of the Example 1, except that the disposition of the uneven structures of the liquid crystal display of the Example 1 was changed to the disposition shown in FIG. 8.

In the liquid crystal display according to the Example 2, superior alignment division having four domains was attained, and a viewing angle wider than that of the Example 1 was realized.

Example 3

A liquid crystal display according to the Example 3 was fabricated similarly to that of the Example 2, except that, in addition to the structure of the Example 2, the protrusions shown in FIG. 5 were provided in the second substrate.

In the liquid crystal display according to the Example 3, alignment division having four domains was attained which is superior to that of the Example 2. Concretely, movement of a disclination line at the division boundary does not appear and stable display condition was obtained.

Example 4

A liquid crystal display according to the Example 4 was fabricated similarly to that of the Example 3, except that, in addition to the structure of the Example 3, the protrusions shown in FIG. 5 were also provided in the TFT substrate.

In the liquid crystal display according to the Example 4, alignment division having four domains was attained which is superior to that of the Example 3. Concretely, movement of a disclination line at the division boundary does not appear at all and stable display condition was obtained. Also, a response speed of the liquid crystal display when a voltage was applied thereto became higher than that of the liquid crystal display of the Example 3. This is because, liquid crystal molecules have an alignment condition caused or induced by the protrusion in the liquid crystal panel. It is considered that the protrusion triggers or prompts the division of alignment and therefore deformation of alignment and the like caused by the electric field can be easily performed.

Example 5

A liquid crystal display of this example was obtained by applying the present invention to a liquid crystal display element in which a wide viewing angle was obtained by adding an optical compensation film to π-cell called an OCB (Optically Compensated Birefringence).

A method of manufacturing a liquid crystal display according to this example will now be described. A TFT substrate and a CF substrate were fabricated similarly to those of the liquid crystal display according to the Example 1. With respect to the color filter, it was fabricated by an ink-jet system in which dye was applied as bubble jet to the CF substrate. Uneven structures having a thickness of 6 µm was formed by stacking transparent resin material other than the color filter. Also, the uneven structures were formed in the portions other than the opening portions of pixels such that, when the uneven structures were opposed to the TFT substrate, the structure shown in FIG. 1 was obtained and the uneven structures opposes to the signal electrode. One uneven structures were formed per three signal electrode lines.

Thereafter, polyamic acid was applied on both the first substrate and the second substrate by using a spin coating method, and baked at 200 degrees Celsius to form polyimide films. These polyimide films were rubbed in a direction such that parallel rubbing condition is obtained. In this case, a buff cloth of rayon was wound around a roller having a diameter of 50 mm. A revolution speed of the roller was 600 rpm, the velocity of a stage was 40 mm/sec., a quantity of plunging was 0.7 mm, and rubbing was performed two times. The thickness of the alignment layers measured by a contact step meter was approximately 500 angstroms. The pretilt angle measured by the crystal rotation method was 7 degrees.

On one of the glass substrates, an ultravioletcurable sealing material was applied in which cylindrical rod spacers of glass each having a diameter of about 6 µm were dispersed. These substrates were opposed such that the directions of rubbing treatment have a relationship of parallel rubbing, and the sealing material was cured by a curing process in which ultraviolet rays were irradiated in a non-contact condition. Thereby, a liquid crystal panel having a gap of 6 µm was assembled. Into this panel, nematic liquid crystal material was injected.

In the liquid crystal display of this example, an optical compensation film was added which was designed to obtain the same effect as that of the OCB (Optically Compensated Birefringence) mode shown in SID '94, Digest, pp. 927-930. Driver IC's and the like were attached to the liquid crystal panel fabricated in this way, and a liquid crystal display was completed.

In the liquid crystal display according to the Example 5, a liquid crystal display was realized which has a high drive speed and a wide viewing angle. Also, in this liquid crystal display, even when an external force was applied, for example, by pressing the liquid crystal display panel by a finger and the like, no disturbance of display was observed. In the conventional OCB panel, when an external force was applied, liquid crystal alignment was changed from the bend alignment to the spray alignment. In the liquid crystal display according the Example 5 of the present invention, such a defect was not observed at all. Therefore, in the liquid crystal display according the Example 5 of the present invention, even if a touch-panel was applied to the liquid crystal display, normal operation can be done with superior performance mentioned above.

Example 6

A liquid crystal display of this example was obtained by applying the present invention to the liquid crystal material having the smectic mode used in a liquid crystal display element of the Embodiment 11.

A method of manufacturing a liquid crystal display according to this example will now be described. A TFT substrate and a CF substrate were fabricated similarly to those of the liquid crystal display according to the Example 1. With respect to the color filter structure, the thickness of the color filter layer of one color was fabricated to become 1.6 µm. Uneven structures was formed by using only the layer of this color. Also, the uneven structure was formed in the portion outside the display area such that the uneven structure surrounds the display area and such that only a part of the uneven structure was opened. The uneven structure outside the display area becomes a wall of a sealing material, and the opened portion becomes an opening for injecting the liquid crystal material.

Also, the structure of the liquid crystal display according to the Embodiment 9 shown in FIG. 13 was used, and the insulating layer of the contact portion was removed by patterning. Thereafter, polyamic acid was applied on both the first substrate and the second substrate by using a spin coating method, and baked at 180 degrees Celsius to form polyimide films. These polyimide films were rubbed in a direction such that crossed rubbing condition having an angle of 10 degrees is obtained. In this case, a buff cloth of nylon was wound around a roller having a diameter of 50 mm. A revolution speed of the roller was 600 rpm, the velocity of a stage was 40 mm/sec., a quantity of plunging was 0.7 mm, and rubbing was performed two times. The thickness of the alignment layers measured by a contact step meter was approximately 500 angstroms. The pretilt angle measured by the crystal rotation method was 1.5 degrees.

These substrates were opposed such that the directions of rubbing treatment have a relationship of crossed rubbing of 10 degrees, and the polyimide used in the alignment layer was further cured and made adhesive by a heat treatment at 220 degrees Celsius. Thereby, a liquid crystal panel having a gap of 1.6 µm was assembled.

Into this panel, a liquid crystal compound was injected in a vacuum condition, at a temperature of 85 degrees Celsius, and in isotropic condition. The liquid crystal compound used was the liquid crystal compound similar to the antiferroelectric liquid crystal compound which is shown in ASIA DISPLAY '95, pp. 61-64 and which shows the V-shaped switching. The spontaneous polarization of this liquid crystal material measured by applying triangular waves thereto was 165 nC/cm$^2$. Also, the response speed was between 200 microseconds and 800 microseconds, although it depends on the voltage of gray scale. By using a arbitrary waveform generator and a high output amplifier, square waves having a frequency of 3 kHz and amplitude of +/−10 V were applied to whole surface of the panel. By applying an electric field in this way, the panel was gradually cooled down to the room temperature at a rate of 1 degree/min. Driver IC's and the like were attached to the liquid crystal panel fabricated in this way, and a liquid crystal display was completed.

In the liquid crystal display according to the Example 6, a liquid crystal display was realized having a high contrast ratio, that is, 200 or more, and a wide viewing angle. Also, in this liquid crystal display, there was no sticking and image retention, and good image quality was obtained. Alignment of liquid crystal molecules was at the location in the center of the crossed rubbing directions, that is, the location deviated by 5 degrees from both of the rubbing directions. Also, the liquid crystal display was very robust against an external force.

Example 7

A liquid crystal display according to the Example 7 is similar to that of the Example 6, except that the domain divided in the Embodiment 11 according to the present invention can be appropriately controlled.

A method of manufacturing a liquid crystal display according to this example will now be described. A TFT substrate and a CF substrate were fabricated similarly to those of the liquid crystal display according to the Example 6. Directions of rubbing were crossed rubbing at an angle of 100 degrees. Uneven structures were disposed in the same shape and locations as those of the Embodiment 5 shown in FIG. 7. The other portions were fabricated similarly to those of the Example 6.

Figure 14:
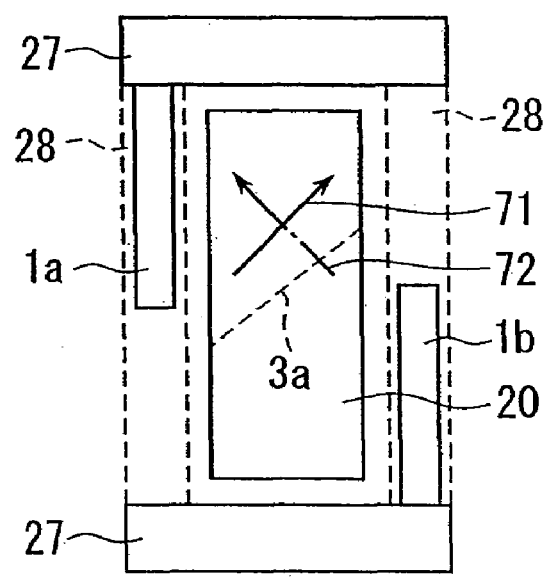
FIG. 14 is a top perspective plan view showing a portion including approximately one pixel of a liquid crystal display according to the seventh practical example of the present invention.

FIG. 14 is a perspective plan view of the liquid crystal display element according to the Example 7, showing a view looked from the direction of the top surface thereof. In addition to the structure of the liquid crystal display element of the Embodiment 5, FIG. 14 shows a rubbing direction 71 of the upper substrate (not shown), a rubbing direction 72 of the lower substrate, a disclination line 3*a* which appears when a voltage is applied to the liquid crystal display element of this example.

In this example, two different alignment directions divided by the disclination line 3*a* were obtained in each pixel. This is because, liquid crystal molecules are apt to align in directions deviated by 5 degrees from the directions of rubbing which are in the crossed rubbing of 100 degrees. Therefore, by optimizing the condition of the gradual cooling down, domains having two kinds of alignment directions which differ by just 90 degrees, according to the aligning force of respective substrates. In this example, because of the condition in which these domains having two kinds of alignment directions are easily obtained and because the alignments of liquid crystal molecules are controlled by the existence itself of the uneven structures and by the application electric field when the panel is gradually cooled down, the alignment domains were divided not randomly but into two domains.

In the Example 7, a flicker was not observed which was often observed when a ferroelectric liquid crystal material or a antiferroelectric liquid crystal material was used. It is considered that the liquid crystal domains having alignment directions which differ from each other by 90 degrees compensate with each other to eliminate such flicker.

As mentioned above, according to the present invention, in the liquid crystal display such as those according to the Embodiment 1 through the Embodiment 11, it is possible to provide a liquid crystal display in which disturbance of liquid crystal alignment such as disclination and the like caused by a lateral electric field does not occur. This is because, in the liquid crystal display according to the present invention, it is possible to control the lateral electric field appropriately.

Also, it is possible to provide a liquid crystal display in which disturbance or collapse of appropriately divided alignments of liquid crystal molecules dose not occur due to an external force exerted on the surface of the liquid crystal display. The liquid crystal display according to the present invention comprises uneven structures, and a mechanical strength of the liquid crystal display panel is strengthened by such uneven structures. It is also possible to further increase the mechanical strength by inserting spacers.

Further, according to the present invention, it is possible to easily realize division of domains having different alignment directions. The liquid crystal display according to the present invention provides division of alignments of liquid crystal molecules and can be manufactured by using a conventional manufacturing method without adding a process other than a process of forming the uneven structures.

Still further, according to the present invention, it is possible to easily make electrical contact, for example, between electrodes of upper substrate and lower substrate. In the liquid crystal display according to the present invention, by utilizing the uneven structures, it is possible to electrically and mechanically contact, for example, between the upper substrate and lower substrate, without using conductive adhesion layer having a large volume.

Also, according to the present invention, it is possible to provide a liquid crystal display which uses ferroelectric liquid crystal material or antiferroelectric liquid crystal material and which has a good display quality. This is because, in the liquid crystal display according to the present invention, a mechanical strength is large, no defect arises, and a predetermined alignment division is precisely obtained according to the design.

Embodiment 12

With reference to FIGS. 15A, 15B and 15C through FIG. 20, an explanation will be made on a liquid crystal display according to the twelfth embodiment of the present invention.

Figure 15A:
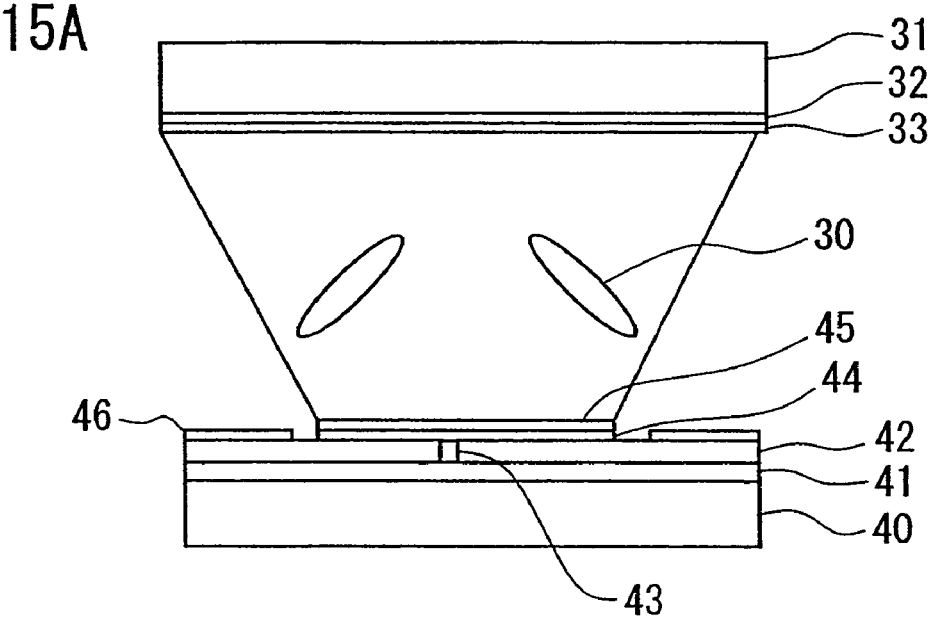
FIG. 15A is a schematic cross sectional view showing a portion including approximately one pixel of a liquid crystal display according to the twelfth embodiment of the present invention.
Figure 15B:
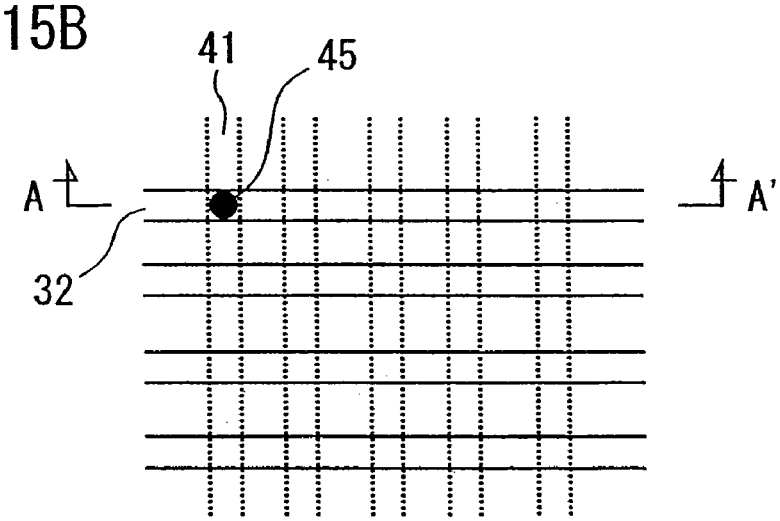
FIG. 15B is a schematic plan view showing a liquid crystal display according to the twelfth embodiment of the present invention.

The liquid crystal display according to this embodiment is a simple matrix type liquid crystal display, and FIG. 15A shows a cross section of one pixel of this liquid crystal display. FIG. 15B is a schematic plan view of the liquid crystal display according to this embodiment, and FIG. 15A is a cross sectional view taken on line A-A' of FIG. 15B.

An upper substrate is constituted by forming, on a glass substrate 31, transparent electrodes, that is, common electrodes, 32 made of ITO and the like. On the transparent electrodes 32, a homeotropic alignment film 33 is applied. In the simple matrix type liquid crystal display, a plurality of transparent electrodes 32 are formed as stripes, as shown in FIG. 15B. A lower substrate is constituted by forming transparent electrodes 41 as stripes on a substrate 40 such that the transparent electrodes 41 are formed in a direction perpendicular to the transparent electrodes 32 of the upper substrate. On the transparent electrodes 41, an insulating film or layer 42 of silicon nitride and the like is formed. Each of the transparent electrodes 41 is coupled to pixel electrodes 44 having an approximately symmetrical shape via through holes 43 formed in the insulating film 42. On each the pixel electrodes 44, there is formed a homeotropic alignment layer or film 45. These upper substrate and lower substrate are assembled via spacers not shown in the drawings, and liquid crystal molecules 30 having a negative anisotropy of permittivity are injected between these substrates.

Figure 15C:
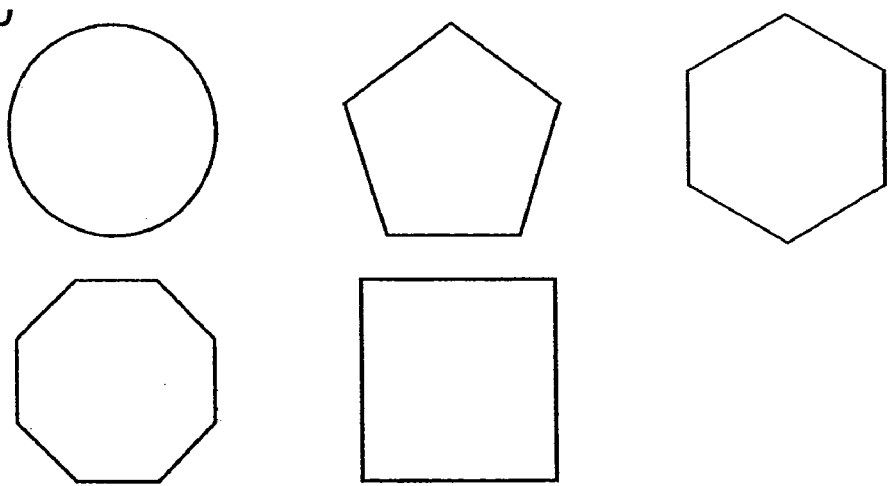
FIG. 15C shows examples of schematic shapes of pixel electrodes used in the liquid crystal display according to the present invention.

Each of the pixel electrodes 44 is smaller than the common electrode 32 and is within the area of the common electrode 32. Each of the pixel electrodes 44 has an approximately symmetrical shape, for example, a circle, an elliptic shape, a polygon or the like. In practice, as shown in FIG. 15C, each of the pixel electrodes 44 has a shape of a circle, an elliptic, an equilateral polygon such as an equilateral pentagon, an equilateral hexagon, an equilateral octagon, a square or the like, and other approximately symmetrical shape. In case the pixel electrode 44 is a polygon, it is not always necessary that the polygon is the precisely equilateral polygon, but the shape of the pixel electrode 44 may be somewhat varied from the equilateral polygon.

Also, a shield electrode 46 is disposed around the pixel electrode 44. The shield electrode 46 prevents an electric field by the lower transparent electrode 41 from affecting the division of alignment directions of liquid crystal molecules.

When no voltage is applied between the common electrode 32 of the upper substrate and the pixel electrode 44 of the lower substrate, liquid crystal molecules 30 are aligned approximately perpendicular to the substrates. When a voltage is applied between the common electrode 32 of the upper substrate and the pixel electrode 44 of the lower substrate, an electric field is produced between the common electrode 32 and the pixel electrode 44. In this case, since the pixel electrode 44 has a symmetrical shape and the size of the common electrode 32 is larger than that of the pixel electrode 32, the electric field produced between the pixel electrode 44 and the common electrode 32 is not completely perpendicular to the substrates. That is, the electric field produced between the pixel electrode 44 and the common electrode 32 has, as shown in FIG. 15A, slant components from peripheral portions of the pixel electrode toward the central portion. Therefore, liquid crystal molecules having a negative anisotropy of permittivity rotate symmetrically toward the center of the pixel as shown in FIG. 15A. That is, since the pixel electrode 44 has a symmetrical shape, the electric field is divided into components having different directions with symmetry. Accordingly, the alignment directions of liquid crystal molecules in each pixel are divided into different directions.

In this way, without performing special treatment on the alignment layers, it is possible to automatically or naturally divide direction of rotation of liquid crystal molecules and to obtain wide viewing angle characteristics. Therefore, by inserting the liquid crystal display panel having such structure between polarizer films which are disposed such that transmission axes thereof are orthogonal to each other, it is possible to realize a liquid crystal display of normally black mode having a wide viewing angle.

Figure 16:
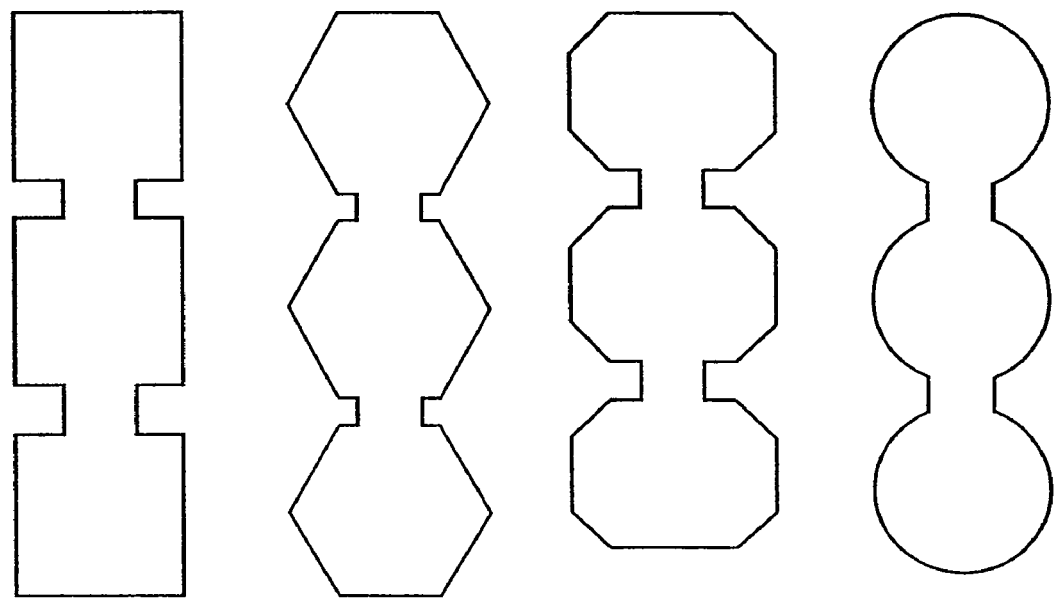
FIG. 16 shows examples of schematic shapes of pixel electrodes in which symmetrical shapes are combined and which are used in the liquid crystal display according to the present invention.
Figure 16:
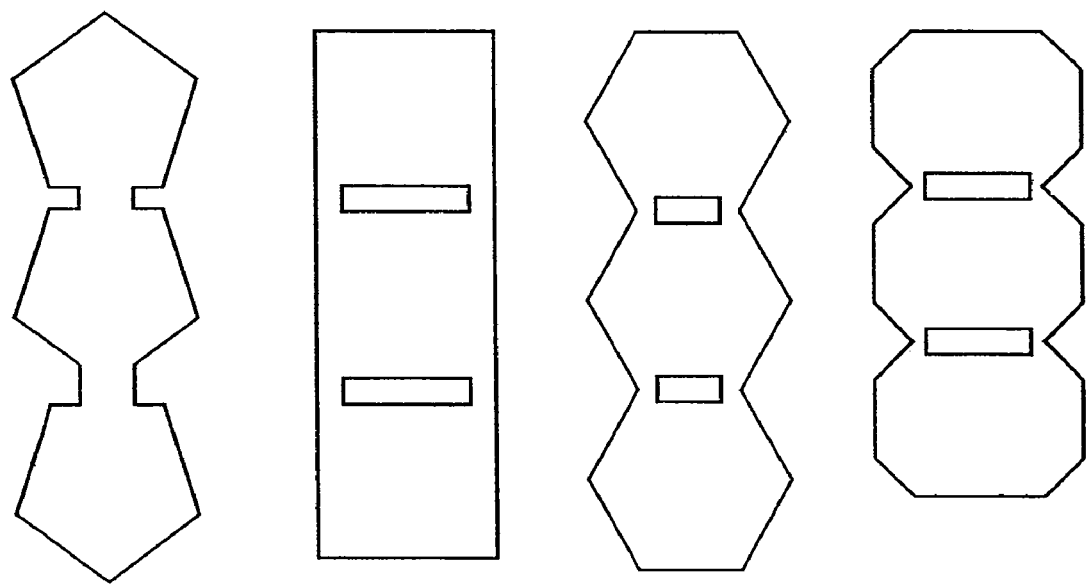

Also, in a usual liquid crystal display, the shape of a pixel electrode is a rectangle or an elongated shape. In such case, as shown in FIG. 16, several notches, cut in portions and the like are formed in the elongated pixel electrode to form a shape constituted of a link of electrode portions each having approximately symmetrical shape. It is also possible to form several opening portions in the elongated pixel electrode. By using such shape, it is possible to obtain the above-mentioned divided alignment directions in each of the electrode portions and, as a whole, to obtain the same advantageous effect as that obtained by the above-mentioned single symmetrical shape of the pixel electrode.

Figure 17:
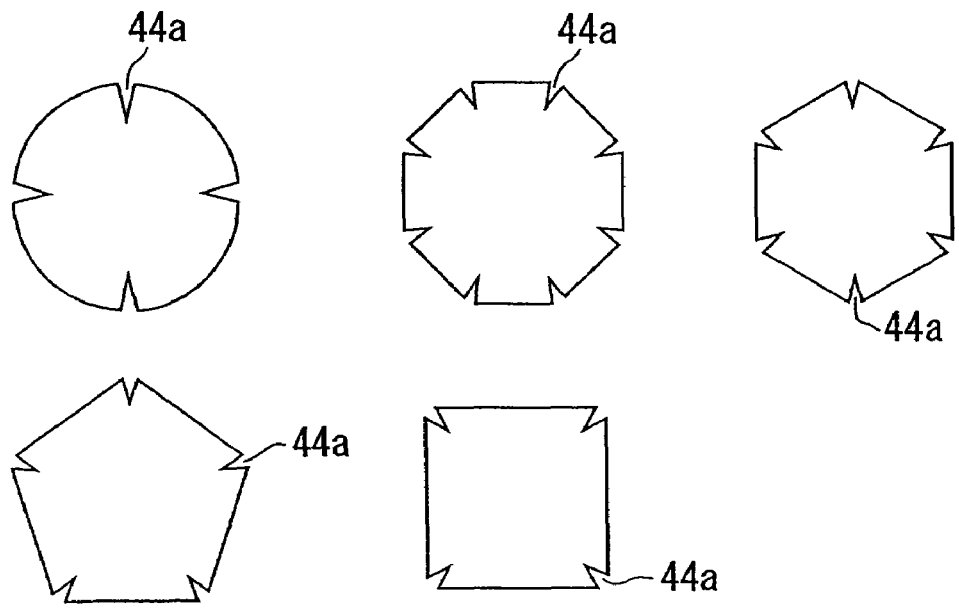
FIG. 17 shows examples of schematic shapes of pixel electrodes in which notches are provided and which are used in the liquid crystal display according to the present invention.

As shown in FIG. 17, in order to further improve a precision of locations where alignment directions of liquid crystal molecules are divided, it is possible to form notches at peripheral portions of a symmetrical shape or of a centrosymmetrical shape of each pixel electrode. Each of the notches may be, for example, a radial shape extending from the center of each pixel electrode. In case the shape the pixel electrode 44 is a polygon or a combination of polygons, it is possible to form the notches in each or every corner of the polygon.

Figure 18:
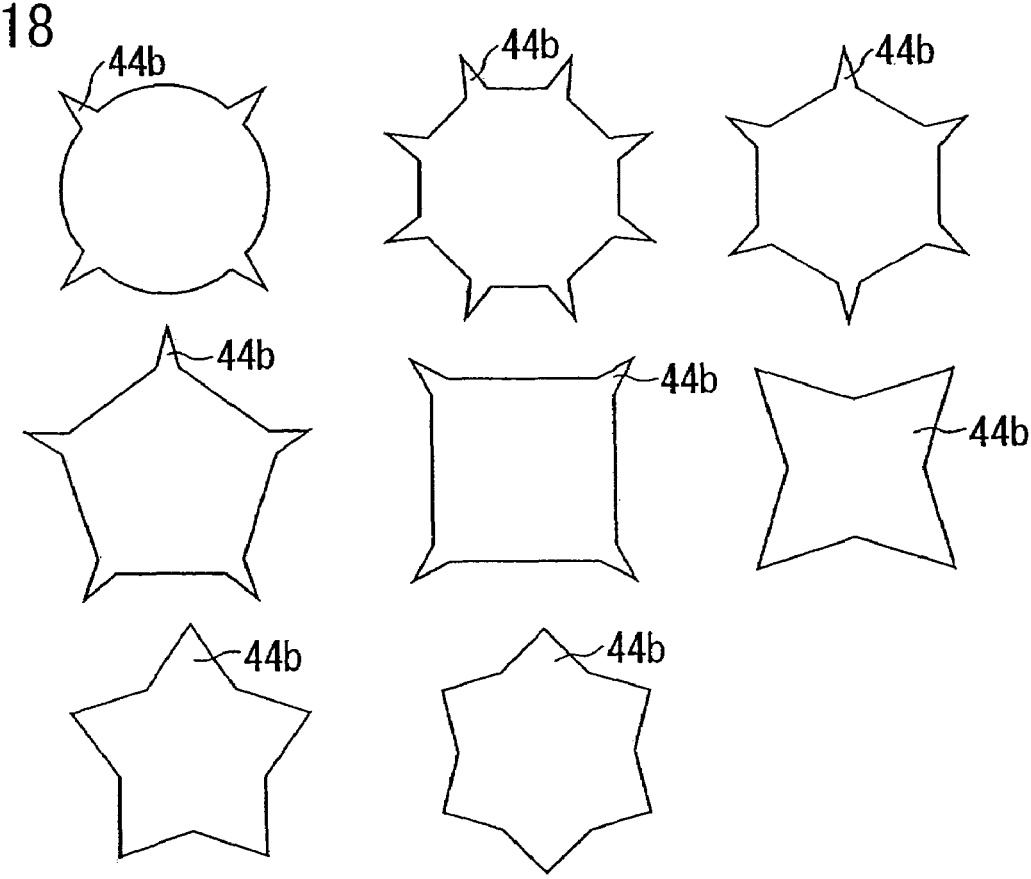
FIG. 18 shows examples of schematic shapes of pixel electrodes in which protrusions are provided and which are used in the liquid crystal display according to the present invention.

As shown in FIG. 18, it is also possible to form protrusions or projections 44b which project from the peripheral portions of a symmetrical shape or of a centrosymmetrical shape of each pixel electrode. In case the shape the pixel electrode 44 is a polygon or a combination of polygons, it is possible to form the projections in each or every corner of the polygon.

Figure 19:
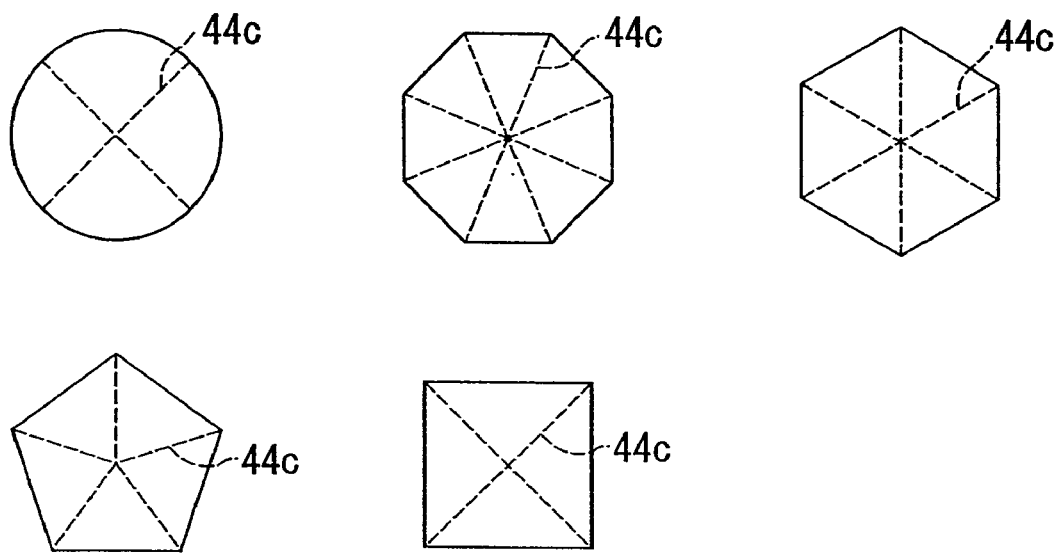
FIG. 19 shows examples of schematic shapes of pixel electrodes in which voids are provided and which are used in the liquid crystal display according to the present invention.

Further, as shown in FIG. 19, it is also effective to form voids 44c, that is, portions where no electrode material exists, which extend from the center toward peripheral portions of a symmetrical shape or of a centrosymmetrical shape of each pixel electrode 44.

Figure 20:
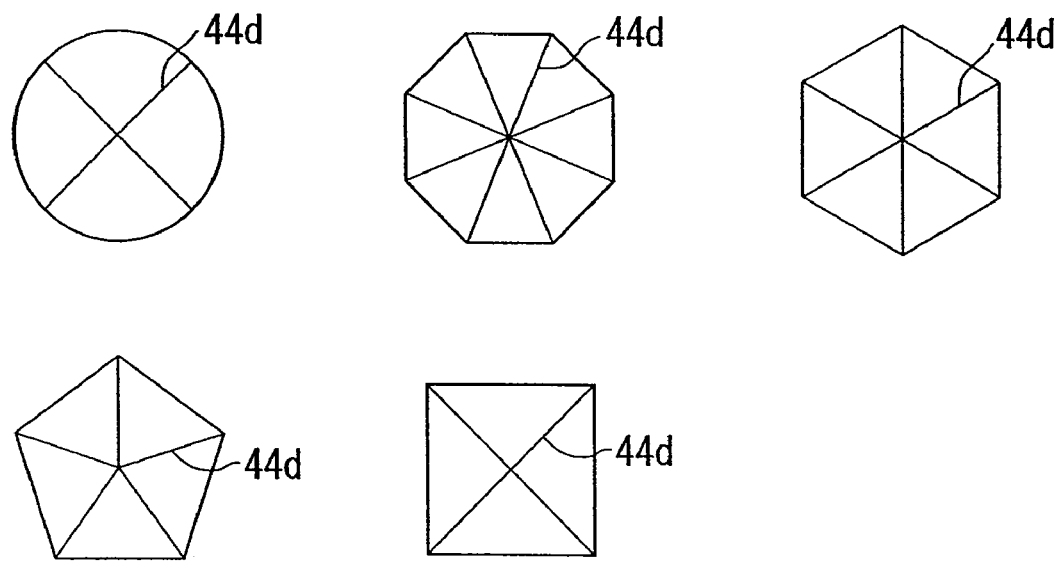
FIG. 20 shows examples of schematic shapes of pixel electrodes in which concave portions are provided and which are used in the liquid crystal display according to the present invention.

As shown in FIG. 20, it is also possible to form concave or recessed portions 44d which extend from the center toward peripheral portions of a symmetrical shape or of a centrosymmetrical shape of each pixel electrode 44. These concave portions 44d may be fabricated by forming concave portions in the pixel electrode 44 itself or, by forming concave portions in a layer under the pixel electrode 44, such as the insulating layer 42 and the like, and forming the pixel electrode 44 thereon. Of course, a combination of these methods may be utilized.

In the structure having such concave portions 44d, when an interlayer insulating film made of an organic film and the like exists between a TFT and the pixel electrode, or when the pixel electrode is disposed between a color filter layer and the liquid crystal layer, the concave portions 44d can be formed in the interlayer insulating film or in an overcoating layer. Thereby, it is possible to form deep concave portions 44d without complicating a manufacturing process of the liquid crystal display, and to precisely and stably define a boundary of divided domains having different alignment directions.

In case liquid crystal molecules have a homeotropic alignment, when an electric field is applied to the liquid crystal molecules, the alignment of the liquid crystal molecules is changed and stabilized into a spiral shaped alignment. In this case, it is possible to add chiral agent to the liquid crystal molecules to further stabilize the alignment and to increase response speed. Further, the above-mentioned notches, concave portions and the like in each pixel may be formed or disposed in a spiral shape.

In the above-mentioned explanation, the notches 44a, the protrusions 44b, the voids 44c and the concave portions 44d are formed or disposed from the center to the peripheral corners in the pixel electrode. However, in case the anisotropy of permittivity of liquid crystal molecules is positive and homogeneous alignment in which initial alignment directions of liquid crystal molecules in the upper and lower substrates are parallel or anti-parallel to each other is used, the notches 44a, the protrusions 44b, the voids 44c and the concave portions 44d may be formed or disposed parallel to sides of the polygon of the pixel electrode.

In the liquid crystal display according to the present invention, in order to further improve viewing angle characteristics, it is possible to dispose at least one optical compensation film or layer between a polarizer and a liquid crystal cell.

Since the liquid crystal molecules have a homeotropic alignment when no electric field is applied thereto, it is preferable that the optical compensation film is an optically negative compensation film, taking cancellation of variation in retardation when viewed from a slant direction into consideration. Such optical compensation film may be one sheet of film fabricated by using biaxial stretching, or may be a film made by laminating more than two sheets of uniaxial stretched films to substantially realize an optically negative uniaxial compensation film. By using such optical compensation film, retardation of liquid crystal molecules when no electric field is applied thereto can be effectively cancelled, and complete black is displayed when such liquid crystal display panel is viewed from every direction. Therefore, viewing angle characteristics can be further improved.

Depending on a type of a liquid crystal display, there is a possibility that a transition region appears between portions having different directions of falling down of liquid crystal molecules after the application of an electric field. Such transition region is observed as a black region when orthogonal polarizers are used, and causes deterioration of brightness. Also, sometimes it is also possible that, since the transition region does not move rapidly, an apparent response speed of the liquid crystal display becomes slow.

On the other hand, when the above-mentioned uniaxial film is a quarter-wave plate, it is possible to make the movement of the boundary portion invisible, and to obtain an apparently high response speed. That is, such quarter-wave plates are disposed orthogonally on both sides of the liquid crystal cell such that each optical axis is disposed at an angle of 45 degrees with an absorption axis of a polarizer. Thus, birefringency of the quarter-wave plate is decreased. Therefore, it is possible to further dispose a uniaxially stretched film to substantially obtain an optically negative uniaxial compensation film.

In the above-mentioned liquid crystal display, an initial alignment is the homeotropic alignment as a principle. However, if the initial alignment deviates in a direction because of a property of a liquid crystal display element, it is also possible to additionally stick a film having a positive value of optical anisotropy to compensate such deviation.

In the above, an explanation was made on transmission type liquid crystal displays. However, the present invention can be applied to a reflection type liquid crystal display by forming pixel electrodes by using a metal material having high reflectance such as aluminum (Al) and the like. In such case, it is possible to make white display more visible by forming uneven portions on the surface of the pixel electrode, by using a diffusion plate, or the like. Also, in the drawings, illustration of a color filter is omitted. However, it is possible to dispose the color filter between the upper substrate 31 and the transparent electrode 32 and thereby to realize a color liquid crystal display.

Now, description will be made on a method of manufacturing the liquid crystal display according to the present invention, and the like.

When manufacturing the liquid crystal display according to the present invention, it is possible to surely secure the initial alignment of liquid crystal molecules, by polymerizing monomer or oligomer which are added a little to liquid crystal molecules and which are easily polymerized, after controlling or adjusting the initial alignment by applying a voltage between the common electrode and each of the pixel electrodes. When controlling the initial alignment, it is possible to, after making the phase of a liquid crystal layer isotropic by heating, lower the temperature of the liquid crystal layer while applying a voltage between the common electrode and each pixel electrode. It is also possible to only apply a voltage between the common electrode and each pixel electrode at a room temperature.

The reaction of monomer or oligomer may be performed before the heating process for realizing the isotropic phase of the liquid crystal layer, may be performed during the heating, or may be performed after cooling the liquid crystal layer. In case the initial alignment is controlled by applying a voltage between the common electrode and each pixel electrode at a room temperature, the reaction of monomer or oligomer may be performed before applying a voltage, or may be performed after applying a voltage. In this case, since the alignment division can be done by using a usual drive method, it is not necessary to apply a voltage to second electrodes, that is, control electrodes, mentioned in Japanese patent laid-open publication No. 10-20323.

Also, when manufacturing the liquid crystal display according to the present invention, it is possible perform optical or photo aligning treatment on the substrate or substrates to control pretilt angles according to the shapes of divided domains. By such method, the initial alignment can be surely and reliably controlled. Thereby, it is possible to obtain synergistic effect from the effect of slant electric field components and the effect of the pretilt angle control. Thus, it is possible to realize more superior division of alignments of liquid crystal molecules than the liquid crystal display in which only one of the above-mentioned methods is used.

For example, an alignment layer is first formed by using a material having functional group in which alignment can be controlled by polarized light such as cinnamic acid group, or by using a polymer material which is described in AM-LCD, "96/IDW", 96 Digest of Technical Papers, p. 337 and in which photosensitive group is polymerized by irradiating polarized light thereon. Then, polarized light is irradiated onto each portion or domain of the alignment layer via a mask from a slant direction such that a predetermined pretilt angle corresponding to the divided domain is obtained. In this case, if the number of sides of the polygon is large, process steps of the optical alignment become large. Therefore, it is preferable that the polygon is approximately from a tetragon through an octagon.

The above-mentioned method of forming divided domains having different alignment is known well. It is possible to surely secure the divided alignments of liquid crystal molecules, by polymerizing monomer or oligomer which are added a little to liquid crystal molecules and which are easily polymerized, when the liquid crystal display is driven for display.

In the present invention, it is possible to use, as monomer or oligomer which are added a little to liquid crystal molecules, any of photocurable monomer, thermocurable monomer, oligomer of these, and the like. Also, it is possible to use a material which includes other component or components as long as the material includes any of these. The "photocurable monomer or oligomer" used in the present invention used in the present invention includes not only monomer or oligomer which is reacted or polymerized by visible light, but also ultravioletcurable monomer or oligomer which is reacted or polymerized by ultraviolet light. From the point of easiness of process operation, the latter is preferable to the former.

Also, in the present invention, it is possible to use, as monomer or oligomer which are added a little to liquid crystal molecules, it is possible to monomer or oligomer which has a property of liquid crystal and which has similar structure to that of liquid crystal molecules. However, monomer or oligomer is not always used for aligning liquid crystal molecules. Therefore, it is possible to use flexible monomer or oligomer such as that having alkylene chain. Further, it is possible to use monofunctional monomer or oligomer, bifunctional monomer or oligomer, multifunctional monomer or oligomer which is trifunctional or more, or the like.

As photocurable or ultravioletcurable monomer or oligomer usable in the present invention, there are, for example, monofunctional acrylate compounds such as 2-ethylhexyl acrylate, butylethyl acrylate, butoxyethyl acrylate, 2-cyanoethyl acrylate, benzyl acrylate, cyclohexyl acrylate, 2-hydroxypropyl acrylate, 2-ethoxyethyl acrylate, N,N-diethylaminoethyl acrylate, N,N-dimethylaminoethyl acrylate, dicyclopentanyl acrylate, dicyclopentenyl acrylate, glycidyl acrylate, tetrahydrofurfuryl acrylate, isobornyl acrylate, isodecyl acrylate, lauryl acrylate, morpholine acrylate, phenoxyethyl acrylate, phenoxydiethyleneglycol acrylate, 2,2,2-trifluoroethyl acrylate, 2,2,3,3,3-pentafluoropropyl acrylate, 2,2,3,3-tetrafluoropropyl acrylate, 2,2,3,4,4,4-hexafluorobutyl acrylate, and the like.

Also, it is possible to use, as photocurable or ultravioletcurable monomer or oligomer, monofunctional methacrylate compounds such as 2-ethylhexyl methacrylate, butylethyl methacrylate, butoxyethyl methacrylate, 2-cyanoethyl methacrylate, benzyl methacrylate, cyclohexyl methacrylate, 2-hydroxypropyl methacrylate, 2-ethoxyethyl methacrylate, N,N-ethylaminoethyl methacrylate, N,N-dimethylaminoethyl methacrylate, dicyclopentanyl methacrylate, dicyclopentenyl methacrylate, glycidyl methacrylate, tetrahydrofurfuryl methacrylate, isobornyl methacrylate, isodecyl methacrylate, lauryl methacrylate, morpholine methacrylate, phenoxyethyl methacrylate, phenoxydiethyleneglycol methacrylate, 2,2,2-trifluoroethyl methacrylate, 2,2,3,3,3-pentafluoropropyl methacrylate, 2,2,3,3-tetrafluoropropyl methacrylate, 2,2,3,4,4,4-hexafluorobutyl methacrylate, and the like.

Further, it is possible to use, as photocurable or ultravioletcurable monomer or oligomer, multifunctional acrylate compounds such as 4,4'-biphenyl diacrylate, diethylstilbestrol diacrylate, 1,4-bisacryloyloxybenzen, 4,4'-bisacryloyloxydiphenyl ether, 4,4'-bisacryloyloxydiphenylmethane, 3,9-bis[1,1-dimethyl-2-acryloyloxydiethyl]-2,4,8,10-tetraspiro[5,5]undecane, α,α'-bis[4-acryloyloxyphenyl]-1,4-diisopropylbenzen, 1,4-bisacryloyloxytetrafluorobenzen, 4,4'-bisacryloyloxyoctafluorobiphenyl, diethyleneglycol diacrylate, 1,4-butanediol diacrylate, 1,3-butyleneglycol diacrylate, dicyclopentanyl diacrylate, glycerol diacrylate, 1,6-hexanediol diacrylate, neopentylglycol diacrylate, tetraethylene glycol diacrylate, trimethylolpropane triacrylate, pentaerythritol tetraacrylate, pentaerythritol triacrylate, ditrimethylolpropane tetraacrylate, dipentaerythritol hexaacrylate, dipentaerythritolmonohydroxy pentaacrylate, 4,4'-diacryloyloxystilbene, 4,4'-diacryloyloxydimethylstilbene, 4,4'-diacryloyloxydiethylstilbene, 4,4'-diacryloyloxydipropylstilbene, 4,4'-diacryloyloxydibutylstilbene, 4,4'-diacryloyloxydipentylstilbene, 4,4'-diacryloyloxydihexylstilbene, 4,4'-diacryloyloxydifluorostilbene, 2,2,3,3,4,4-hexafluoropentanediol-1,5-diacrylate, 1,1,2,2,3,3-hexafluoropropyl-1,3-diacrylate, urethane acrylate oligomer, and the like.

Still further, it is possible to use, as photocurable or ultravioletcurable monomer or oligomer, multifunctional methacrylate compounds such as diethyleneglycol dimethacrylate, 1,4-butanediol dimethacrylate, 1,3-butyleneglycol dimethacrylate, dicyclopentanyl dimethacrylate, glycerol dimethacrylate, 1,6-hexanediol dimethacrylate, neopentylglycol dimethacrylate, tetraethyleneglycol dimethacrylate, trimethylolpropane trimethacrylate, pentaerythritol tetramethacrylate, pentaerythritol trimethacrylate, ditrimethylolpropane tetramethacrylate, dipentaerythritol hexamethacrylate, dipentaerythritolmonohydroxy pentamethacrylate, 2,2,3,3,4,4-hexafluoropentanediol-1,5-dimethacrylate, urethane methacrylate oligomer, and the like. It is also possible to use styrene, aminostyrene, vinyl acetate, and the like. However, the present invention is not limited only to those.

The drive voltage of the liquid crystal display according to the present invention is also influenced by the interaction between the polymer material and liquid crystal material at the interface therebetween. Therefore, it is also possible to form polymer compounds by using monomer or oligomer which includes fluorine elements. It is possible to use, as such monomer or oligomer, 2,2,3,3,4,4-hexafluoropentanediol-1,5-diacrylate, 1,1,2,2,3,3-hexafluoropropyl-1,3-diacrylate, 2,2,2-trifluoroethyl acrylate, 2,2,3,3,3-pentafluoropropyl acrylate, 2,2,3,3-tetrafluoropropyl acrylate, 2,2,3,4,4,4-hexafluorobutyl acrylate, 2 2,2-trifluoroethyl methacrylate, 2,2,3,3-tetrafluoropropyl methacrylate, 2,2,3,4,4,4-hexafluorobutyl methacrylate, urethane acrylate oligomer, and the like. Of course, the present invention is not limited to those.

In the present invention, when photocurable or ultravioletcurable monomer or oligomer is used as monomer or oligomer which are added a little to liquid crystal molecules, it is possible to photo-initiator or ultraviolet-initiator. It is possible to use various initiator, for example, acetophenone and the derivatives such as 2,2-diethoxyacetophenone, 2-hydroxy-2-methyl-1-phenyl-1-one, 1-(4-isopropylphenyl)-2-hydroxy-2-methylpropane-1-one and 1-(4-dodecylphenyl)-2-hydroxy-2-methylpropane-1-one, benzoin and the derivatives such as benzoinmethyl ether, benzoinethyl ether and benzildimethyl ketal, benzophenone and the derivatives such as benzophenone, benzoyl benzoate, 4-phenylbenzophenone and 3,3-dimethyl-4-methoxybenzophenone, thioxanthone and the derivatives such as thioxanthone, 2-chlorthioxanthone and 2-methylthioxanthone, diazonium salt and the derivatives, sulfonium salt and the derivatives, iodonium salt and the derivatives, selenium salt and the derivatives, and the like.

Next, some practical examples concerning the above-mentioned 12th embodiment will be described.

Example 8

On the glass substrates 31 and 40, ITO is deposited by sputtering, and ITO electrodes 32 and 41 were formed in stripes for forming a matrix. A silicon nitride film 42 was deposited on the lower substrate 40, and, by using photolithography, through holes 43 were formed via the silicon nitride film 42. Then ITO was again deposited by sputtering, and, by using photolithography, pixel electrodes 44 each having a hexagon shape were formed. A homeotropic layers 33 and 45 (SE1211 purchased from Nissan Chemical Industries, LTD) were applied on the ITO electrode 32 and the pixel electrodes 44, and dried by heating for 1 hour at 200 degrees Celsius.

Sealing material was applied in the peripheral portion of the substrate or substrates, and spacer material was sprayed. Then, the upper substrate and the lower substrate were stuck to each other such that the ITO electrodes 32 and 41 cross each other, and the pixel electrodes 44 and the ITO electrodes 32 were aligned. The sealing material was cured by heating. Then, nematic liquid crystal material 30 was injected into the space between the substrates, and injecting hole or holes were sealed by using photocurable resin. A optically negative compensation film which has the same Δnd as that of the liquid crystal layer and has an opposite polarity to that of the liquid crystal layer was stuck to the liquid crystal panel, and then polarizers were stuck to the upper substrate and the lower substrate such that the transmission axis thereof become perpendicular to each other.

When viewing angle characteristics made in this way were measured, no inversion of gray shades was observed, and superior viewing angle characteristics were obtained in which a high contrast area was very wide.

Example 9

A liquid crystal display was fabricated similarly to the eighth example (Example 8), except that a shielding electrode 46 was formed on the silicon nitride layer 42 of the lower substrate 40 around the pixel electrodes 44 each having a hexagonal shape such that the shielding electrode 46 surrounds each pixel electrode. The shielding electrode 46 was made only by changing a mask for fabricating the pixel electrodes 44. The shielding electrode 46 was coupled with a voltage source of 0V.

When viewing angle characteristics made in this way were measured, no inversion of gray shades was observed, and superior viewing angle characteristics were obtained in which a high contrast area was very wide. Also, when the inside of a pixel was observed through the microscope, abnormal disclination inside the pixel was not observed at all, which was rarely observed in the eighth example.

Embodiment 13

Figure 21A:
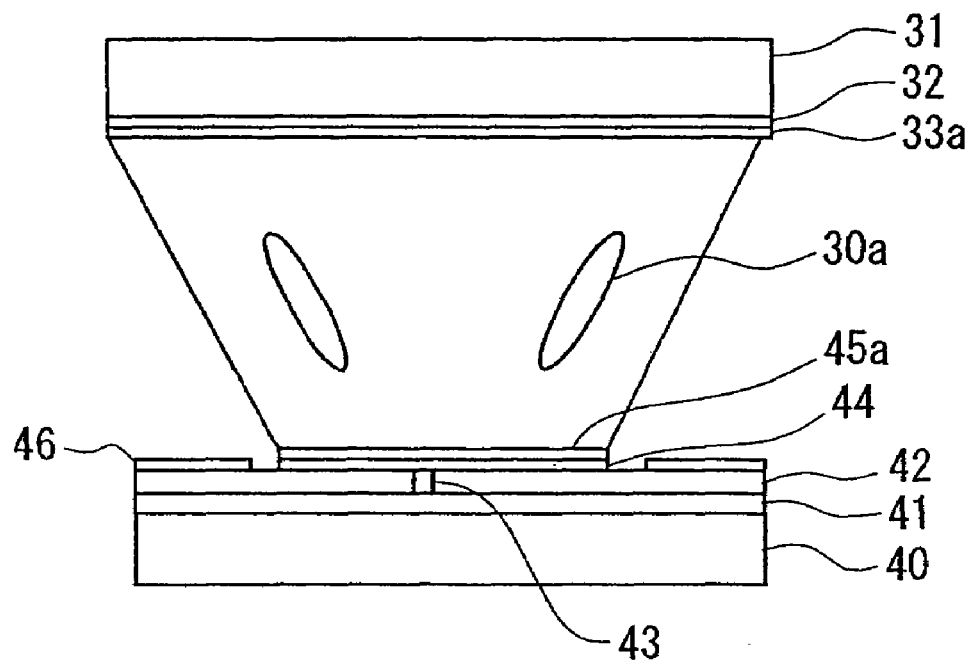
FIG. 21A is a schematic cross sectional view showing a portion including approximately one pixel of a liquid crystal display according to the thirteenth embodiment of the present invention.
Figure 21B:
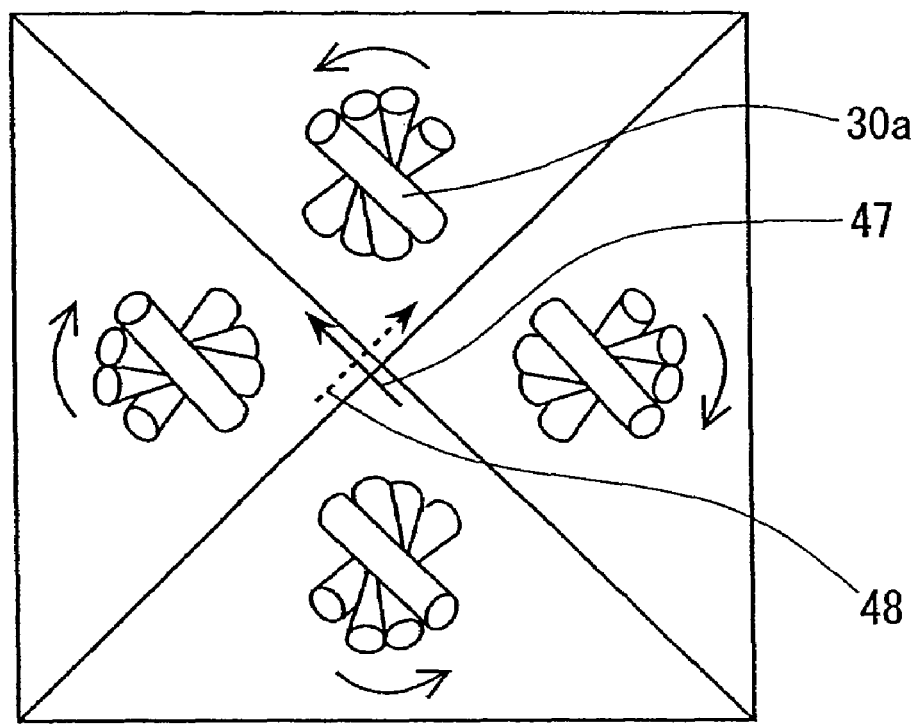
FIG. 21B is a schematic plan view showing a pixel area which includes divided domains having different alignment directions in a liquid crystal display according to the thirteenth embodiment of the present invention.

With reference to FIG. 21A and FIG. 21B, an explanation will be made on a liquid crystal display according to the thirteenth embodiment of the present invention. The liquid crystal display according to this embodiment is a simple matrix type liquid crystal display. The liquid crystal display uses liquid crystal molecules which have a positive anisotropy of permittivity and which have a twisted nematic (TN) alignment when no voltage is applied thereto. FIG. 21A shows a cross section of one pixel of this liquid crystal display. FIG. 21B is a schematic plan view of one pixel of this liquid crystal display.

An upper substrate is constituted by forming, on a glass substrate 31, transparent electrodes, that is, common electrodes, 32 made of ITO and the like. On the transparent electrodes 32, an alignment film or layer 33a is applied. By rubbing this alignment layer 33a, liquid crystal molecules align in a direction perpendicular to the direction of the rubbing, and the pretilt angle is approximately zero, or very small, that is, equal to or smaller than 1 degree. In the simple matrix type liquid crystal display, a plurality of transparent electrodes 32 are formed in stripes. A lower substrate is constituted by forming transparent electrodes 41 in stripes on a substrate 40 such that the transparent electrodes 41 are formed in a direction perpendicular to the transparent electrodes 32 of the upper substrate. On the transparent electrodes 41, an insulating film or layer 42 of silicon nitride and the like is formed. Each of the transparent electrodes 41 is coupled to pixel electrodes 44 having an approximately symmetrical shape via through holes 43 formed in the insulating film 42. On each of the pixel electrodes 44, there is formed a homeotropic alignment layer or film 45a. These upper substrate and lower substrate are assembled via spacers not shown in the drawings, and liquid crystal molecules 30a having a positive anisotropy of permittivity are injected between these substrates.

Each of the pixel electrodes 44 is smaller than the common electrode 32 and is within the area of the common electrode 32. Also, a shield electrode 46 is disposed around the pixel electrode 44. The shield electrode 46 prevents an electric field by the lower transparent electrode 41 from affecting the division of alignment directions of liquid crystal molecules.

In this embodiment, alignment directions of liquid crystal molecules are defined by performing a treatment such as rubbing, optical aligning and the like. In FIG. 21B, alignment direction of liquid crystal molecules on the side of the upper substrate 31 is shown by an arrow 47, and alignment direction of liquid crystal molecules on the side of the lower substrate 40 is shown by an arrow 48. Such alignment can be easily obtained by, for example, using alignment layers which align the liquid crystal molecules in a direction perpendicular to the rubbing direction, or by irradiating polarized light onto an optical alignment film from a direction normal to the substrate. Also, in this embodiment, chiral agent is not added.

In liquid crystal molecules which have a positive anisotropy of permittivity and which have twisted nematic alignment, there are two or more kinds of combination of a direction of twist and a direction of rise of liquid crystal molecules, thereby it becomes possible to divide alignment of liquid crystal molecules in a pixel. In case of the twisted nematic alignment, probability of occurrence of rising directions of liquid crystal molecules becomes equal to each other. Therefore, it is preferable that the pretilt angle of liquid crystal molecules at the surface of the substrate is as small as possible. It is preferable that the pretilt angle is 1 degree or smaller, and, if possible, it is preferable that the pretilt angle is zero.

When no voltage is applied between the common electrode 32 of the upper substrate and the pixel electrode 44 of the lower substrate, liquid crystal molecules 30a are aligned approximately perpendicular to the rubbing directions of the alignment layers 33a and 45a of the upper and lower substrates. The pretilt angle is approximately zero, or very small (1 degree or smaller). When a voltage is applied between the common electrode 32 of the upper substrate and the pixel electrode 44 of the lower substrate, an electric field is produced between the common electrode 32 and the pixel electrode 44. In this case, since the pixel electrode 44 has a symmetrical shape and the size of the common electrode 32 is larger than that of the pixel electrode 32, the electric field produced between the pixel electrode 44 and the common electrode 32 is not completely perpendicular to the substrates. That is, the electric field produced between the pixel electrode 44 and the common electrode 32 has, as shown in FIG. 21A, slant components from peripheral portions of the pixel electrode toward the central portion. Because of the shapes of the upper and lower electrodes, the slant components of the electric field have good symmetry.

In each domain of the pixel, there is a possibility of occurrence of twist of liquid crystal molecules in both direction, that is, twist toward right and twist toward left. However, because of the above-mentioned slant components of the electric field, in each of the domains shown in FIG. 21B, twist of liquid crystal molecules in one of the directions occurs preferentially. As a result thereof, an alignment condition shown in FIG. 21B appears automatically. That is, since the pixel electrode 44 of the lower substrate has a symmetrical shape, and is smaller than the common electrode 32 and is within the area of the common electrode 32. Therefore, in the twisted nematic alignment, each pixel is divided into domains having different alignment directions with good symmetry. Accordingly, the alignment directions of liquid crystal molecules in each pixel are automatically divided into different directions, and it is possible to obtain wide viewing angle characteristics.

When the liquid crystal display panel having such structure is inserted between polarizer films which are disposed such that transmission axes thereof are orthogonal to each other, it is possible to realize a liquid crystal display of normally white mode having good viewing angle characteristics. Also, at each boundary between adjacent domains, regions having different twist directions meet with each other. Therefore, leakage of light does not occur at the boundary, and it is possible to obtain a high contrast ratio without providing any light shield layer and the like.

As shown in FIG. 17, in order to further improve a precision of locations where alignment directions of liquid crystal molecules are divided, it is possible to form notches 44a at peripheral portions of a symmetrical shape or of a centrosymmetrical shape of each pixel electrode. In case the shape the pixel electrode 44 is a polygon or a combination of polygons, it is possible to form the notches in each or every corner of the polygon.

As shown in FIG. 18, it is also possible to form protrusions or projections 44b which project from the peripheral portions of a symmetrical shape or of a centrosymmetrical shape of each pixel electrode. In case the shape the pixel electrode 44 is a polygon or a combination of polygons, it is possible to form the projections in each or every corner of the polygon.

Further, as shown in FIG. 19, it is also effective to form voids 44c, that is, portions where no electrode material exists, which extend from the center toward peripheral portions of a symmetrical shape or of a centrosymmetrical shape of each pixel electrode 44.

As shown in FIG. 20, it is also possible to form concave or recessed portions 44d which extend from the center toward peripheral portions of a symmetrical shape or of a centrosymmetrical shape of each pixel electrode 44. These concave portions 44d may be fabricated by forming concave portions in the pixel electrode 44 itself or, by forming concave portions in a layer under the pixel electrode 44, such as the insulating layer 42 and the like, and forming the pixel electrode 44 thereon. Of course, a combination of these methods may be utilized.

The method for further improving sure division of domains by using optical alignment is not applicable to the twisted nematic type liquid crystal display. However, the method for surely retain division of alignment even when the liquid crystal display is driven to operate by polymerizing the monomer or oligomer which is easily polymerized and which is added a little to the liquid crystal molecules can be applied to this embodiment, in a manner similar to the liquid crystal display in which the anisotropy of permittivity is negative.

Figure 22A:
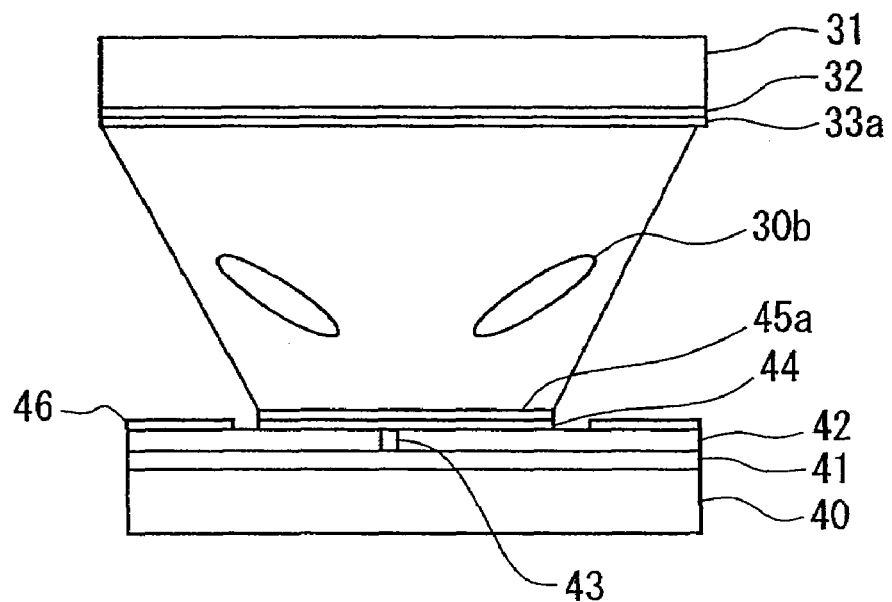
FIG. 22A is a schematic cross sectional view showing a portion including approximately one pixel of a liquid crystal display according to a variation of the thirteenth embodiment of the present invention.
Figure 22B:
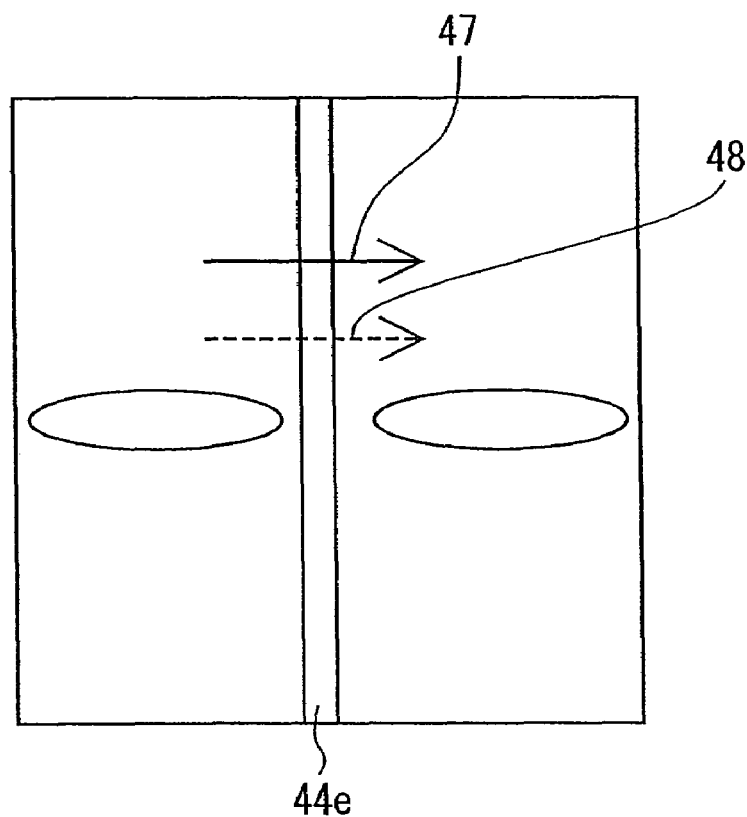
FIG. 22B is a schematic plan view showing a pixel area which includes divided domains having different alignment directions in a liquid crystal display according to the variation of the thirteenth embodiment of the present invention.

FIG. 22A shows an example of a liquid crystal display uses liquid crystal molecules which have a positive anisotropy of permittivity and which have a homogeneous alignment when no voltage is applied thereto. In this case, rubbing or optical aligning treatment is performed on an upper substrate and a lower substrate to define a alignment direction of liquid crystal molecules. FIG. 22A shows a cross section of one pixel of such liquid crystal display. FIG. 22B is a schematic plan view of one pixel of this liquid crystal display. In FIG. 22B, an alignment direction of liquid crystal molecules on the side of the substrate 31 is shown by an arrow 47, and an alignment direction of liquid crystal molecules on the side of the lower substrate 40 is shown by an arrow 48. In this liquid crystal display, similarly to that of the twisted nematic type, it is preferable that the pretilt angle is approximately zero. Such alignment can be easily obtained by, for example, using alignment layers which align the liquid crystal molecules in a direction perpendicular to the rubbing direction, or by irradiating polarized light onto an optical alignment film from a direction normal to the substrate. Also, in this embodiment, chiral agent is not added.

When a voltage is applied between the common electrode 32 of the upper substrate and the pixel electrode 44 of the lower substrate, an electric field is produced between the common electrode 32 and the pixel electrode 44. The electric field produced between the pixel electrode 44 and the common electrode 32 has slant components having good symmetry because of the shapes of the common electrode 32 and the pixel electrode 44. The alignment directions of liquid crystal molecules at the interface between liquid crystal molecules and the substrate surfaces are determined as mentioned above and, therefore, two kinds of domains having different rising directions are produced.

In case the liquid crystal display has a homogeneous alignment, it is preferable to provide a recessed or concave portion 44e at the central portion of the pixel as shown in FIG. 22B to stabilize a location of the boundary area.

Other portions of the liquid crystal display shown in FIG. 22A and FIG. 22B are the same as those of FIG. 21A and FIG. 21B. Therefore, like portions in FIGS. 22A and 22B are designated by the same reference numerals used in FIGS. 21A and 21B, and description thereof is omitted here.

When liquid crystal molecules have a positive anisotropy of permittivity and are homogeneous aligned when no voltage is applied thereto, a pixel area is divided not into four domains but into two domains in which only rising directions from the initial alignment directions differ from each other. In this case, it is possible to dispose a negative uniaxial optical compensation film such that the optical axis thereof coincides with the optical axis of the liquid crystal panel when no voltage is applied thereto, thereby a normally black display is obtained. Alternatively, it is possible to dispose a negative optical compensation film such that the optical axis thereof gradually inclines so as to simulate alignment of liquid crystal molecules in either one of the domains when a voltage is applied thereto, thereby a normally white display is obtained.

Here, in case the liquid crystal display is a normally black type, it is preferable to make a retardation of at least one of the domains and the compensation film to zero when no voltage is applied thereto, thereby a sufficiently wide viewing angle is obtained. Also, in case the liquid crystal display is a normally white type, it is preferable to make a retardation of at least one of the domains and the compensation film to zero when a voltage is applied thereto, thereby a sufficiently wide viewing angle is obtained.

In this liquid crystal display, it is preferable to form the notches shown in FIG. 17 and formed partially in the pixel electrode on the side of the lower substrate, the voids shown in FIG. 19, the concave portions shown in FIG. 20, or the like parallel to the sides of the pixel electrode, and to make the initial alignment of liquid crystal molecules perpendicular to these structures.

It is also preferable that the pretilt angle is approximately zero, similarly to the liquid crystal display of TN mode.

With respect to the alignment division, when the space between adjacent pixels is sufficiently large, generally no problem arises. However, when the space between adjacent pixels becomes small due to a design matter and the like, it is preferable to use the so called dot-inversion drive method in which polarity of voltages applied to the adjacent pixel becomes opposite to each other. In such case, condition of generation of slant components of an electric field is improved, and a better drive system is provided.

Also, since an initial response speed of liquid crystal molecules is very fast, it is advantageous to utilize only such high speed response. In order to attain this, it is possible to drive a liquid crystal display such that a reset operation by which an image signal is returned to a black condition is inserted within one frame.

Such drive method in which a reset operation is inserted is usually used to sharpen a displayed image of a moving picture. In the liquid crystal display according to the present invention, a preferable side effect is further obtained in which an apparent response speed becomes high.

Also, by previously applying a voltage near the threshold value before starting each frame, it is possible to perform division of liquid crystal alignment more surely and in a shorter time. The voltage near the threshold value may be a value slightly smaller than the threshold value, or may be a value slightly larger than the threshold value. When the voltage is slightly larger than the threshold value, there appears a portion where liquid crystal alignment starts to vary. If there is a possibility that a contrast ratio decreases by the leakage of light from such portion, by the variation of quantity of transmitted light and the like, it is possible to optically shield such portion.

In the above, an explanation was made on transmission type liquid crystal displays. However, the present invention can be applied to a reflection type liquid crystal display by forming pixel electrodes by using a metal material having high reflectance such as aluminum (Al) and the like. In such case, it is possible to make white display more visible, by forming uneven portions on the surface of the pixel electrode, by using a diffusion plate, or the like. Also, in the drawings, illustration of a color filter is omitted. However, it is possible to dispose the color filter between the upper substrate 31 and the transparent electrode 32 and thereby to realize a color liquid crystal display.

Example 10

Similarly to the Example 8, after forming ITO electrodes 32 and 41 and a silicon nitride film 42 on the glass substrates 31 and 40, pixel electrodes 44 each having a square shape were formed, by using photolithography. As alignment films, JALS-428 purchased from JSR Corporation was used. Also, as a liquid crystal agent having a positive anisotropy of permittivity, ZL14792 from which chiral agent was removed was used. Thereby, a liquid crystal display panel was fabricated. Rubbing was performed such that alignment directions of liquid crystal molecules on the lower substrate and on the upper substrate becomes perpendicular to each other, especially such that the alignment directions coincide with the directions of diagonal lines of the square shape. In JALS-428 alignment layer, liquid crystal molecules aligned in a direction perpendicular to the direction of rubbing. The pretilt angle measured by using a crystal rotation method was approximately zero degree. Also, the thickness of liquid crystal cell was approximately 5 μm.

By using a New-Vac film purchased from Sumitomo Chemical Co., LTD as a compensation film, viewing angle characteristics were measured. As a result thereof, it was found that no inversion of gray shades was observed in whole area of the panel, and superior viewing angle characteristics were obtained.

Embodiment 14

Figure 23A:
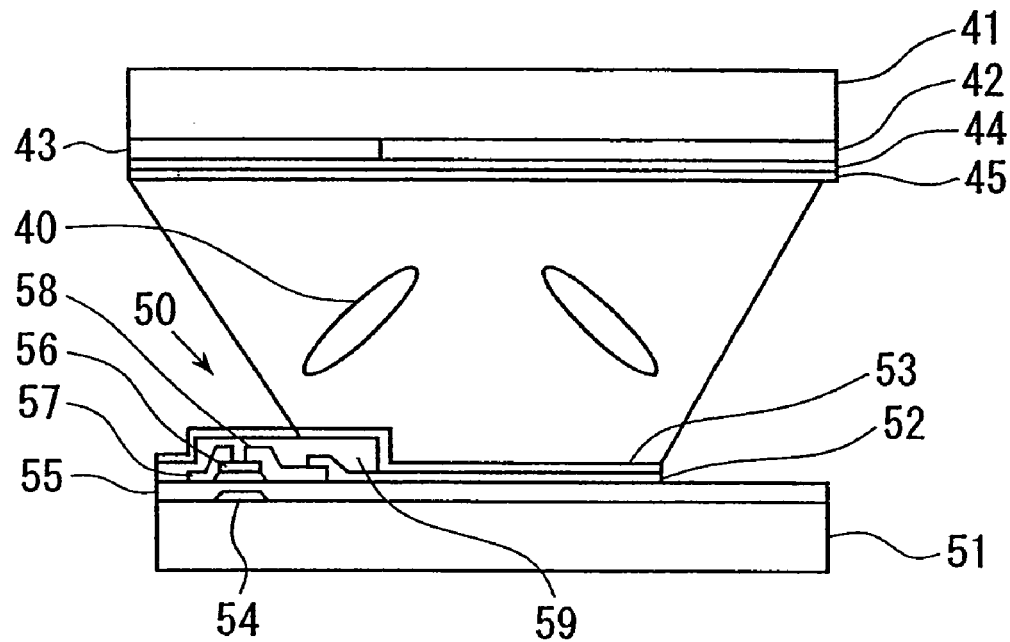
FIG. 23A is a schematic cross sectional view showing a portion including approximately one pixel of a liquid crystal display according to the fourteenth embodiment of the present invention.
Figure 23B:
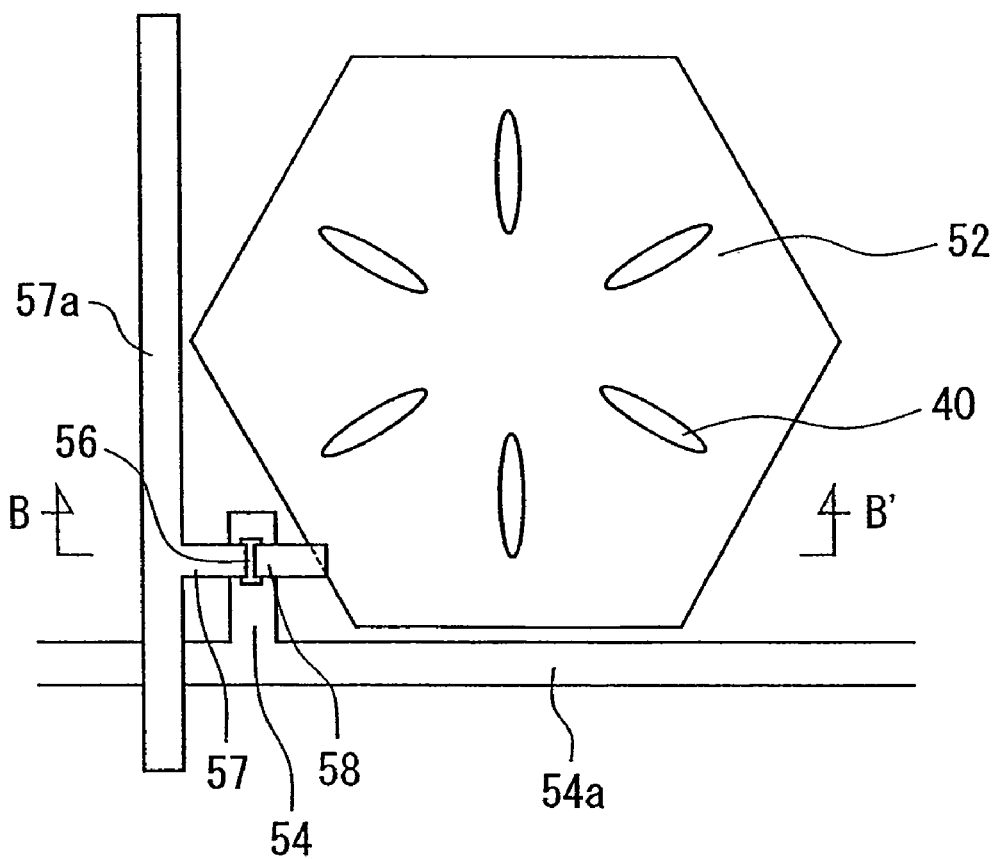
FIG. 23B is a schematic plan view showing a pixel area which includes divided domains having different alignment directions in a liquid crystal display according to the fourteenth embodiment of the present invention.

With reference to FIGS. 23A and FIG. 23B, an explanation will be made on a liquid crystal display according to the fourteenth embodiment of the present invention.

The liquid crystal display according to this embodiment is an active matrix type liquid crystal display in which liquid crystal molecules are driven by active elements. FIG. 23A shows a cross section of one pixel of this liquid crystal display. FIG. 23B is a schematic plan view of the liquid crystal display according to this embodiment, and FIG. 23A is a cross sectional view taken on line B-B' of FIG. 23B.

On a transparent substrate 41 of upside, color filter layer 42 and a light shielding layer 43 are formed, and on these layers, a common electrode 44 is formed over approximately whole area of the transparent substrate. On the common electrode 44, a homeotropic alignment film 45 is applied.

On a lower substrate 51, there is formed a thin film transistor 50. In the thin film transistor 50, a gate electrode, that is, a scanning electrode, 54 made of Cr is disposed. A gate insulating film 55 made of silicon nitride is formed so as to cover the gate electrode 54. On the gate electrode 54, there is formed a semiconductor film 56 made of amorphous silicon via the gate insulating film 55. The semiconductor film 56 functions as an active layer of the thin film transistor (TFT) 50. Also, a drain electrode 57 and a source electrode 58 made of molybdenum are formed such that each of these electrodes 57 and 58 partially overlaps the pattern of the semiconductor film 56. A protective film 59 made of silicon nitride is formed to cover all of these components.

Although not shown in the drawings, the drain electrode 57 and the source electrode 58 partially overlaps the pattern of the semiconductor film 56 via an amorphous silicon film into which n type impurities are doped.

As shown in FIG. 23B, the drain electrode 57 contacts a data line, that is, image signal line, 57a. In other words, the drain electrode 57 is formed as a part of the data line 57a. Also, the gate electrode 54 is formed as a part of the scanning line 54a.

Also, a pixel electrode 52 is formed on the insulating film 55 and coupled with the source electrode 58. On the pixel electrode 52, a homeotropic alignment layer or film 53 is formed.

In this embodiment, the pixel electrode 52 is coupled with the source electrode 58, and an image signal is applied to the pixel electrode 52 from the source electrode 58. On-off of the image signal is controlled by the scanning signal. The pixel electrode 52 has a shape having a good symmetry. In this embodiment, the pixel electrode 52 has a hexagonal shape, but it is possible to obtain similar effect by using other shape, such as a circle, a pentagon, a square, or the like.

It should be noted that liquid crystal molecules 40 having a negative anisotropy of permittivity are injected between the upper and lower substrates.

Since the alignment layers 44 and 53 of the upper and lower substrates are homeotropic alignment layer, when no voltage is applied, liquid crystal molecules 40 are aligned approximately perpendicular to the substrates.

When the thin film transistor (TFT) 50 is turned on by applying a voltage to the gate electrode 54 thereof, a voltage is applied to the source electrode 58 and an electric field is produced between the common electrode 44 and the pixel electrode 52 opposing to each other. In this case, since the pixel electrode 52 has a good symmetry and the size of the common electrode 44 is larger than that of the pixel electrode 52, the electric field produced between the pixel electrode 52 and the common electrode 44 is not perpendicular to the substrates. That is, the electric field produced between the pixel electrode 52 and the common electrode 44 has, as shown in FIG. 23A, slant components from peripheral portions of the pixel electrode toward the central portion. Therefore, liquid crystal molecules having a negative anisotropy of permittivity rotate symmetrically toward the center of the pixel as shown in FIG. 23A. That is, since the pixel electrode 52 has a symmetrical shape, the electric field is divided into components having different directions with symmetry. Accordingly, the alignment directions of liquid crystal molecules in each pixel are automatically divided into different directions.

In this way, when liquid crystal molecules having negative anisotropy of permittivity are used, it is possible to automatically or naturally divide direction of rotation of liquid crystal molecules and to obtain wide viewing angle characteristics, without performing special treatment on the alignment layers.

Especially, in an active matrix type liquid crystal display, there is a possibility that, because of an influence by a lateral electric field from the scanning signal electrode 54a and the image signal electrode 57a, an unnecessary disclination line appears within a pixel electrode portion and alignment of liquid crystal molecules is disturbed thereby. Such problem may be solved by enlarging the distances between the scanning signal electrode 54a and the pixel electrode 52 and between the image signal electrode 57a and the pixel electrode 52. However, when the size of each pixel is small, it is not preferable to make these distances too large, because of the deterioration of an aperture ratio.

As another method of solving this problem, it is possible to dispose a portion of the pixel electrode 52 or a shielding electrode over at least one of the scanning signal electrode 54a and the image signal electrode 57a. In this case, when all portions of the scanning signal electrode 54a and the image signal electrode 57a are shielded by the pixel electrode 52, an aperture ratio is deteriorated.

Therefore, by disposing a part of the pixel electrode 52 or the shielding electrode over at least one of the scanning signal electrode 54a and the image signal electrode 57a, it is possible to avoid deterioration of the aperture ratio. Here, an optimum disposition of these electrodes are determined taking the shape of the pixel electrode, disposition of the scanning electrode 54a and the image signal electrode 57a, and fabrication process of the shielding electrode into consideration.

When it is impossible to make the above-mentioned distances sufficiently large because of the deterioration of the aperture ratio and the like but it is required that the direction of falling down of liquid crystal molecules is completely controlled, it is possible to use an optical alignment film as the alignment layer. In this case, depending on the property of the optical alignment layer or film, it is possible to irradiate polarized light thereon from a slant direction, or to irradiate non-polarized light thereon. Also, in order to avoid disturbance of alignment direction of liquid crystal molecules, it is possible to add monomer a little to the liquid crystal molecules and to polymerize it such that an appropriate alignment condition is memorized.

As shown in FIG. 17, in order to further improve a precision of locations where alignment directions of liquid crystal molecules are divided, it is possible to form notches at peripheral portions of a symmetrical shape or of a centrosymmetrical shape of each pixel electrode. Also as shown in FIG. 18, it is also possible to form protrusions or projections which project from the peripheral portions or corners of a symmetrical shape or of a centrosymmetrical shape of each pixel electrode. Further, as shown in FIG. 19, it is also effective to form voids 44c, that is, portions where no electrode material exists in each pixel electrode.

Figure 24A:
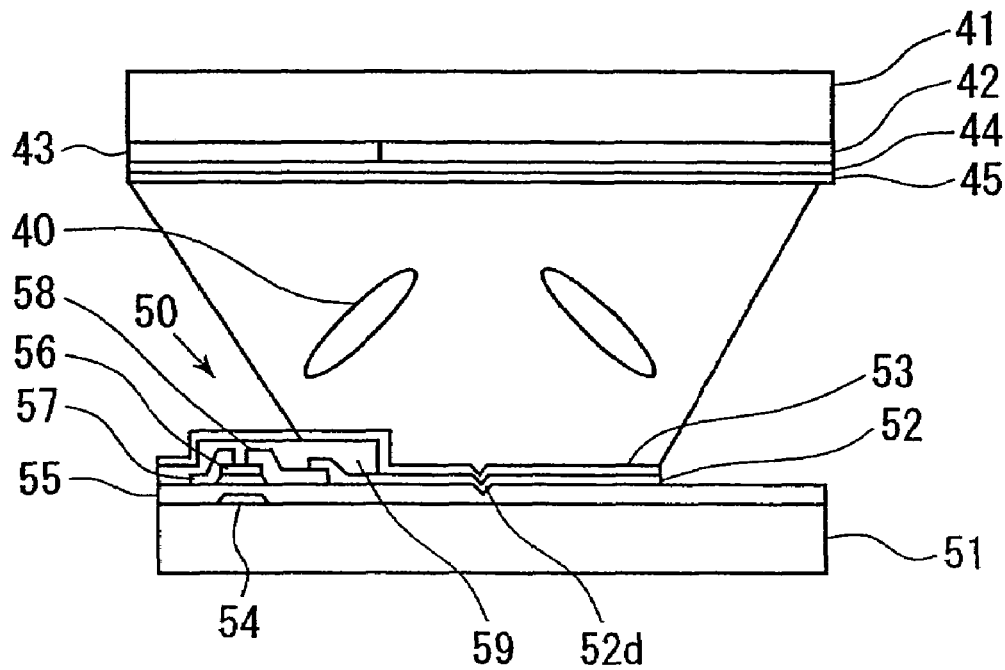
FIG. 24A is a schematic cross sectional view showing a portion including approximately one pixel of a liquid crystal display according to a variation of the fourteenth embodiment of the present invention.
Figure 24B:
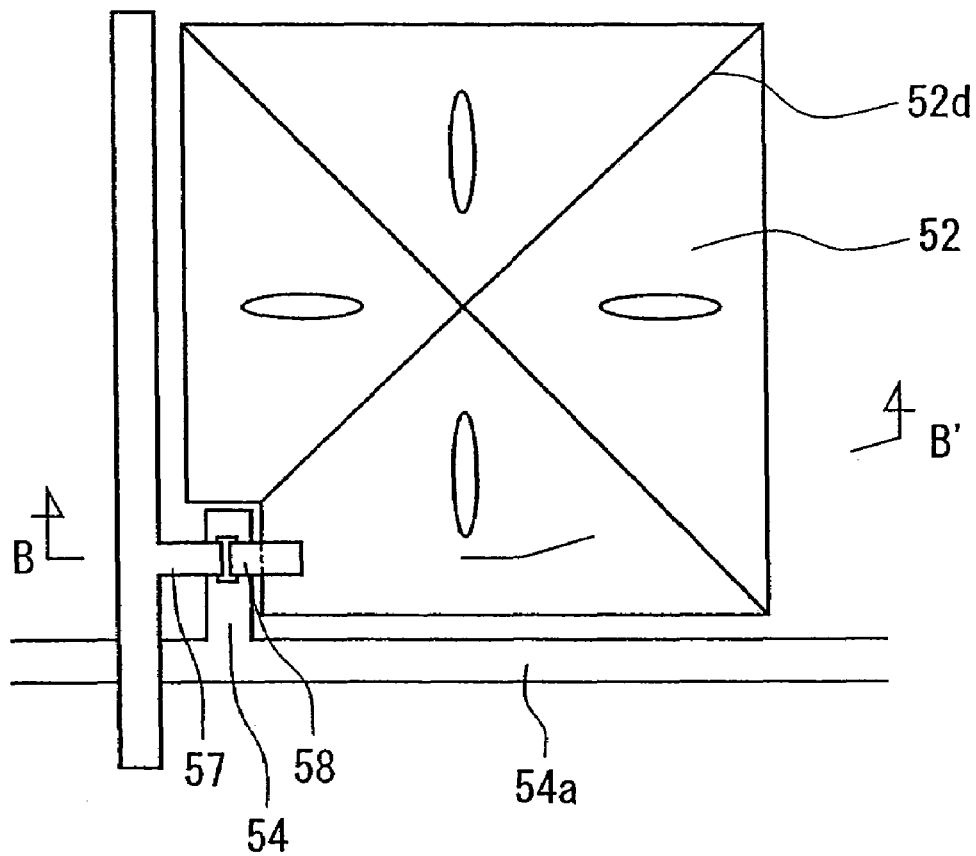
FIG. 24B is a schematic plan view showing a pixel area which includes divided domains having different alignment directions in a liquid crystal display according to the variation of the fourteenth embodiment of the present invention.

As shown in FIG. 24A and FIG. 24B, it is also possible to use a pixel electrode 52 having a square shape and to form concave or recessed portions 52d which extend from the center toward peripheral portions of the pixel electrode 52. These concave portions 52d may be fabricated by forming concave portions in the pixel electrode 52 itself or, by forming concave portions in a layer under the pixel electrode 52. Of course, a combination of these methods may be utilized. Other portions of the liquid crystal display of FIG. 24A and FIG. 23B are the same as those of FIG. 23A and FIG. 23B, and description thereof is omitted here.

In a manner similar to the Embodiment 12, in order to further improve viewing angle characteristics, it is possible to dispose a negative uniaxial optical compensation film or layer between a polarizer and a glass substrate. By this method, retardation of liquid crystal molecules when a voltage is applied thereto is cancelled, and complete black is displayed when such liquid crystal display panel is viewed from every direction. Therefore, viewing angle characteristics can be further improved.

In the above-mentioned liquid crystal display, an initial alignment is the homeotropic alignment as a principle. However, if the initial alignment deviates in a direction because of a property of a liquid crystal display element, it is also possible to additionally stick a film having a positive value of optical anisotropy to compensate such deviation.

In the above, an explanation was made on a liquid crystal display in which anisotropy of permittivity of liquid crystal molecules is negative and in which liquid crystal molecules have homeotropic alignment when no voltage is applied thereto. However, the present invention can be applied to a liquid crystal display like that of the Embodiment 13 in which anisotropy of permittivity of liquid crystal molecules is positive and in which liquid crystal molecules have twisted nematic alignment when no voltage is applied thereto. In this case, it is possible to obtain liquid crystal alignment similar to that of the Embodiment 13, and wide viewing angle characteristics can be realized.

In this case, liquid crystal layer of each pixel is divided into four domains as shown in FIGS. 21A and 21B. When twisted nematic alignment is used, it is preferable that to use a pixel electrode having a square shape. This is true for all the embodiments mentioned below.

The present invention provide remarkable effects in a active matrix type liquid crystal display which uses switching elements, such as thin film transistors and the like. That is, in the active matrix type liquid crystal display using the usual TN mode, microfabrication process such as photolithography and the like is required only for one of the substrates on which the active elements are fabricated. Usually, on the other substrate called a "common electrode", the microfabrication process is not required but the electrode is formed on whole portion of the substrate.

In order to perform domain division to obtain a wide viewing angle in such conventional liquid crystal display, additional photolithography process and the like is required. Such additional photolithography and the like causes additional load on a manufacturing facilities, deterioration of manufacturing yield and the like, and should be avoided if possible. According to the present invention, domain division can be attained in each pixel without additional photolithography and the like, and wide viewing angle characteristics can be obtained.

A method of manufacturing the liquid crystal display according to the Embodiment 14 may be the same as that of the Embodiment 12.

Next, some examples will be described concerning the Embodiment 14.

Example 11

A substrate having an amorphous silicon thin film transistor (TFT) 50 was formed on the glass substrates 51, by repeating film forming process and photolithography process. The TFT 50 comprises, from the side of the substrate 51, a gate layer made of chromium 54, a gate insulating film 55 made of silicon nitride, a semiconductor layer 56 made of amorphous silicon, and drain and source electrodes 57 and 58 made of molybdenum. The source electrode 58 is coupled with the pixel electrode 52 which is made of ITO and which has a square shape. The protective layer 59 was formed to cover these components.

As an opposing substrate, a color filter substrate with a black matrix was prepared on which ITO is sputtered on whole area thereof. A homeotropic layers 33 and 45 (SE1211 purchased from Nissan Chemical Industries, LTD) were applied on both substrates, and dried by heating for 1 hour at 200 degrees Celsius.

Sealing material was applied in the peripheral portion of the substrate, and spacer material was sprayed. Then, the upper substrate and the lower substrate were stuck to each other, and the sealing material was cured by heating. Then, nematic liquid crystal material 40 having a negative anisotropy of permittivity was injected into the space between the substrates, and injecting hole or holes were sealed by using photocurable resin. A optically negative compensation film which has the same Δnd as that of the liquid crystal layer and has an opposite polarity to that of the liquid crystal layer was stuck to the liquid crystal panel, and then polarizers were stuck to the upper substrate and the lower substrate such that the transmission axes thereof become perpendicular to each other.

When viewing angle characteristics made in this way were measured, no inversion of gray shades was observed, and superior viewing angle characteristics were obtained in which a high contrast area was very wide.

Example 12

A TFT substrate was fabricated similarly to the Example 11, except that voids 44c where no electrode material exists were formed at portions of the ITO electrode as shown in FIG. 19. The other portions were the same as those of the Example 11.

When viewing angle characteristics made in this way were measured, no inversion of gray shades was observed, and superior viewing angle characteristics were obtained in which a high contrast area was very wide. Also, when the inside of a pixel was observed through the microscope, abnormal disclination inside the pixel was not observed at all, which was observed in a very small number of pixels in the Example 11.

Example 13

A TFT substrate was fabricated similarly to the Example 11. By using photolithography, portions of the gate insulating film were etched into a shape as shown in FIG. 24A and FIG. 24B, and concave portions 52d were formed. On the portion including such concave portions 52d, ITO is sputtered to obtain the shape shown in FIG. 24A and FIG. 24B. That is, concave portions were also formed at portions of the ITO film 52. The other portions were the same as those of the Example 11.

When viewing angle characteristics made in this way were measured, no inversion of gray shades was observed, and superior viewing angle characteristics were obtained in which a high contrast area was very wide. Also, when the inside of a pixel was observed through the microscope, abnormal movement of disclination was not observed at all, which was observed in a small number of pixels in the Example 11.

Example 14

Figure 25A:
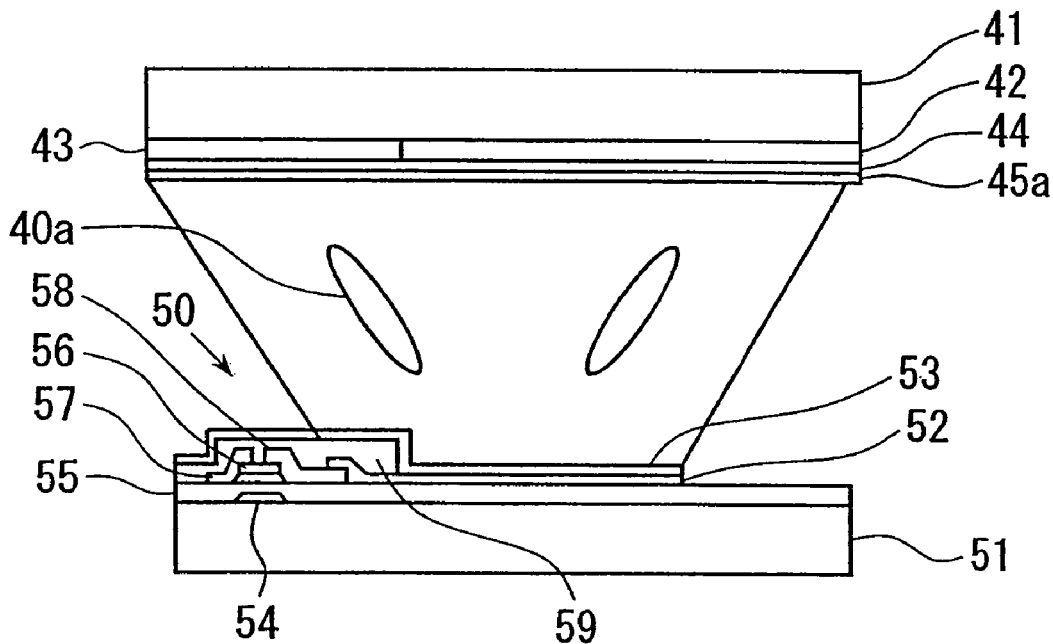
FIG. 25A is a schematic cross sectional view showing a portion including approximately one pixel of a liquid crystal display according to another variation of the fourteenth embodiment of the present invention.
Figure 25B:
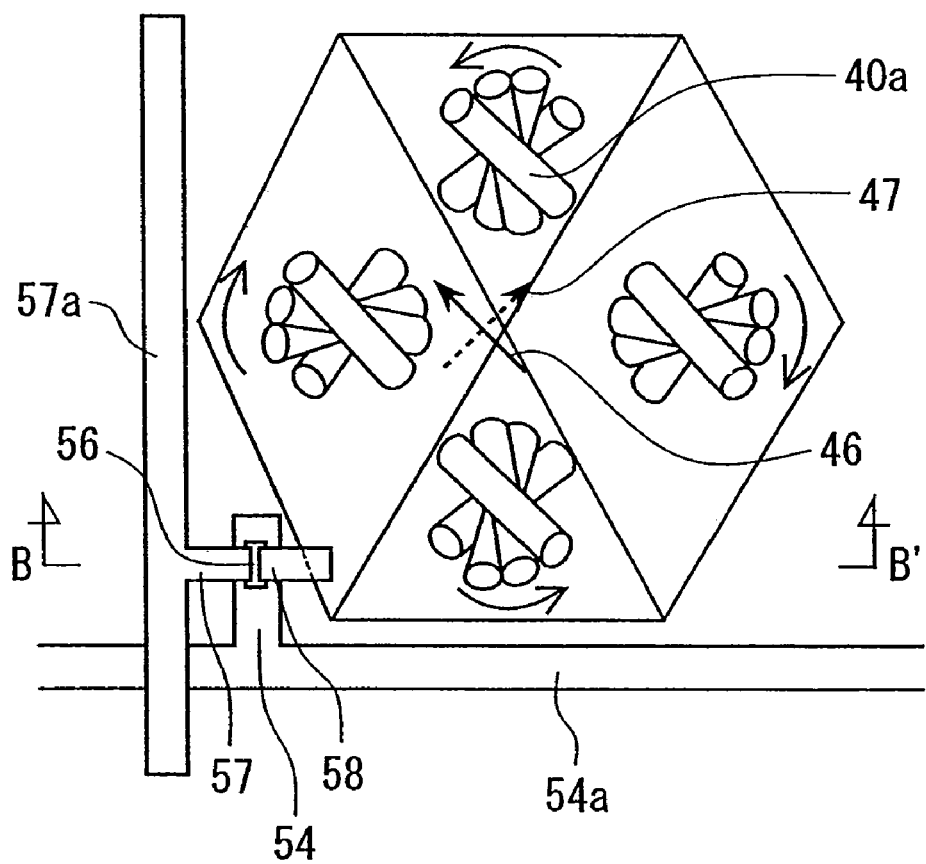
FIG. 25B is a schematic plan view showing a pixel area which includes divided domains having different alignment directions in a liquid crystal display according to another variation of the fourteenth embodiment of the present invention.

A TFT substrate and a color filter substrate were prepared similarly to the Example 11. As alignment films, JALS-428 purchased from JSR Corporation were applied on both substrates, and dried by heating for 1 hour at 200 degrees Celsius. Similarly to the Example 10, rubbing was performed such that alignment directions of liquid crystal molecules on the lower substrate and on the upper substrate becomes perpendicular to each other, especially such that the alignment directions coincide with the directions of diagonal lines of the square shape. Thereby, alignment directions of the alignment layers 45a and 53 became as shown by arrows 46 and 47, respectively, in FIG. 25B. Also, as a liquid crystal agent having a positive anisotropy of permittivity, ZL14792 from which chiral agent was removed was used. By using a similar method, a liquid crystal display panel as shown in FIG. 25A and FIG. 25B was fabricated. In the agent ZL14792, liquid crystal molecules were aligned in a direction perpendicular to the direction of rubbing. The pretilt angle measured by using a crystal rotation method was approximately zero degree.

In FIG. 25A and FIG. 25B, like portions are designated by the same reference symbols as those of FIG. 23A and FIG. 23B, and description thereof is omitted here.

Viewing angle characteristics of the liquid crystal panel obtained by this way were measured. As a result thereof, it was found that no inversion of gray shades was observed in whole area of the panel, and superior viewing angle characteristics were obtained in which an area having a high contrast ratio was very wide.

Embodiment 15

Figure 26A:
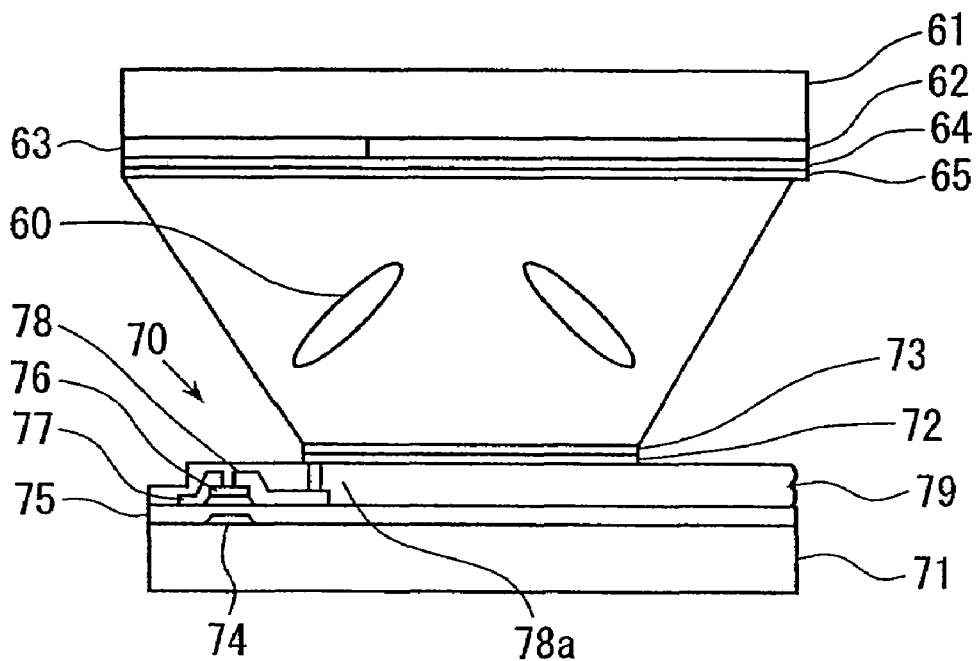
FIG. 26A is a schematic cross sectional view showing a portion including approximately one pixel of a liquid crystal display according to the fifteenth embodiment of the present invention.
Figure 26B:
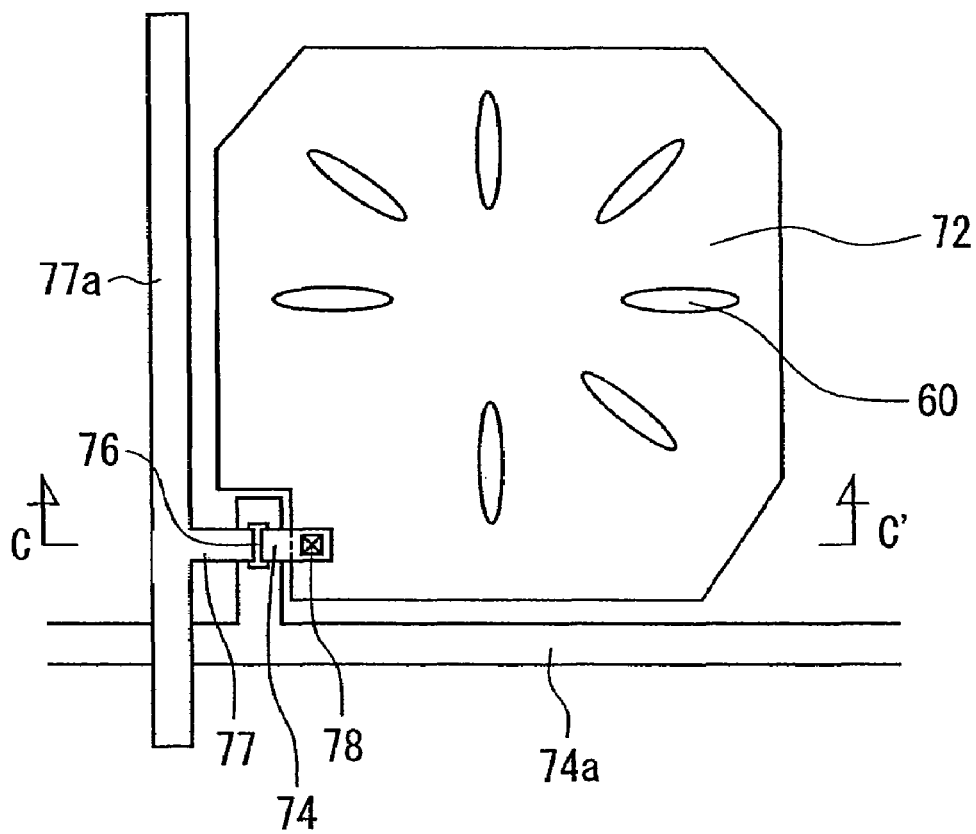
FIG. 26B is a schematic plan view showing a pixel area which includes divided domains having different alignment directions in a liquid crystal display according to the fifteenth embodiment of the present invention.

With reference to FIGS. 26A and FIG. 26B, an explanation will be made on a liquid crystal display according to the fifteenth embodiment of the present invention.

Similarly to the Embodiment 14, the liquid crystal display according to this embodiment is an active matrix type liquid crystal display in which liquid crystal molecules are driven by active elements. FIG. 26A shows a cross section of one pixel of this liquid crystal display. FIG. 26B is a schematic plan view of the liquid crystal display according to this embodiment, and FIG. 26A is a cross sectional view taken on line C-C' of FIG. 26B.

The difference between this embodiment and the Embodiment 14 is that, in this embodiment, a pixel electrode 72 and a source electrode 78 are not coupled directly with each other, but are coupled with each other via a through hole 78a.

On a transparent substrate 61 of upside, a color filter layer 62 and a light shielding layer 63 are formed, and on these layers, a common electrode 64 is formed over approximately whole area of the transparent substrate. On the common electrode 64, a homeotropic alignment film 65 is applied.

On a lower substrate 71, there is formed a thin film transistor 70. In the thin film transistor 70, a gate electrode, that is, a scanning electrode, 74 made of Cr is disposed. A gate insulating film 75 made of silicon nitride is formed so as to cover the gate electrode 74.

On the gate electrode 74, there is formed a semiconductor film or layer 76 made of amorphous silicon via the gate insulating film 75. The semiconductor film 76 functions as an active layer of the thin film transistor (TFT) 70. Also, a drain electrode 77 and a source electrode 78 made of molybdenum are formed such that each of these electrodes 77 and 78 partially overlaps the pattern of the semiconductor film 76. A protective film 79 made of silicon nitride is formed to cover all of these components. The protective film 79 may be made only of silicon nitride, but may be made of silicon nitride on which an organic film such as acrylate and the like is formed.

Although not shown in the drawings, the drain electrode 77 and the source electrode 78 partially overlaps the pattern of the semiconductor film 57 via an amorphous silicon film into which n type impurities are doped. The pixel electrode 72 and the source electrode 78 are coupled via the through hole 78a.

As shown in FIG. 26B, the drain electrode 77 contacts a data line, that is, image signal line, 77a. In other words, the drain electrode 77 is formed as a part of the data line 77a. Also, the gate electrode 74 is formed as a part of the scanning line 74a.

Also, a pixel electrode 72 is formed on the protective film 79 and coupled with the source electrode 78. On the pixel electrode 72, a homeotropic alignment layer or film 73 is formed.

In this embodiment, the pixel electrode 72 is coupled with the source electrode 78, and an image signal is applied to the pixel electrode 72 from the source electrode 78. On-off of the image signal is controlled by the scanning signal. The pixel electrode 72 has a shape having a good symmetry. In this embodiment, the pixel electrode 72 has an octagonal shape, but it is possible to obtain similar effect by using other shape, such as a circle, a pentagon, a square, or the like as shown in FIG. 15C.

It should be noted that liquid crystal molecules 60 having a negative anisotropy of permittivity are injected between the upper and lower substrates.

Since the alignment layers 65 and 73 of the upper and lower substrates are homeotropic alignment layers, when no voltage is applied, liquid crystal molecules 60 are aligned approximately perpendicular to the substrates.

When the thin film transistor (TFT) 70 is turned on by applying a voltage to the gate electrode 74 thereof, a voltage is applied to the source electrode 78 and an electric field is produced between the common electrode 64 and the pixel electrode 72 opposing to each other. In this case, since the pixel electrode 72 has a good symmetry and the size of the common electrode 64 is larger than that of the pixel electrode 72, the electric field produced between the pixel electrode 72 and the common electrode 64 is not perpendicular to the substrates. That is, the electric field produced between the pixel electrode 72 and the common electrode 64 has slant components from peripheral portions of the pixel electrode toward the central portion. Therefore, liquid crystal molecules 60 having a negative anisotropy of permittivity rotate symmetrically toward the center of the pixel as shown in FIG. 26A. Accordingly, the alignment directions of liquid crystal molecules in each pixel are automatically divided into different directions.

In this way, according to the present invention, when liquid crystal molecules having negative anisotropy of permittivity are used, it is possible to automatically or naturally divide direction of rotation of liquid crystal molecules and to obtain wide viewing angle characteristics, without performing special treatment on the alignment layers.

Especially, in an active matrix type liquid crystal display, there is a possibility that, because of an influence by a lateral electric field from the scanning signal electrode 74a and the image signal electrode 77a, an unnecessary disclination line appears within a pixel electrode portion and alignment of liquid crystal molecules is disturbed thereby. Such problem may be solved by enlarging the distances between the scanning signal electrode 74a and the pixel electrode 72 and between the image signal electrode 77a and the pixel electrode 72. However, when the size of each pixel is small, it is not preferable to make these distances too large, because of the deterioration of an aperture ratio.

As another method of solving this problem, it is possible to dispose a portion of the pixel electrode 72 or a shielding electrode over at least one of the scanning signal electrode 74a and the image signal electrode 77a. In this case, when all portions of the scanning signal electrode 74a and the image signal electrode 77a are shielded by the pixel electrode 72, an aperture ratio is deteriorated. Therefore, by disposing a part of the pixel electrode 72 or the shielding electrode over at least one of the scanning signal electrode 74a and the image signal electrode 77a, it is possible to avoid deterioration of the aperture ratio.

Here, an optimum disposition of these electrodes are determined taking the shape of the pixel electrode, disposition of the scanning electrode 74a and the image signal electrode 77a, and fabrication process of the shielding electrode into consideration.

When it is impossible to make the above-mentioned distances sufficiently large because of the deterioration of the aperture ratio and the like but it is required that the direction of falling down of liquid crystal molecules is completely controlled, it is possible to use an optical alignment film as the alignment layer. In this case, depending on the property of the optical alignment layer or film, it is possible to irradiate polarized light thereon from a slant direction, or to irradiate non-polarized light thereon. Also, in order to avoid disturbance of alignment direction of liquid crystal molecules, it is possible to add monomer a little to the liquid crystal molecules and to polymerize it such that an appropriate alignment condition is memorized.

As shown in FIG. 17, in order to further improve a stability of locations where alignment directions of liquid crystal molecules are divided, it is possible to form notches at portions of each pixel electrode. Also as shown in FIG. 18, it is possible to form protrusions or projections which project from the corner portions of each pixel electrode toward outside. Further, as shown in dotted lines of FIG. 19, it is also effective to form voids 44c, that is, portions where no electrode material exists in each pixel electrode.

Also, similarly to the structure shown in FIG. 24A and FIG. 24B, it is also possible to form concave or recessed portions which extend from the center toward peripheral portions of the pixel electrode 72 as shown in FIG. 20. These concave portions may be fabricated by forming concave portions in the pixel electrode 72 itself or, by forming concave portions in a layer under the pixel electrode 72. Of course, a combination of these methods may be utilized.

In a manner similar to the Embodiment 12, in order to further improve viewing angle characteristics, it is possible to dispose a negative uniaxial optical compensation film or layer between a polarizer and a glass substrate. By this method, retardation of liquid crystal molecules when a voltage is applied thereto is cancelled, and complete black is displayed when such liquid crystal display panel is viewed from every direction. Therefore, viewing angle characteristics can be further improved.

In case the size of each pixel is large, it is possible to apply a voltage near the threshold value, before applying a drive voltage. By this method, directions of falling down of liquid crystal molecules are previously defined, and the time for reaching a divided condition becomes shorter than that of the case in which the drive voltage is suddenly applied, thereby a response speed can be shortened. When the voltage slightly larger than the threshold value is applied, liquid crystal molecules at a peripheral portion of each pixel starts to fall down earlier, and there appears a leakage of light from such portion and a contrast ratio decreases thereby. In such case, it is possible to optically shield such portion to avoid deterioration of the contrast ratio.

In the above-mentioned liquid crystal display, an initial alignment is the homeotropic alignment as a principle. However, if the initial alignment deviates in a direction because of a property of a liquid crystal display element, it is also possible to additionally stick a film having a positive value of optical anisotropy to compensate such deviation.

In the above, an explanation was made on a liquid crystal display in which anisotropy of permittivity of liquid crystal molecules is negative and in which liquid crystal molecules have homeotropic alignment when no voltage is applied thereto. However, the present invention can be applied to a liquid crystal display like that of the Embodiment 13 in which anisotropy of permittivity of liquid crystal molecules is positive and in which liquid crystal molecules have twisted nematic alignment when no voltage is applied thereto. In this case, a liquid crystal alignment similar to that of the Embodiment 13 is obtained and wide viewing angle characteristics can be realized. The liquid crystal layer is divided into four domains as shown in FIG. 21A and FIG. 21B. When a twisted nematic alignment is used, it is preferable that that the shape of the pixel electrode is a square.

A method of manufacturing the liquid crystal display according to the Embodiment 15 may be the same as that of the Embodiment 12.

Next, some examples will be described concerning the Embodiment 15.

Example 15

Similarly to the Embodiment 11, a substrate having an amorphous silicon thin film transistor (TFT) 70 was formed on the glass substrates 71, by repeating film forming process and photolithography process. The TFT 70 comprises, from the side of the substrate 71, a gate layer made of chromium 74, a gate insulating film 75 made of silicon nitride, a semiconductor layer 76 made of amorphous silicon, and drain and source electrodes 77 and 78 made of molybdenum. The silicon nitride layer 79 was formed to cover these components. The source electrode 78 was coupled with the pixel electrode 72 via the through hole 78*a*. The pixel electrode 72 was made to have an octagonal shape.

As an opposing substrate, a color filter substrate with a black matrix was prepared on which ITO is sputtered on whole area thereof similarly to the Embodiment 11. A homeotropic layers 65 and 73 (SE1211 purchased from Nissan Chemical Industries, LTD) were applied on both substrates, and dried by heating for 1 hour at 200 degrees Celsius.

Sealing material was applied in the peripheral portion of the substrate, and spacer material was sprayed. Then, the upper substrate and the lower substrate were stuck to each other, and the sealing material was cured by heating. Then, nematic liquid crystal material 60 having a negative anisotropy of permittivity was injected into the space between the substrates, and injecting hole or holes were sealed by using photocurable resin. A optically negative compensation film which has the same $\Delta$nd as that of the liquid crystal layer and has an opposite polarity to that of the liquid crystal layer was stuck to the liquid crystal panel, and then polarizers were stuck to the upper substrate and the lower substrate such that the transmission axes thereof become perpendicular to each other.

When viewing angle characteristics made in this way were measured, no inversion of gray shades was observed, and superior viewing angle characteristics were obtained in which a high contrast area was very wide.

Example 16

Similarly to the Embodiment 15, a color filter substrate and a TFT substrate in which the shape of each pixel electrode is a square were prepared. An optical alignment layer was applied only on the side of the TFT substrate. Polarized ultraviolet rays were irradiated from each of four directions via a mask such that a pixel area was divided into four domains. Division of a pixel area was performed via boundaries shown in FIG. 20.

Similarly to the Example 15, application of sealing material, spraying of spacer material, injection of liquid crystal material, and sealing of an injection hole were performed. A optically negative compensation film which has the same $\Delta$nd as that of the liquid crystal layer and has an opposite polarity to that of the liquid crystal layer was stuck to the liquid crystal panel, and then polarizers were stuck to the upper substrate and the lower substrate such that the transmission axes thereof become perpendicular to each other.

When viewing angle characteristics of the panel made in this way were measured, no inversion of gray shades was observed, and superior viewing angle characteristics were obtained in which a high contrast area was very wide.

Also, when, during a drive operation, a pixel was observed through the microscope, abnormal movement of disclination inside the pixel was not observed at all, which was observed in a very small number of pixels in the Example 15.

Example 17

Similarly to the Embodiment 15, a color filter substrate and a TFT substrate were prepared. Column members as spacers each having a height of 6 μm were formed on the color filter substrate and outside pixel electrodes, by using photolithography which uses a negative photoresist film. Similarly to the Example 15, a homeotropic layers (SE1211 purchased from Nissan Chemical Industries, LTD) were applied on both substrates, and dried by heating for 1 hour at 200 degrees Celsius. Similarly to the Example 13, spraying of spacer agent was omitted, and liquid crystal display panel was fabricated.

Then, liquid crystal solution was injected into the panel while taking care that no light is irradiated onto the liquid crystal solution, and an injecting hole was sealed. The liquid crystal solution was comprised of: nematic liquid crystal material having a negative anisotropy of permittivity (MJ95955 purchased from Merck Japan Limited); ultravioletcurable monomer (KAYARAD PET-30 purchased from Nippon Kayaku Co., LTD)(0.2 wt % with respect to liquid crystal material); photo-initiator IRGANOX907 purchased from Ciba Specialty Chemicals K.K. (5 wt % with respect to monomer). While applying voltages to the panel such that 0V is applied to the common electrode and 3V is applied to the pixel electrodes, ultraviolet rays were irradiated onto the panel from the side of the TFT's, thereby polymerization of monomer in the liquid crystal material was performed. A optically negative compensation film which has the same $\Delta$nd as that of the liquid crystal layer and has an opposite polarity to that of the liquid crystal layer was stuck to the liquid crystal panel, and then polarizers were stuck to the upper substrate and the lower substrate such that the transmission axes thereof become perpendicular to each other.

When viewing angle characteristics made in this way were measured, no inversion of gray shades was observed, and superior viewing angle characteristics were obtained in which a high contrast area was very wide.

Similarly to the Example 16, during a drive operation, a pixel was observed through the microscope, abnormal movement of disclination inside the pixel was not observed at all, which was observed in a very small number of pixels in the Example 15.

Embodiment 16

Figure 27A:
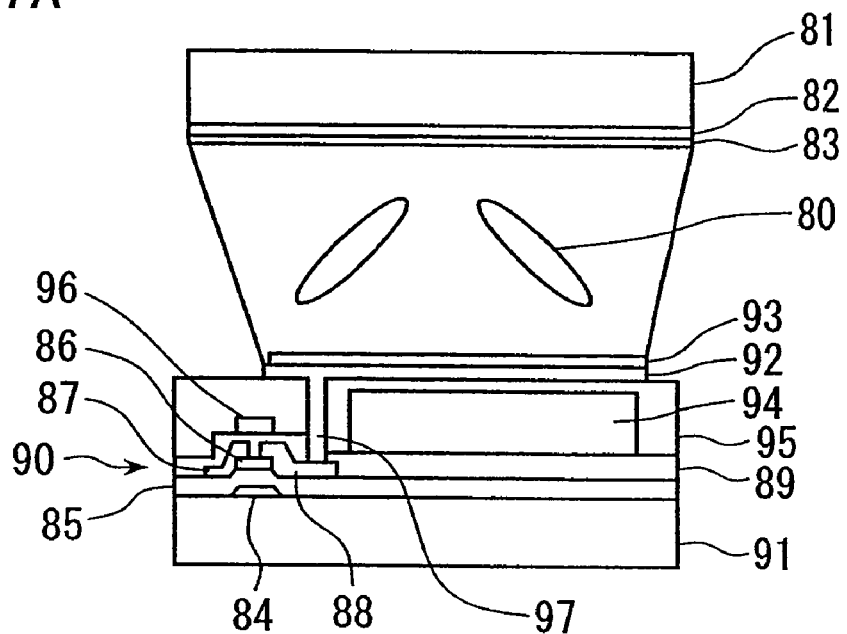
FIG. 27A is a schematic cross sectional view showing a portion including approximately one pixel of a liquid crystal display according to the sixteenth embodiment of the present invention.
Figure 27B:
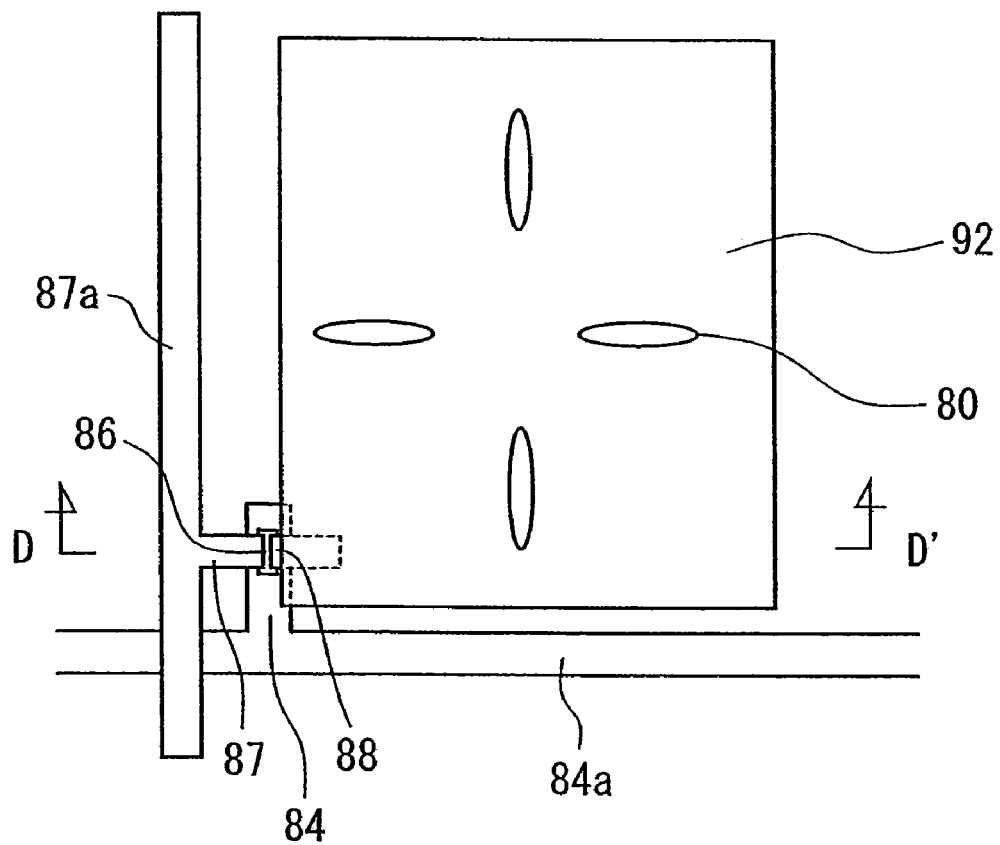
FIG. 27B is a schematic plan view showing a pixel area which includes divided domains having different alignment directions in a liquid crystal display according to the sixteenth embodiment of the present invention.
Figure 28:
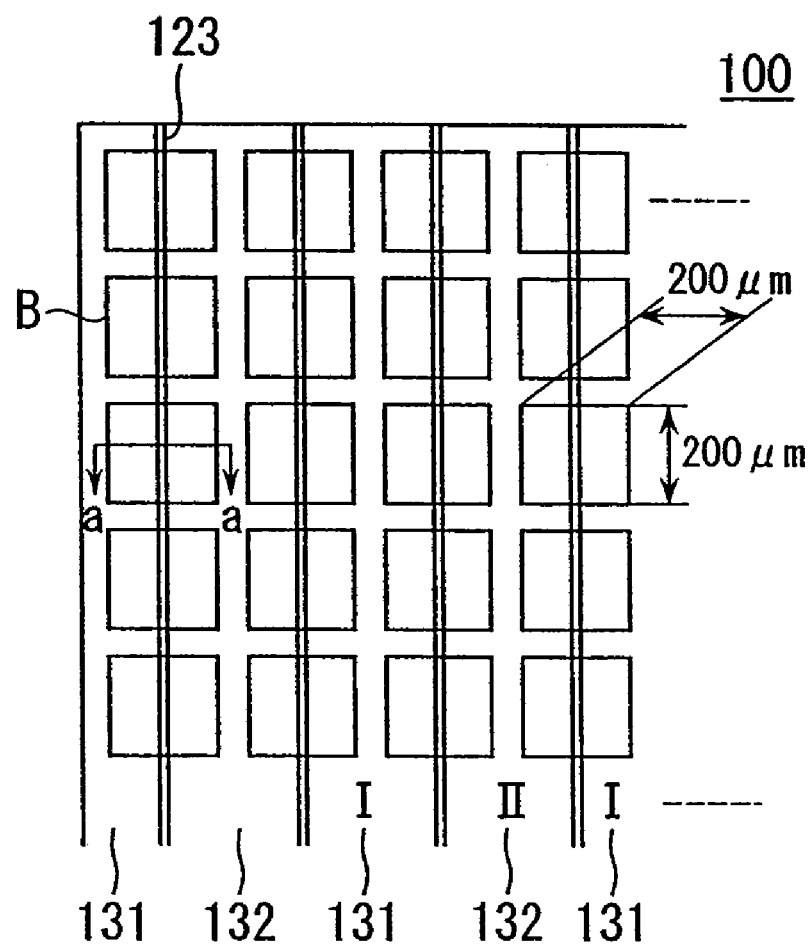
FIG. 28 is a plan view of a conventional liquid crystal display disclosed in Japanese patent laid-open publication No. 63-106624.
Figure 29:
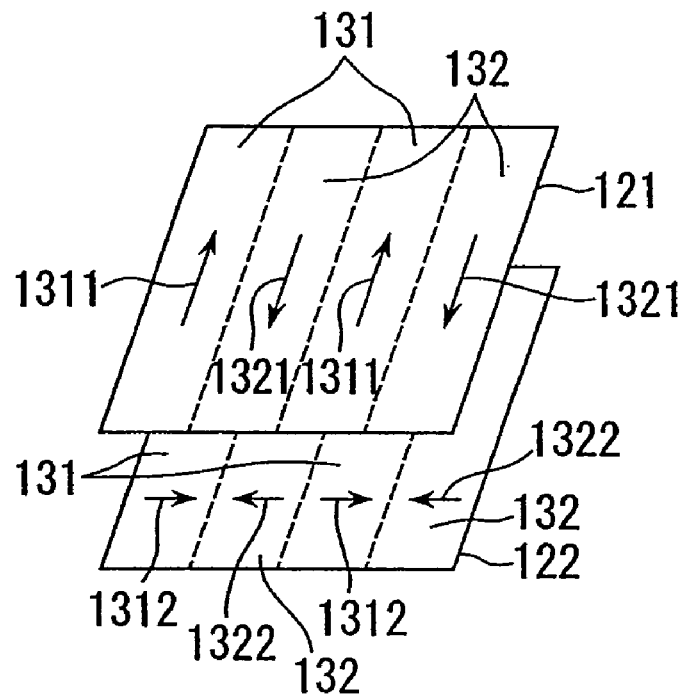
FIG. 29 is a perspective view of a conventional liquid crystal display disclosed in Japanese patent laid-open publication No. 63-106624.
Figure 30:
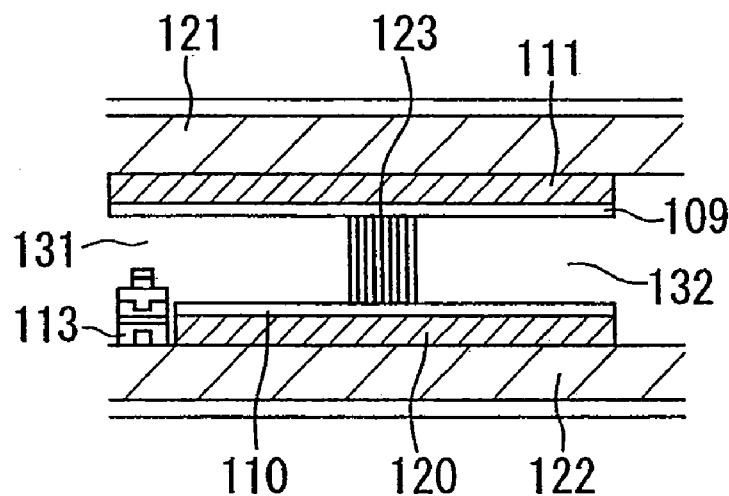
FIG. 30 is a cross sectional view taken on line a-a' of FIG. 28.
Figure 31:
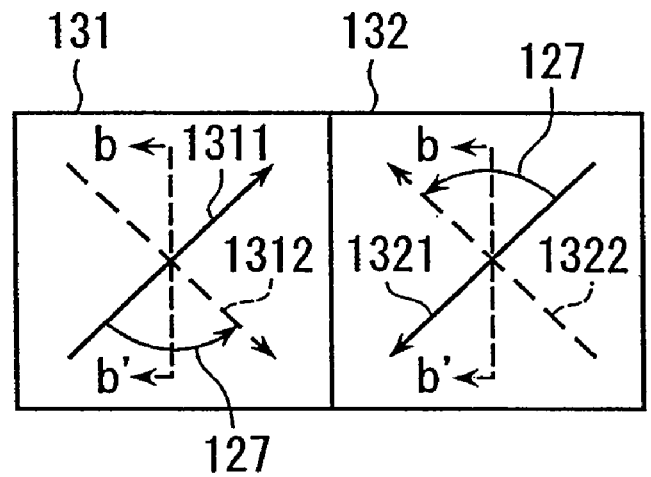
FIG. 31 is a perspective plan view showing rubbing directions and twist of liquid crystal molecules between an upper substrate and a lower substrate when the liquid crystal display of FIG. 29 is observed from a bearing angle which is changed by 45 degrees.
Figure 32:
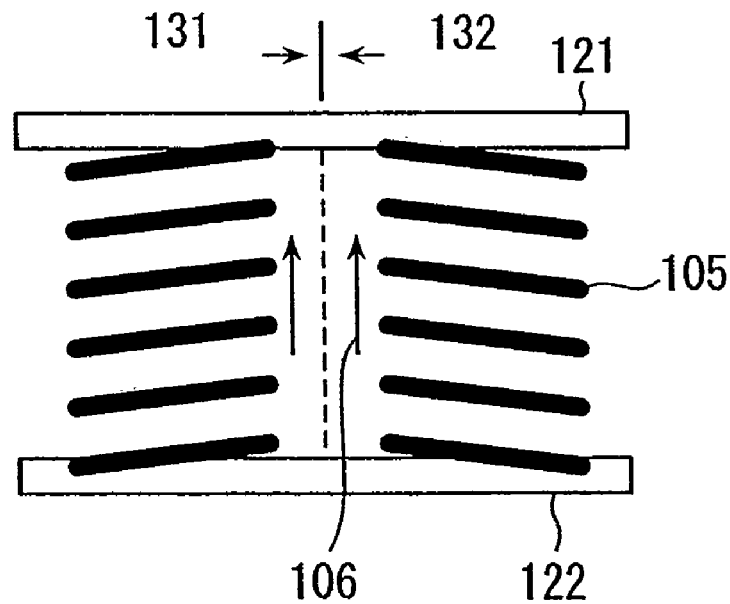
FIG. 32 is a cross sectional view taken on line b-b' of FIG. 31.
Figure 33:
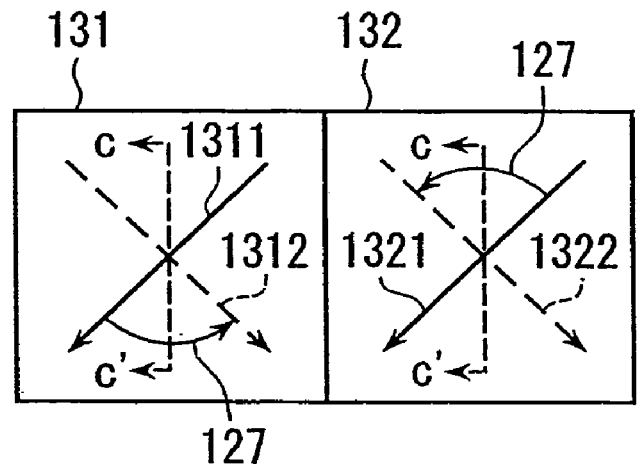
FIG. 33 is a perspective plan view showing rubbing directions and twist of liquid crystal molecules between an upper substrate and a lower substrate in a liquid crystal display shown in SID '92 Digest, p. 798.
Figure 34:
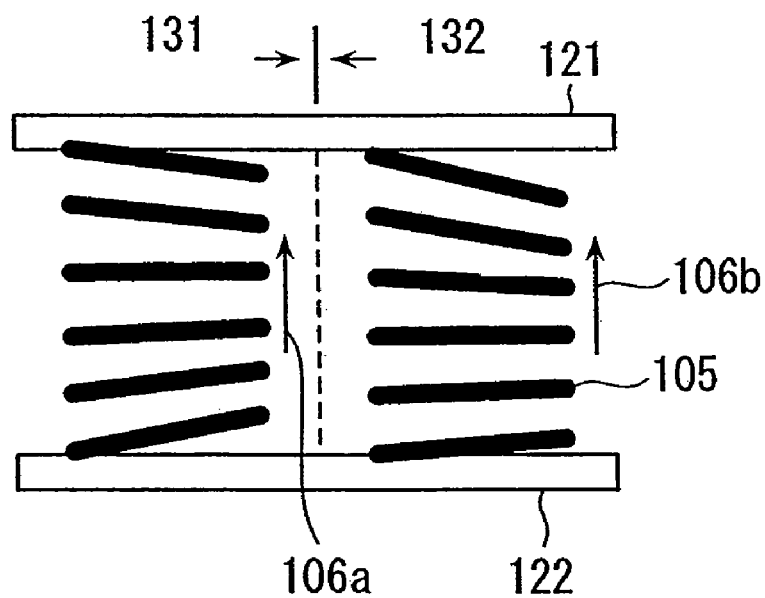
FIG. 34 is a cross sectional view taken on line c-c' of FIG. 33.
Figure 35:
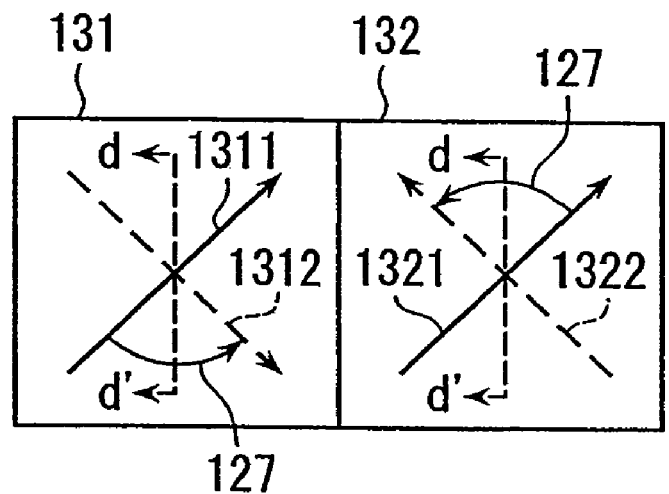
FIG. 35 is a perspective plan view showing rubbing directions and twist of liquid crystal molecules between an upper substrate and a lower substrate in a liquid crystal display shown in Japan Display '92 Digest, p. 591.
Figure 36:
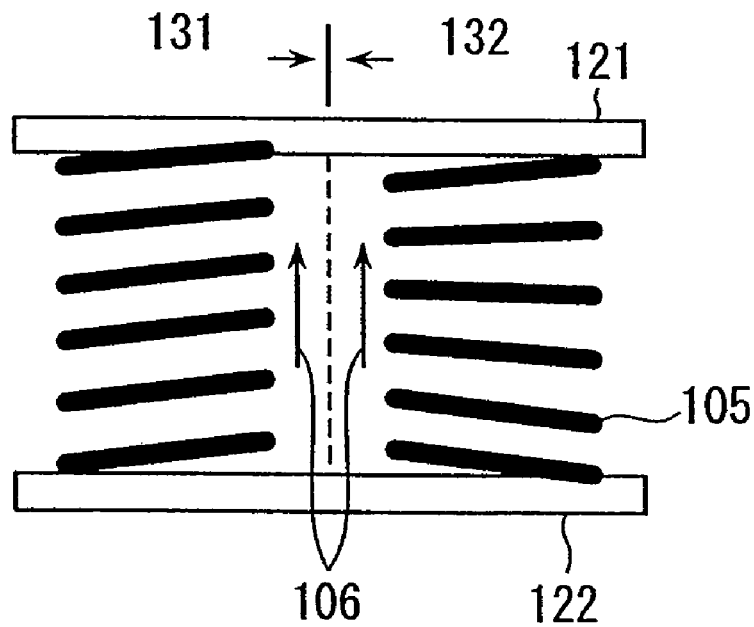
FIG. 36 is a cross sectional view taken on line d-d' of FIG. 33.
Figure 37:
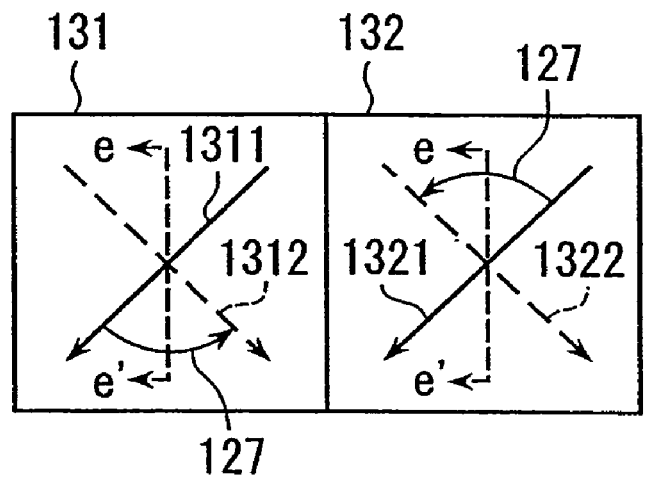
FIG. 37 is a perspective plan view showing rubbing directions and twist of liquid crystal molecules between an upper substrate and a lower substrate in a liquid crystal display shown in SID '92 Digest, p. 269.
Figure 38:
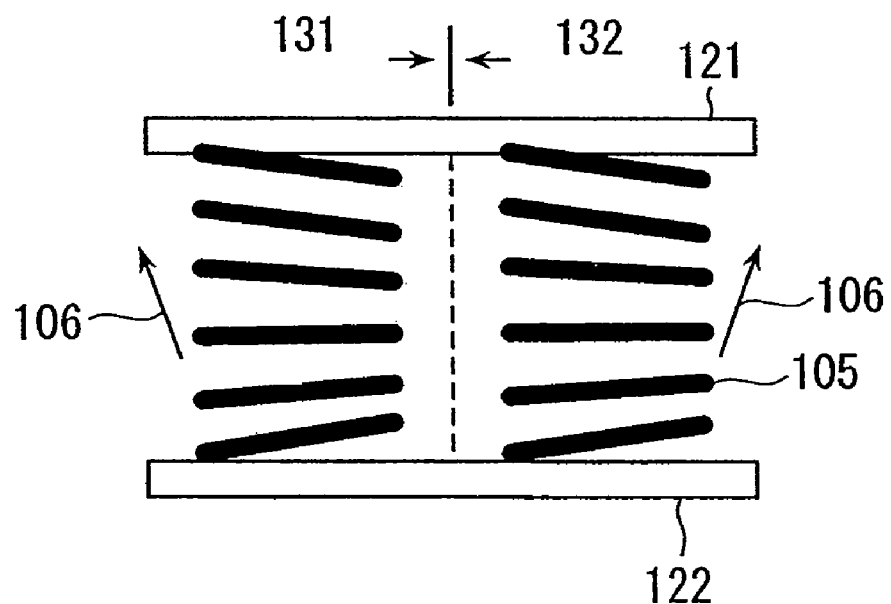
FIG. 38 is a cross sectional view taken on line d-d' of FIG. 37.
Figure 39:
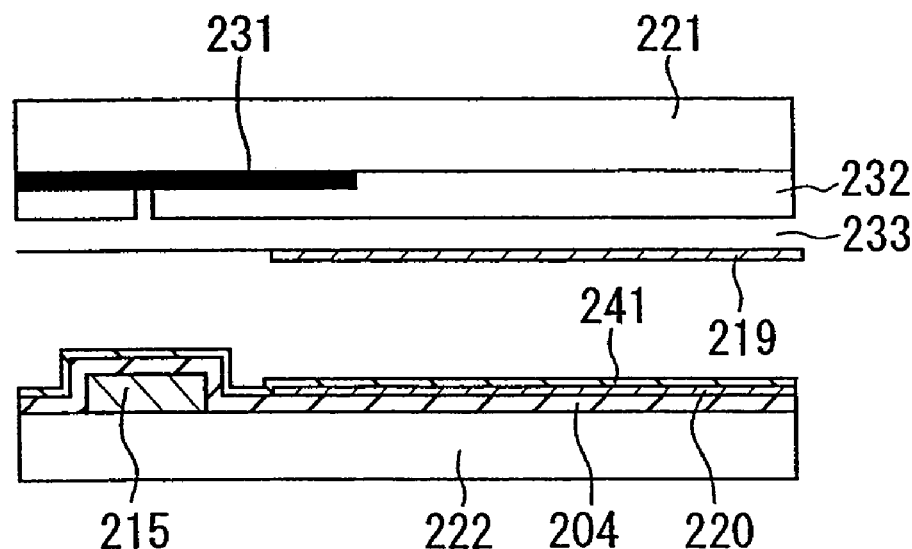
FIG. 39 is a partial cross sectional view showing a conventional liquid crystal display shown in Conference Record of the 1991 International Display Research Conference, p. 239.
Figure 40:
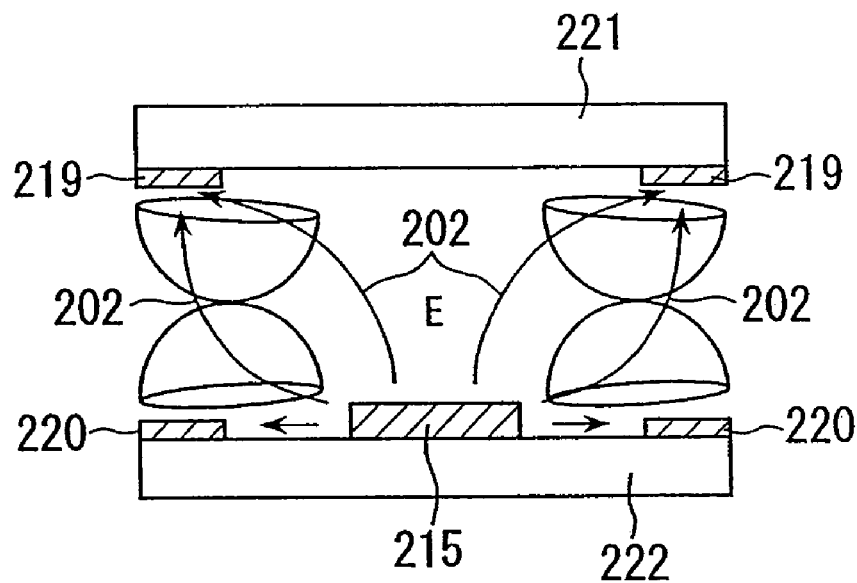
FIG. 40 is a schematic cross sectional view showing a condition of lateral electric field in the liquid crystal display shown in FIG. 39.
Figure 41:
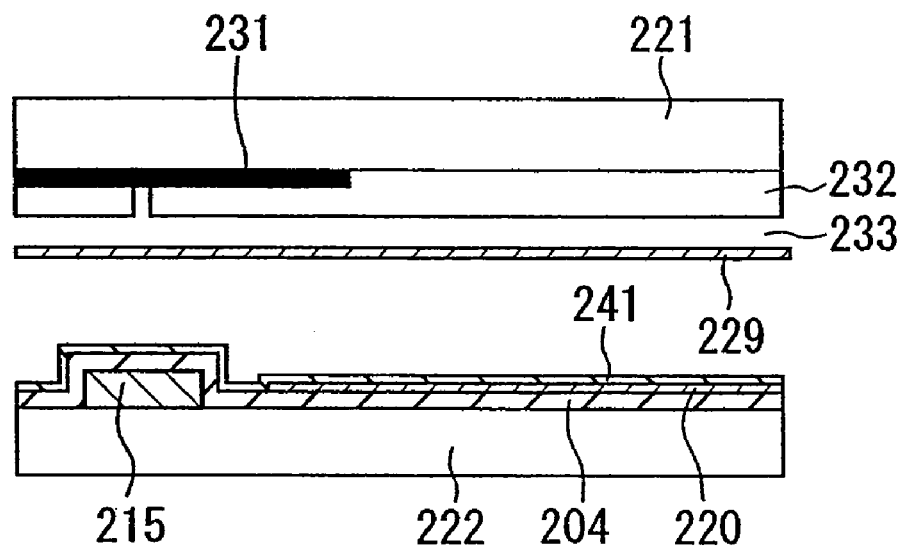
FIG. 41 is a schematic cross sectional view showing a portion including approximately one pixel of a conventional TN type liquid crystal display.
Figure 42:
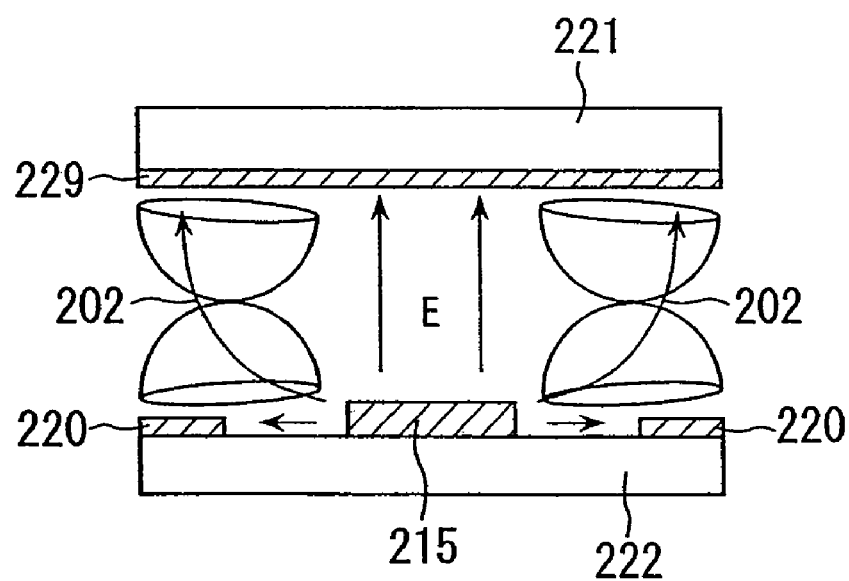
FIG. 42 is a schematic cross sectional view showing a condition of electric field in the liquid crystal display shown in FIG. 41.

With reference to FIGS. 27A and FIG. 27B, an explanation will be made on a liquid crystal display according to the sixteenth embodiment of the present invention.

The liquid crystal display according to this embodiment is an active matrix type liquid crystal display in which liquid crystal molecules are driven by active elements. FIG. 27A shows a cross section of one pixel of this liquid crystal display. FIG. 27B is a schematic plan view of the liquid crystal display according to this embodiment, and FIG. 27A is a cross sectional view taken on line D-D' of FIG. 27B. In this embodiment, a color filter layer is provided on the side of a lower substrate.

On a transparent substrate 81 of upside, a common electrode 82 is formed over approximately whole area of the transparent substrate. On the common electrode 82, a homeotropic alignment film 83 is applied.

On a lower substrate 91, there is formed a thin film transistor 90. In the thin film transistor 90, a gate electrode, that is, a scanning electrode, 84 made of Cr is disposed. A gate insulating film 85 made of silicon nitride is formed so as to cover the gate electrode 84. On the gate electrode 84, there is formed a semiconductor film 86 made of amorphous silicon via the gate insulating film 85. The semiconductor film 86 functions as an active layer of the thin film transistor (TFT) 90. Also, a drain electrode 87 and a source electrode 88 made of molybdenum are formed such that each of these electrodes 87 and 88 partially overlaps the pattern of the semiconductor film 86. A protective film 89 made of silicon nitride is formed to cover all of these components.

Although not shown in the drawings, the drain electrode 87 and the source electrode 88 partially overlaps the pattern of the semiconductor film 86 via an amorphous silicon film into which n type impurities are doped. As shown in FIG. 27B, the drain electrode 87 contacts a data line, that is, image signal line, 87a. In other words, the drain electrode 87 is formed as a part of the data line 87a. Also, the gate electrode 84 is formed as a part of the scanning line 84a.

Further, in the Embodiment 16, a color filter layer 94 is formed on the protective film 89. Also, on the protecting film 89, there is formed a light shielding layer 96 such that the light shielding layer covers the active layer 86 of the TFT. The color filter layer 94 and the light shielding layer 96 are covered by an overcoating layer 95. The overcoating layer 95 is made of a transparent and insulating material which is not easily charged up.

Also, a pixel electrode. 92 is formed on the overcoating layer 95 and coupled with the source electrode 88 via a through hole 97. On the pixel electrode 92, a homeotropic alignment layer or film 93 is formed.

Similarly to other embodiments, in this embodiment, the pixel electrode 92 is coupled with the source electrode 88, and an image signal is applied to the pixel electrode 92 from the source electrode 88. On-off of the image signal is controlled by the scanning signal. The pixel electrode 92 has a shape having a good symmetry. In this embodiment, the pixel electrode 92 has a square shape as an example, but it is possible to obtain similar effect by using other shape, such as a circle, a pentagon, an octagon, or the like.

It should be noted that liquid crystal molecules 80 having a negative anisotropy of permittivity are injected between the upper and lower substrates.

Since the alignment layers of the upper and lower substrates are homeotropic alignment layers, when no voltage is applied, liquid crystal molecules 80 are aligned approximately perpendicular to the substrates.

When the thin film transistor (TFT) 90 is turned on by applying a voltage to the gate electrode 84 thereof, a voltage is applied to the source electrode 88 and an electric field is produced between the common electrode 82 and the pixel electrode 92 opposing to each other. In this case, since the pixel electrode 92 has a good symmetry and the size of the common electrode 82 is larger than that of the pixel electrode 92, the electric field produced between the pixel electrode 92 and the common electrode 88 is not perpendicular to the substrates. That is, the electric field produced between the pixel electrode 92 and the common electrode 88 has slant components from peripheral portions of the pixel electrode toward the central portion. Therefore, liquid crystal molecules having a negative anisotropy of permittivity rotate symmetrically toward the center of the pixel as shown in FIG. 27A. That is, since the pixel electrode 92 has a symmetrical shape, the electric field is divided into components having different directions with symmetry. Accordingly, the alignment directions of liquid crystal molecules in each pixel are automatically divided into different directions.

In this way, when liquid crystal molecules having negative anisotropy of permittivity are used, it is possible to automatically or naturally divide direction of rotation of liquid crystal molecules and to obtain wide viewing angle characteristics, without performing special treatment on the alignment layers.

In the structure of the liquid crystal display of the Embodiment 16, since distances from the pixel electrode 92 to the gate line 84a and the drain line 87a are sufficiently large, liquid crystal alignment is hardly disturbed by the electric field from these electrodes.

Nevertheless, it is possible to dispose shielding electrodes on one of or both of the electrodes.

In the Embodiment 16, the pixel electrode 92 is disposed between the color filter layer 94 and the liquid crystal layer 80. Therefore, even the registration between the pixel electrode 92 and color filter layer 94 is not required, and required precision of alignment between the upper and lower substrates can be greatly mitigated. Such remarkable effect is not obtained by a conventional technology of providing openings in common electrode. Also, by disposing the pixel electrode 92 between the color filter layer 94 and the liquid crystal layer 80, it is possible to greatly reduce an influence by the lateral electric field from the scanning signal electrode 84a and the drain line 87a. Further, by using this structure, color irregularity caused by the charge-up in the color filter layer 94 which occurs in a liquid crystal display of IPS system and in a liquid crystal display in which homeotropic aligned liquid crystal molecules are rotated down by a lateral electric field can be obviated.

When it is required that the direction of rotating down of liquid crystal molecules is more precisely controlled, it is possible to use an optical alignment film as the alignment layer. In this case, depending on the property of the optical alignment layer or film, it is possible to irradiate polarized light thereon from a slant direction, or to irradiate non-polarized light thereon. Also, in order to avoid disturbance of alignment direction of liquid crystal molecules, it is possible to add monomer a little to the liquid crystal molecules and to polymerize it such that an appropriate alignment condition is memorized.

When polarizers are disposed such that the transmission axes thereof become perpendicular to each other, the liquid crystal display becomes that of normally black mode. In order to eliminate viewing angle dependence of retardation of initial alignment of liquid crystal display, it is possible to use a combination of a negative uniaxial optical compensation film and a positive uniaxial optical compensation film. By this method, viewing angle dependence of black condition can be removed. Therefore, image quality can be improved and viewing angle characteristics can be further improved.

In the above, an explanation was made on a liquid crystal display in which anisotropy of permittivity of liquid crystal molecules is negative and in which liquid crystal molecules have homeotropic alignment when no voltage is applied thereto. However, the present invention can be applied to a liquid crystal display like that of the Embodiment 13 in which anisotropy of permittivity of liquid crystal molecules is positive and in which liquid crystal molecules have twisted nematic alignment when no voltage is applied thereto. In this case, it is possible to obtain liquid crystal alignment similar to that of the Embodiment 13, and wide viewing angle characteristics can be realized.

In this case, liquid crystal layer of each pixel is divided into four domains as shown in FIGS. 21A and 21B. When twisted nematic alignment is used, it is preferable to use a pixel electrode having a square shape.

A method of manufacturing the liquid crystal display according to the Embodiment 16 may be the same as that of the Embodiment 12.

Next, some examples will be described concerning the Embodiment 16.

Example 18

A substrate having an amorphous silicon thin film transistor (TFT) 90 was formed on the glass substrates 91, by repeating film forming process and photolithography process. The TFT 90 comprises, from the side of the substrate 91, a gate layer made of chromium 84, a gate insulating film 85 made of silicon nitride, a semiconductor layer 86 made of amorphous silicon, and drain and source electrodes 87 and 88 made of molybdenum. The protective layer 89 was formed on the gate insulating film 85 such that the protective layer 89 covers the drain electrode 87, the source electrode 88 and the semiconductor film 86.

Next, on the protective layer 89, a color filter layer and light shield layer are formed. The color filter layer 94 is composed, for example, of a resin film including a dye or pigment of red, green or blue. The light shield layer 96 may be composed, for example, of a resin film including a dye or pigment of black. It is also possible to form the light shield layer 96 by using a metal.

The color filter layer 94 may be composed, for example, of a pigment-dispersed photoresist material in which pigment providing a desired optical property, such as red color and the like, is dispersed in negative type photosensitive acrylic resin. First, the pigment-dispersed photoresist material is applied to the protective film to form a photoresist film. Then, the photoresist film is exposed via a photomask such that light is selectively irradiated onto the pixel areas disposed in a matrix. After the exposure, the photoresist film is developed by using a predetermined developer to form predetermined patterns. These processes steps are repeated several times as the number of colors, for example, three times for red, blue and green, to form the color filter layer 94.

On the color filter layer 94 and the light shield layer 96, an overcoating layer 95 made of a transparent insulating material is formed. The overcoating layer 95 can be formed by using, for example, thermocurable resin such as acrylic resin and the like. Also, the overcoating layer 95 may be made of photocurable transparent resin.

Finally, the pixel electrode 92 which has a square shape and which couples with the source electrode 88 via a through hole 97 was formed on the overcoating layer 95.

As an opposing substrate, a glass substrate was prepared on which ITO is sputtered on whole area thereof. Homeotropic layers 83 and 93 (SE1211 purchased from Nissan Chemical Industries, LTD) were applied on both substrates, and dried by heating for 1 hour at 200 degrees Celsius.

Sealing material was applied in the peripheral portion of the substrate, and spacer material was sprayed. Then, the upper substrate and the lower substrate were stuck to each other, and the sealing material was cured by heating. Then, nematic liquid crystal material 80 having a negative anisotropy of permittivity was injected into the space between the substrates, and injecting hole or holes were sealed by using photocurable resin. A optically negative compensation film which has the same $\Delta$nd as that of the liquid crystal layer and has an opposite polarity to that of the liquid crystal layer was stuck to the liquid crystal panel, and then polarizers were stuck to the upper substrate and the lower substrate such that the transmission axes thereof become perpendicular to each other.

When viewing angle characteristics made in this way were measured, no inversion of gray shades was observed, and superior viewing angle characteristics were obtained in which a high contrast area was very wide. Also, when the upper and lower substrates were assembled, special registration was not required. It is considered that this method can be appropriately and completely applied to the liquid crystal display having pixels of small sizes.

Figure 45:
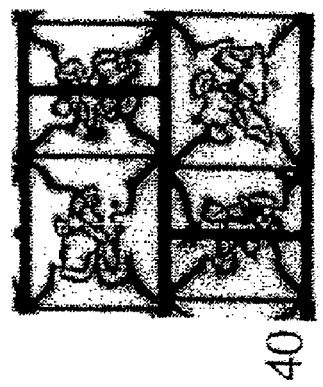
FIG. 45 includes photographs showing variation of liquid crystal alignment in a pixel of a liquid crystal display according to the Example 18.
Figure 45:
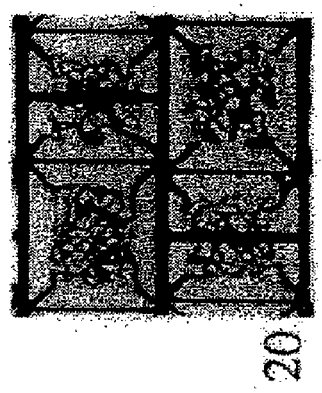
Figure 45:
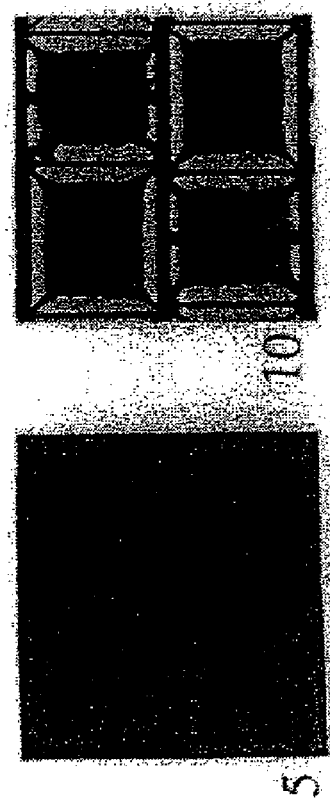
Figure 45:
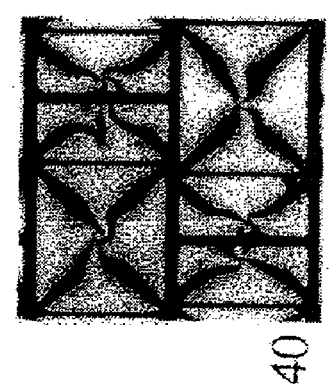
Figure 45:
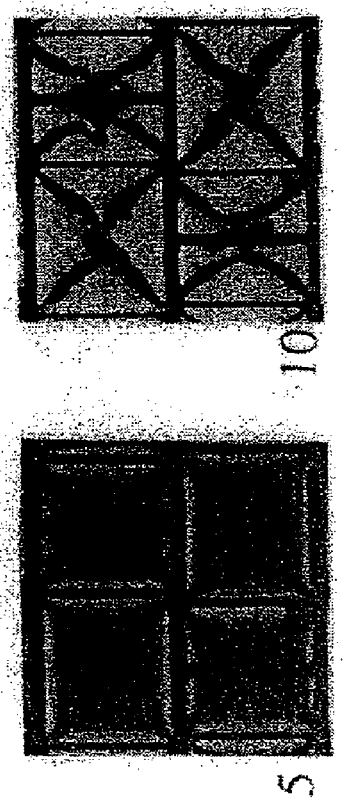

A response speed of the liquid crystal panel fabricated in this way was measured. When a voltage of 5V was applied suddenly from 0V without applying a bias voltage, a quantity of transmitted light did not come to a stable condition even after 40 ms. On the other hand, when a bias voltage of 2.2V was previously applied and a drive voltage of 5V was applied, a quantity of transmitted light became stable after 20 ms. An alignment condition of liquid crystal molecules of TEG fabricated in the same condition as that of the panel was observed by using a stroboscope. As shown in FIG. 45(*a*), even after 40 ms., disturbance of liquid crystal alignment was observed, and it was found that this was the cause of unstableness of a quantity of transmitted light. Also, when the bias voltage of 2.2V was applied, the alignment condition of liquid crystal molecules after 20 ms. was stable as shown in FIG. 45(*b*). It was found that, by applying a bias voltage in this way, it is possible to obtain a high response speed. When a bias voltage of 2.2V was applied, a contrast ratio was decreased from 2300 which was obtained when no bias was applied (0V) to 130. As apparent from the liquid crystal alignment condition after 5 ms, this was caused by the leakage of light at a peripheral portion of a pixel. However, when the peripheral portion was optically shielded by using a black matrix, the contrast ratio was improved to a high value of 2000. In FIG. 45, a numeral at a lower left portion of each photograph shows an elapsed time in milliseconds (ms) after the application of the voltage of 5V.

Example 19

A liquid crystal display panel was fabricated similarly to the Example 18, except that each pixel electrode has protrusions as shown in FIG. 18. The other portions were the same as those of the Example 18.

When viewing angle characteristics made in this way were measured, no inversion of gray shades was observed, and superior viewing angle characteristics were obtained in which a high contrast area was very wide. Also, when the inside of a pixel was observed through the microscope, no bend of disclination inside the pixel was observed at all, which was observed in a very small number of pixels in the Example 18.

Example 20

Similarly to the Example 18, the TFT substrate, the color filter layer 94, the overcoating layer 95 were formed. Also, the pixel electrodes 92 each having a square shape were formed. Similarly to the Example 10, as alignment films, JALS-428 purchased from JSR Corporation was used. Also, as a liquid crystal agent, ZL14792 from which chiral agent was removed was used. Rubbing was performed similarly to the Example 10. The liquid crystal display panel was fabricated similarly to the Example 18.

When viewing angle characteristics made in this way were measured, no inversion of gray shades was observed, and superior viewing angle characteristics were obtained in which a high contrast area was very wide. Also, when the upper and lower substrates were assembled, special registration was not required. It is considered that this method can be appropriately and completely applied to the liquid crystal display having pixels of small sizes.

Example 21

A liquid crystal display panel was fabricated similarly to the Example 20, except that each pixel electrode has protrusions as shown in FIG. 18. The other portions were the same as those of the Example 20.

When viewing angle characteristics made in this way were measured, no inversion of gray shades was observed, and superior viewing angle characteristics were obtained in which a high contrast area was very wide.

As mentioned above, according to the present invention, in the liquid crystal displays such as those according to the Embodiment 12 through Embodiment 16 each of which comprises a first substrate, a second substrate and a liquid crystal layer inserted between the first and second substrates, and in which a voltage is applied between a common electrode on the first substrate and each of pixel electrodes on the second substrate, each of the pixel electrodes has a symmetrical shape and is smaller than the common electrode and is within the area of the common electrode. Therefore, when a voltage is applied, liquid crystal molecules rotate down symmetrically, and each pixel is automatically divided into a plurality of domains. Accordingly, it is possible to obtain wide viewing angle characteristics without introducing additional process such as photolithography and the like. Especially, in case the color filter layer is formed on the second substrate, high precision registration is not required at all when both substrates are assembled into a liquid crystal display panel, and it is possible to easily fabricate a liquid crystal display panel having minute pixels.

Also, by using a method of manufacturing a liquid crystal display according to the present invention, it is possible to easily manufacture such liquid crystal display.

Further, by using a method of driving a liquid crystal display according to the present invention, it is possible to surely perform division of alignment directions in each pixel, even when the area of each pixel is very small.

In summary, according to the present invention, according to the present invention, it is possible to obtain a liquid crystal display in which disturbance of liquid crystal alignment such as disclination and the like caused by a lateral electric field does not occur.

Also, it is possible to provide a liquid crystal display in which disturbance or collapse of appropriately divided alignments of liquid crystal molecules dose not occur due to an external force exerted on the surface of the liquid crystal display.

Further, according to the present invention, it is possible to easily realize division of domains having different alignment directions.

Still further, according to the present invention, it is possible to easily make electrical contact, for example, between electrodes of upper substrate and lower substrate.

Still further, according to the present invention, it is possible to provide a liquid crystal display which uses ferroelectric liquid crystal material or antiferroelectric liquid crystal material and which has a good display quality.

Also, according to the present invention, it is possible to obtain wide viewing angle characteristics without introducing additional process such as photolithography and the like and without using complicated process.

Further, by using a method of manufacturing a liquid crystal display according to the present invention, it is possible to easily manufacture such liquid crystal display.

Still further, by using a method of driving a liquid crystal display according to the present invention, it is possible to surely perform division of alignment directions in each pixel, even when the area of each pixel is very small.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are to be included within the scope of the present invention. Therefore, it is intended that this invention encompasses all of the variations and modifications as fall within the scope of the appended claims.

What is claimed is:

1. An active matrix type liquid crystal display comprising:
   a first substrate having a common electrode formed thereon;
   a second substrate opposed to said first substrate and having a plurality of pixel electrodes with high reflectance formed thereon and having a plurality of thin film transistors corresponding to each of said pixel electrodes, wherein each pixel electrode has a single thin film transistor of the plurality of thin film transistors; and
   a liquid crystal layer disposed between said first and second substrates;
   wherein each of said pixel electrodes has a smaller area than that of said common electrode, and is covered by said common electrode;

wherein each of said pixel electrodes has a shape made of a link of a plurality of electrode portions each having approximately symmetrical shape;

wherein said electrode portion of said pixel electrode has notches or protrusions which radially extend in a direction perpendicular to a thickness direction of said pixel electrode from the center of said approximately symmetrical shape; and wherein said second substrate has an area lacking an electrode, said area being adjacent to said pixel electrode, with said area being opposite said thin film transistor across said pixel electrode.

2. An active matrix type liquid crystal display as set forth in claim 1, wherein said pixel electrode has a shield electrode formed around said pixel electrode;

wherein, on said first substrate, there is provided said common electrode for applying a reference potential over a plurality of pixels;

wherein, on said second substrate, there are provided a plurality of scanning signal lines, a plurality of image signal lines which cross said scanning signal lines to form a matrix, and a plurality of thin film transistors disposed near the intersections of said scanning signal lines and said image signal lines;

wherein at least one pixel is disposed in an area surrounded by said plurality of scanning signal lines and said plurality of image signal lines, and each pixel has a pixel electrode coupled with said thin film transistor corresponding to said pixel;

wherein said pixel electrode is electrically isolated from said scanning signal lines and said image signal lines by an interlayer insulating film; and wherein a part of said pixel electrode or a part of said shield electrode overlies at least one of said scanning signal line or said image signal line.

3. An active matrix type liquid crystal display as set forth in claim 1, wherein said liquid crystal display further comprises a color filter layer provided on said second substrate, and said liquid crystal layer is disposed between said color filter layer and said first substrate;

wherein, on said second substrate, there are provided a plurality of scanning signal lines, a plurality of image signal lines which cross said scanning signal lines to form a matrix, and a plurality of thin film transistors disposed near the intersections of said scanning signal lines and said image signal lines;

wherein at least one pixel is disposed in an area surrounded by said plurality of scanning signal lines and said plurality of image signal lines, and each pixel has a pixel electrode coupled with said thin film transistor corresponding to said pixel;

wherein, on said first substrate, there is provided said common electrode for applying a reference potential over a plurality of pixels; and wherein said pixel electrode on said second substrate is disposed between said color filter layer and said liquid crystal layer.

4. An active matrix type liquid crystal display as set forth in claim 1, wherein a pretilt angle of liquid crystal molecules in said liquid crystal layer is previously provided along a direction toward which said liquid crystal molecules rotate when an electric field is applied thereto.

5. An active matrix type liquid crystal display as set forth in claim 1, wherein said liquid crystal layer comprises a liquid crystal material having positive anisotropy of permittivity, and liquid crystal molecules of said liquid crystal material have a twisted nematic structure when no voltage is applied thereto; and wherein, in said liquid crystal layer of each pixel, there coexist a plurality of minute domains having different directions of twist of liquid crystal molecules and different directions of rising up of liquid crystal molecules.

6. An active matrix type liquid crystal display as set forth in claim 1, wherein said liquid crystal layer comprises a liquid crystal material having a positive anisotropy of permittivity, and liquid crystal molecules of said liquid crystal material have a homogeneous structure when no voltage is applied thereto; and wherein, in said liquid crystal layer of each pixel, there coexist a plurality of minute domains having different directions of rising up of liquid crystal molecules.

7. An active matrix type liquid crystal display as set forth in claim 1, wherein the surface of said pixel electrode having high reflectance has unevenness.

8. An active matrix type liquid crystal display as set forth in claim 1, wherein said liquid crystal display comprises a diffusion plate.

9. An active matrix type liquid crystal display comprising:

a first substrate having a common electrode formed thereon;

a second substrate opposed to said first substrate and having a plurality of pixel electrodes with high reflectance formed thereon and having a plurality of thin film transistors corresponding to each of said pixel electrodes, wherein each pixel electrode has a single thin film transistor of the plurality of thin film transistors; and a liquid crystal layer disposed between said first and second substrates;

wherein each of said pixel electrodes has a smaller area than that of said common electrode, and is covered by said common electrode;

wherein each of said pixel electrodes has a shape made of a link of a plurality of electrode portions each having approximately symmetrical shape;

wherein said electrode portion of said pixel electrode has voids in which no electrode material exists and which radially extend in a direction perpendicular to a thickness direction of said pixel electrode from the center of said approximately symmetrical shape; and wherein said second substrate has an area lacking an electrode, said area being adjacent to said pixel electrode, with said area being opposite said thin film transistor across said pixel electrode.

10. An active matrix type liquid crystal display as set forth in claim 9, wherein said pixel electrode has a shield electrode formed around said pixel electrode;

wherein, on said first substrate, there is provided said common electrode for applying a reference potential over a plurality of pixels;

wherein, on said second substrate, there are provided a plurality of scanning signal lines, a plurality of image signal lines which cross said scanning signal lines to form a matrix, and a plurality of thin film transistors disposed near the intersections of said scanning signal lines and said image signal lines;

wherein at least one pixel is disposed in an area surrounded by said plurality of scanning signal lines and said plurality of image signal lines, and each pixel has a pixel electrode coupled with said thin film transistor corresponding to said pixel;

wherein said pixel electrode is electrically isolated from said scanning signal lines and said image signal lines by an interlayer insulating film; and wherein a part of said pixel electrode or a part of said shield electrode overlies at least one of said scanning signal line or said image signal line.

11. An active matrix type liquid crystal display as set forth in claim 9, wherein said liquid crystal display further comprises a color filter layer provided on said second substrate, and said liquid crystal layer is disposed between said color filter layer and said first substrate;

wherein, on said second substrate, there are provided a plurality of scanning signal lines, a plurality of image signal lines which cross said scanning signal lines to form a matrix, and a plurality of thin film transistors disposed near the intersections of said scanning signal lines and said image signal lines;

wherein at least one pixel is disposed in an area surrounded by said plurality of scanning signal lines and said plurality of image signal lines, and each pixel has a pixel electrode coupled with said thin film transistor corresponding to said pixel;

wherein, on said first substrate, there is provided said common electrode for applying a reference potential over a plurality of pixels; and wherein said pixel electrode on said second substrate is disposed between said color filter layer and said liquid crystal layer.

12. An active matrix type liquid crystal display as set forth in claim 9, wherein a pretilt angle of liquid crystal molecules in said liquid crystal layer is previously provided along a direction toward which said liquid crystal molecules rotate when an electric field is applied thereto.

13. An active matrix type liquid crystal display as set forth in claim 9, wherein said liquid crystal layer comprises a liquid crystal material having positive anisotropy of permittivity, and liquid crystal molecules of said liquid crystal material have a twisted nematic structure when no voltage is applied thereto; and wherein, in said liquid crystal layer of each pixel, there coexist a plurality of minute domains having different directions of twist of liquid crystal molecules and different directions of rising up of liquid crystal molecules.

14. An active matrix type liquid crystal display as set forth in claim 9, wherein said liquid crystal layer comprises a liquid crystal material having a positive anisotropy of permittivity, and liquid crystal molecules of said liquid crystal material have a homogeneous structure when no voltage is applied thereto; and wherein, in said liquid crystal layer of each pixel, there coexist a plurality of minute domains having different directions of rising up of liquid crystal molecules.

15. An active matrix type liquid crystal display comprising:

a first substrate having a common electrode formed thereon;

a second substrate opposed to said first substrate and having a plurality of pixel electrodes with high reflectance formed thereon and having a plurality of thin film transistors corresponding to each of said pixel electrodes, wherein each pixel electrode has a single thin film transistor of the plurality of thin film transistors; and a liquid crystal layer disposed between said first and second substrates;

wherein each of said pixel electrodes has a smaller area than that of said common electrode, and is covered by said common electrode;

wherein each of said pixel electrodes has a shape made of a link of a plurality of electrode portions each having approximately symmetrical shape;

wherein said electrode portion of said pixel electrode has concave portions which radially extend in a direction perpendicular to a thickness direction of said pixel electrode from the center of said approximately symmetrical shape; and wherein said second substrate has an area lacking an electrode, said area being adjacent to said pixel electrode, with said area being opposite said thin film transistor across said pixel electrode.

16. An active matrix type liquid crystal display as set forth in claim 15, wherein said concave portions are provided in an interlayer insulating layer or an overcoat layer.

17. An active matrix type liquid crystal display as set forth in claim 15, wherein said pixel electrode has a shield electrode formed around said pixel electrode;

wherein, on said first substrate, there is provided said common electrode for applying a reference potential over a plurality of pixels;

wherein, on said second substrate, there are provided a plurality of scanning signal lines, a plurality of image signal lines which cross said scanning signal lines to form a matrix, and a plurality of thin film transistors disposed near the intersections of said scanning signal lines and said image signal lines;

wherein at least one pixel is disposed in an area surrounded by said plurality of scanning signal lines and said plurality of image signal lines, and each pixel has a pixel electrode coupled with said thin film transistor corresponding to said pixel;

wherein said pixel electrode is electrically isolated from said scanning signal lines and said image signal lines by an interlayer insulating film; and wherein a part of said pixel electrode or a part of said shield electrode overlies at least one of said scanning signal line or said image signal line.

18. An active matrix type liquid crystal display as set forth in claim 15, wherein said liquid crystal display further comprises a color filter layer provided on said second substrate, and said liquid crystal layer is disposed between said color filter layer and said first substrate;

wherein, on said second substrate, there are provided a plurality of scanning signal lines, a plurality of image signal lines which cross said scanning signal lines to form a matrix, and a plurality of thin film transistors disposed near the intersections of said scanning signal lines and said image signal lines;

wherein at least one pixel is disposed in an area surrounded by said plurality of scanning signal lines and said plurality of image signal lines, and each pixel has a pixel electrode coupled with said thin film transistor corresponding to said pixel;

wherein, on said first substrate, there is provided said common electrode for applying a reference potential over a plurality of pixels; and wherein said pixel electrode on said second substrate is disposed between said color filter layer and said liquid crystal layer.

19. An active matrix type liquid crystal display as set forth in claim 15, wherein a pretilt angle of liquid crystal molecules in said liquid crystal layer is previously provided along a direction toward which said liquid crystal molecules rotate when an electric field is applied thereto.

20. An active matrix type liquid crystal display as set forth in claim 15,
  wherein said liquid crystal layer comprises a liquid crystal material having positive anisotropy of permittivity, and liquid crystal molecules of said liquid crystal material have a twisted nematic structure when no voltage is applied thereto; and
  wherein, in said liquid crystal layer of each pixel, there coexist a plurality of minute domains having different directions of twist of liquid crystal molecules and different directions of rising up of liquid crystal molecules.

21. An active matrix type liquid crystal display as set forth in claim 15,
  wherein said liquid crystal layer comprises a liquid crystal material having a positive anisotropy of permittivity, and liquid crystal molecules of said liquid crystal material have a homogeneous structure when no voltage is applied thereto; and
  wherein, in said liquid crystal layer of each pixel, there coexist a plurality of minute domains having different directions of rising up of liquid crystal molecules.

22. An active matrix type liquid crystal display comprising:
  a first substrate having a common electrode formed thereon;
  a second substrate opposed to said first substrate and having a plurality of pixel electrodes with high reflectance formed thereon and having a plurality of thin film transistors corresponding to each of said pixel electrodes, wherein each pixel electrode has a single thin film transistor of the plurality of thin film transistors; and
  a liquid crystal layer disposed between said first and second substrates, the layer having a plurality of areas having different rising directions of liquid crystal molecules;
  wherein each of said pixel electrodes has a smaller area than that of said common electrode, and is covered by said common electrode;
  wherein each of said pixel electrodes has a shape made of a link of a plurality of electrode portions each having approximately symmetrical shape;
  wherein said second substrate has an area lacking an electrode, said area being adjacent to said pixel electrode, with said area being opposite said thin film transistor across said pixel electrode, and
  wherein the plurality of areas having different rising directions of liquid crystal molecules are automatically divided by applying an electric field to the liquid crystal layer.

23. An active matrix type liquid crystal display comprising:
  a first substrate having a common electrode formed thereon;
  a second substrate opposed to said first substrate and having a plurality of pixel electrodes with high reflectance formed thereon and having a plurality of thin film transistors corresponding to each of said pixel electrodes, wherein each pixel electrode has a single thin film transistor of the plurality of thin film transistors; and
  a liquid crystal layer disposed between said first and second substrates, the layer having a plurality of areas having different rising directions of liquid crystal molecules;
  wherein each of said pixel electrodes has a smaller area than that of said common electrode, and is covered by said common electrode;
  wherein each of said pixel electrodes has a shape made of a link of a plurality of electrode portions each having approximately symmetrical shape;
  wherein said second substrate has an area lacking an electrode, said area being adjacent to said pixel electrode, with said area being opposite said thin film transistor across said pixel electrode;
  wherein said electrode portion of said pixel electrode has notches or protrusions which radially extend in a direction perpendicular to a thickness direction of said pixel electrode from the center of said approximately symmetrical shape; and
  wherein the plurality of areas having different rising directions of liquid crystal molecules are automatically divided by applying an electric field to the liquid crystal layer.

24. The active matrix type liquid crystal display of claim 23 where the plurality of areas having different rising directions of liquid crystal molecules are automatically divided by applying an electric field to the liquid crystal layer.

25. An active matrix type liquid crystal display comprising:
  a first substrate having a common electrode formed thereon;
  a second substrate opposed to said first substrate and having a plurality of pixel electrodes with high reflectance formed thereon and having a plurality of thin film transistors corresponding to each of said pixel electrodes, wherein each pixel electrode has a single thin film transistor of the plurality of thin film transistors; and
  a liquid crystal layer disposed between said first and second substrates, the layer having a plurality of areas having different rising directions of liquid crystal molecules;
  wherein each of said pixel electrodes has a smaller area than that of said common electrode, and is covered by said common electrode;
  wherein each of said pixel electrodes has a shape made of a link of a plurality of electrode portions each having approximately symmetrical shape;
  wherein said second substrate has an area lacking an electrode, said area being adjacent to said pixel electrode, with said area being opposite said thin film transistor across said pixel electrode; and
  wherein said electrode portion of said pixel electrode has voids in which no electrode material exists and which radially extend in a direction perpendicular to a thickness direction of said pixel electrode from the center of said approximately symmetrical shape.

26. The active matrix type liquid crystal display of claim 25 where the plurality of areas having different rising directions of liquid crystal molecules are automatically divided by applying an electric field to the liquid crystal layer.

27. An active matrix type liquid crystal display comprising:
  a first substrate having a common electrode formed thereon;
  a second substrate opposed to said first substrate and having a plurality of pixel electrodes with high reflectance formed thereon and having a plurality of thin film transistors corresponding to each of said pixel electrodes, wherein each pixel electrode has a single thin film transistor of the plurality of thin film transistors; and
  a liquid crystal layer disposed between said first and second substrates, the layer having a plurality of areas having different rising directions of liquid crystal molecules;

wherein each of said pixel electrodes has a smaller area than that of said common electrode, and is covered by said common electrode;

wherein each of said pixel electrodes has a shape made of a link of a plurality of electrode portions each having approximately symmetrical shape;

wherein said second substrate has an area lacking an electrode, said area being adjacent to said pixel electrode, with said area being opposite said thin film transistor across said pixel electrode; and wherein said electrode portion of said pixel electrode has concave portions which radially extend in a direction perpendicular to a thickness direction of said pixel electrode from the center of said approximately symmetrical shape.

28. The active matrix type liquid crystal display of claim 27 where the plurality of areas having different rising directions of liquid crystal molecules are automatically divided by applying an electric field to the liquid crystal layer.

* * * * *